US012284726B2

United States Patent
Mohamed et al.

(10) Patent No.: US 12,284,726 B2
(45) Date of Patent: Apr. 22, 2025

(54) METHOD AND APPARATUS FOR INDICATING THAT CONNECTION ENABLES ROUTING OF DATA BETWEEN PDN GATEWAY AND LOCAL GATEWAY

(71) Applicant: InterDigital Patent Holdings, Inc., Wilmington, DE (US)

(72) Inventors: Ahmed Mohamed, Miramer, FL (US); Michael F. Starsinic, Newtown, PA (US); Qing Li, Princeton Junction, NJ (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 0 days.

(21) Appl. No.: 17/951,654

(22) Filed: Sep. 23, 2022

(65) Prior Publication Data
US 2023/0017009 A1 Jan. 19, 2023

Related U.S. Application Data

(63) Continuation of application No. 16/301,881, filed as application No. PCT/US2017/033092 on May 17, 2017, now abandoned.
(Continued)

(51) Int. Cl.
*H04W 88/16* (2009.01)
*H04W 4/70* (2018.01)
(Continued)

(52) U.S. Cl.
CPC ............ *H04W 88/16* (2013.01); *H04W 4/70* (2018.02); *H04W 8/08* (2013.01); *H04W 8/22* (2013.01);
(Continued)

(58) Field of Classification Search
CPC ......... H04W 88/16; H04W 4/70; H04W 8/08; H04W 8/22; H04W 28/0263;
(Continued)

(56) References Cited

U.S. PATENT DOCUMENTS

2009/0279522 A1\* 11/2009 Leroy .................. H04W 8/082
370/338
2010/0278108 A1 11/2010 Cho et al.
(Continued)

FOREIGN PATENT DOCUMENTS

CN 102244910 A 11/2011
CN 104620664 A 5/2015
(Continued)

OTHER PUBLICATIONS

3GPP TR 23.829 V10.0.1 "3rd Generation Partnership Project; Technical Specification Group Services and System Aspects; local IP Access and Selected IP Traffic Offload (LIPA-SIPTO) (Release 10)", (Oct. 2011), 8 pages.
(Continued)

*Primary Examiner* — Sudesh M Patidar
(74) *Attorney, Agent, or Firm* — Flaster Greenberg P.C.

(57) ABSTRACT

A user equipment device (UE) initiates the creation of a dedicated bearer between a local gateway (L-GW) and a packet data network gateway (P-GW). A GTP tunnel is established to connect the L-GW, a serving gateway (S-GW), and the P-GW. The L-GW and P-GW apply Network Address Translation (NAT) and/or Traffic Flow Template (TFT) to route the traffic between the LS and a Service Capacity Server/Application Server (SCS/AS). Alternatively, an SCS-initiates the bearer creation, and an SCEF manages the creation of the GTP tunnel connection. The
(Continued)

L-GW may be co-located with an Evolved UTRAN Node B (eNB) and/or connected to multiple eNBs which are not co-located with the L-GW.

20 Claims, 40 Drawing Sheets

Related U.S. Application Data

(60) Provisional application No. 62/337,504, filed on May 17, 2016.

(51) Int. Cl.
| | |
|---|---|
| *H04W 8/08* | (2009.01) |
| *H04W 8/22* | (2009.01) |
| *H04W 28/02* | (2009.01) |
| *H04W 36/00* | (2009.01) |
| *H04W 36/12* | (2009.01) |
| *H04W 76/11* | (2018.01) |
| *H04W 76/12* | (2018.01) |
| *H04W 88/02* | (2009.01) |

(52) U.S. Cl.
CPC ... *H04W 28/0263* (2013.01); *H04W 36/0022* (2013.01); *H04W 36/125* (2018.08); *H04W 76/11* (2018.02); *H04W 76/12* (2018.02); *H04W 88/02* (2013.01)

(58) Field of Classification Search
CPC . H04W 36/0022; H04W 76/11; H04W 76/12; H04W 88/02; H04W 36/125; H04W 76/22; H04L 67/12; H04L 65/1069; H04L 65/80
See application file for complete search history.

(56) References Cited

U.S. PATENT DOCUMENTS

| | | | |
|---|---|---|---|
| 2012/0051348 A1 | 3/2012 | Zhu et al. | |
| 2012/0082161 A1 | 4/2012 | Leung et al. | |
| 2012/0099592 A1* | 4/2012 | Ludwig | H04L 61/2514 370/392 |
| 2012/0170512 A1 | 7/2012 | Gleixner et al. | |
| 2012/0188895 A1 | 7/2012 | Punz et al. | |
| 2012/0269059 A1 | 10/2012 | Gupta et al. | |
| 2013/0010756 A1 | 1/2013 | Liang et al. | |
| 2013/0077540 A1 | 3/2013 | Black et al. | |
| 2013/0077570 A1 | 3/2013 | Lee et al. | |
| 2013/0128892 A1 | 5/2013 | Rao et al. | |
| 2013/0258900 A1 | 10/2013 | Kokkinen et al. | |
| 2013/0258967 A1 | 10/2013 | Watfa et al. | |
| 2014/0082697 A1 | 3/2014 | Watfa et al. | |
| 2014/0146783 A1 | 5/2014 | Kim et al. | |
| 2014/0211714 A1* | 7/2014 | Li | H04L 65/80 370/329 |
| 2015/0049612 A1* | 2/2015 | Zhang | H04W 76/10 370/235 |
| 2015/0117347 A1 | 4/2015 | Iwai | |
| 2015/0381756 A1 | 12/2015 | Lotfallah et al. | |
| 2016/0044651 A1 | 2/2016 | Lu | |
| 2016/0255540 A1 | 9/2016 | Kweon et al. | |
| 2016/0294682 A1* | 10/2016 | Bi | H04L 45/64 |
| 2016/0309383 A1 | 10/2016 | Stojanovski et al. | |
| 2017/0104839 A1* | 4/2017 | Starsinic | H04W 40/34 |
| 2017/0188275 A1* | 6/2017 | Kim | H04W 76/15 |
| 2018/0116008 A1* | 4/2018 | Kawasaki | H04W 36/0079 |
| 2018/0124633 A1* | 5/2018 | Hwang | H04W 72/566 |
| 2018/0242385 A1* | 8/2018 | Chandramouli | H04W 4/44 |
| 2018/0270300 A1* | 9/2018 | Reznik | H04L 67/568 |

FOREIGN PATENT DOCUMENTS

| | | |
|---|---|---|
| EP | 1853013 A1 | 11/2007 |
| JP | 2011-010284 A | 1/2011 |
| JP | 2012-525760 A | 10/2012 |
| JP | 2013-502121 A | 1/2013 |
| KR | 10-1486740 B1 | 2/2015 |
| KR | 10-2015-0113101 A | 10/2015 |

OTHER PUBLICATIONS

3GPP TR 23.829 v10.0.1, Technical Report, 3rd Generation Partnership Project; Technical Specification Group Services and System Aspects; Local IP Access and Selected IP Traffic Offload (LIPA-SIPTO) (Release 10), Oct. 2011, 43 pages.

3GPP TS 23.401 v13.6.1 Technical Specification, 3rd Generation Partnership Project; Technical Specification Group Services and System Aspects; General Packet Radio Service (GPRS) Enhancements for Evolved Universal Terrestrial Radio Access Network (E-UTRAN) Access (Release13), Mar. 2016, 365 pages.

3GPP TS 23.682 V13.5.0, "3rd Generation Partnership Project; Technical Specification Group Services and System Aspects; Architecture Enhancements to Facilitate Communications with Packet Data Networks and Application (Release 13)", Mar. 2016, 90 pages.

3GPP TS 36.331 V12.1.0, Technical Specification, 3rd Generation Partnership Project; Technical Specification Group Radio Access Network; Evolved Universal Terrestrial Radio Access (E-UTRA); Radio Resource Control (RRC); Protocol Specification (Release 12), Mar. 2014, 304 pages.

3GPP TS 36.413 V12.1.0, Technical Specification, "3rd Generation Partnership Project; Technical Specification Group Radio Access Network; Evolved Universal Terrestrial Radio Access Network (E-UTRAN); S1 Application Protocol (S1AP) (Release 12)" Mar. 2014, 285 pages.

* cited by examiner

Local Server Information

The local server would like to communicate some data to the main server that could be of interest to you.

Do you agree?

☐ Remember this setting

[Agree]  [Disagree]

FIG. 30

METHOD AND APPARATUS FOR INDICATING THAT CONNECTION ENABLES ROUTING OF DATA BETWEEN PDN GATEWAY AND LOCAL GATEWAY

CROSS-REFERENCE TO RELATED APPLICATIONS

This application is a continuation of U.S. Nonprovisional application Ser. No. 16/301,881 filed Nov. 15, 2018, entitled "Method and Apparatus for Indicating That Connection Enables Routing of Data Between PDN Gateway and Local Gateway"; which is a U.S. National Phase Application claiming priority to PCT Application No. PCT/US2017/033092 filed May 17, 2017, entitled "Method and Apparatus for Indicating That Connection Enables Routing of Data Between PDN Gateway and Local Gateway"; which claims the benefit of U.S. Provisional Application No. 62/337,504, filed on May 17, 2016, entitled "Enablement Of Direct Connections Between Local Servers And Service Capability Servers/Application Servers Over 3GPP Mobile Core Networks", the above-referenced applications are hereby incorporated by reference in their entireties.

BACKGROUND

Machine-to-machine (M2M) systems, also called Internet-of-Things (IoT) or web of things (WoT) systems, often incorporate multiple interconnected heterogeneous networks in which various networking protocols are used to support diverse devices, applications, and services. These protocols have different functions and features, each optimized for one situation or another. There is no one-size-fits-all solution due to the diversity of devices, applications, services, and circumstances.

Various standards and proposed protocols, such as 3GPP and oneM2M, describe methods for various entities to establish connections and communicate at various layers of operation. Such an entity may be, for example, a local, serving, or packet data network gateway (L-GW, S-GW, or P-GW), user equipment (UE), application server (AS), a service capability server (SCS), a mobility management entity (MME), an evolved UTRAN node B (eNB), a service capability exposure function (SCEF), or a home subscriber server (HSS). Layers of operation may include, for example, evolved packet core (EPC)/AS(SCS) interfaces, 3GPP Core Network and Service Layer. Operations may involve the use of a local data plane and may use tunneling protocol such as general packet radio service tunneling protocol (GTP).

SUMMARY

A user equipment device (UE) initiates the creation of a dedicated bearer between a local gateway (L-GW) and a packet data network gateway (P-GW). A GTP tunnel is established to connect the L-GW, a serving gateway (S-GW), and the P-GW. The L-GW and P-GW apply Network Address Translation (NAT) and/or Traffic Flow Template (TFT) to route the traffic between the LS and a Service Capability Server/Application Server (SCS/AS). Alternatively, an SCS-initiates the bearer creation, and an SCEF manages the creation of the GTP tunnel connecting. The L-GW may be co-located with an Evolved UTRAN Node B (eNB) and/or connected to multiple eNBs which are not co-located with the L-GW.

BRIEF DESCRIPTION OF THE FIGURES

A more detailed understanding may be had from the following description, given by way of example in conjunction with the accompanying drawings.

FIG. 30 is an example graphical user interface.

DETAILED DESCRIPTION OF ILLUSTRATIVE EMBODIMENTS

A user equipment device (UE) initiates the creation of a dedicated bearer between a local gateway (L-GW) and a packet data network gateway (P-GW). A GTP tunnel is established to connect the L-GW, a serving gateway (S-GW), and the P-GW. The L-GW and P-GW apply Network Address Translation (NAT) and/or Traffic Flow Template (TFT) to route the traffic between the LS and a Service Capability Server/Application Server (SCS/AS). Alternatively, an SCS-initiates the bearer creation, and an SCEF manages the creation of the GTP tunnel connecting. The L-GW may be co-located with an Evolved UTRAN Node B (eNB) and/or connected to multiple eNBs which are not co-located with the L-GW.

Figure 1:
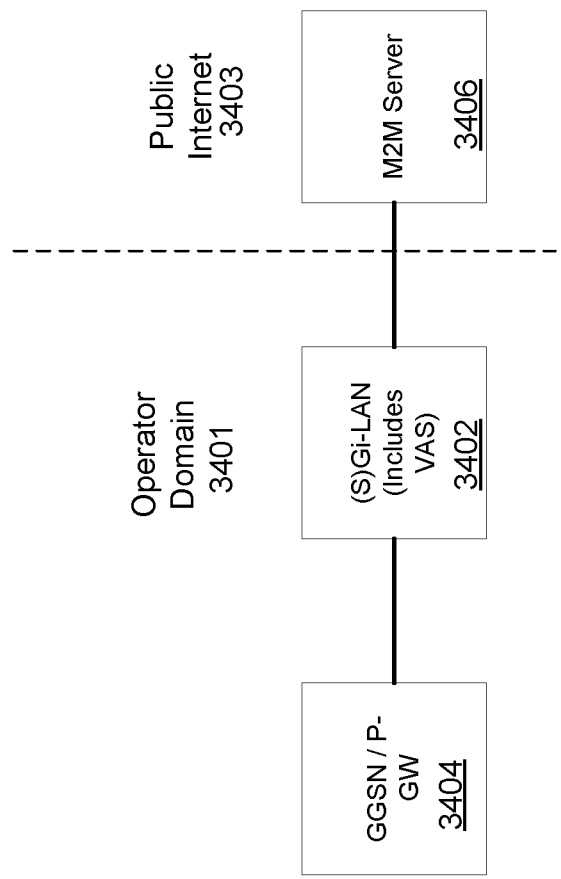
FIG. 1 is a block diagram that shows an example (S)Gi-LAN in relation to a mobile network operator (MNO) domain and the public Internet.

Referring to FIG. 1, the (S)Gi-LAN 3402 is a packet data network (PDN) that is between the Internet 3403 and the General Packet Radio Service (GPRS) Support Node (GGSN) or PDN Gateway (P-GW) GGSN/P-GW 3404. P-GW/GGSN 3404) of the Mobile Core network 3401. The (S)Gi-LAN 3402 is under control of the Mobile Network Operator (MNO) in operator domain 3401. When uplink data packets leave the (S)Gi-LAN 3402 toward the Internet 3403, they are no longer under control of the MNO and the packets can be generally considered to have gone to the public Internet 3403. The (S)Gi-LAN 3402 may include Value Added Services (VASs). Examples of VASs include Network Address Translations (NATs), Firewalls, Video Compression, Data Compression, load balancers, HTTP Header Enrichment functions, Transmission Control Protocol (TCP) optimizers, etc. Generally, Deep Packet Inspection (DPI) techniques determine if each Value Added Service (VAS) should operate on a given data flow. Traffic may be routed to or from the (S)Gi-LAN 3402 and Servers in the public Internet 3403 such as a machine-to-machine (M2M) Server 3406 for example.

The concepts presented here may also be applied, e.g., to a 5G network. The application server (AS) or service capability server (SCS) may also be called an application function. The ideas that apply to the P-GW may also be applied to a User Plane Function (UPF). The ideas that apply to the MME may also be applied to a Access and Mobility Function (AMF). The ideas that apply to the HSS may also be applied to a User Data Management Function (UDM). The ideas that apply to the SCEF may also be applied to a Network Exposure Function (NEF). The ideas that apply to the eNB may also be applied to a 5G base station.

In general, once a UE has attached to an EPC network and established a PDN connection and a LIPA PDN connection, the UE may initiate a process to establish a connection, such as a dedicated bearer or a new PDN connection, between the L-GW and the P-GW that may be used by an LS or SCS/AS. This may be done in a number of ways. For example, the amount of signaling to the UE may be minimized, e.g., if no radio resources need to be reserved for the UE. Further, an SCS/AS may similarly initiate bearer creation and session creation.

At times, it would be beneficial for a network, such as a 3GPP network, to establish a direct connection between a local server (LS) and an application server (AS) for the benefit of a user of a user equipment device (UE). For example, the user may be a mobile subscriber who requests a service from an AS, where the AS is accessed via a Mobile Core Network (MCN). The subscriber may connect to the AS via a base station that is associated with a local network. The local network may host Local Servers (LS), e.g., an IN-CSE or MN-CSE, that is aware of local context information. In many cases it would be advantageous for the LS to be able to share this local context information with the remote AS. For example, the user may be subscribed to an advertisement service at a backend AS. In such a subscription, the user identifies the type of advertisements that interests him or her. Advertisements that are not of interest should be filtered out by the backend AS and should not reach the mobile subscriber. Then, when the user visits a shopping mall and he or she may get connected to the shopping mall small cells over a LIPA connection. The small cells may provide access to the Internet as well as to multiple local servers. A local advertisement LS is not permitted to send its local advertisements directly to the mobile subscriber. Instead, it has to send its advertisements to the backend AS, which will filter them first according to the user preferences, then forward the recommended ones to the UE.

There is no connection through a standard EPC between an LS and an SCS/AS. An LS and SCS/AS can communicate outside of the EPC network via Internet. However, a non-EPC connection is not preferred from an operator's value added service perspective, given that the information will traverse non-3GPP networks. Therefore, it is preferred that information be conveyed from LS to SCS/AS and vice versa over the operator's EPC. To achieve this, a PDN connection or dedicated bearer between LS and SCS/AS may be initiated by either the UE or an SCS/AS.

This may be accomplished in a number of ways. For example, a UE may initiate a request for dedicated bearer between an L-GW and a P-GW such that the connection will be associated with the UE. Similarly, the UE may initiate a new PDN connection request between the L-GW and P-GW such that the connection will be associated with the UE. Likewise, SCS/AS may initiate a request for a dedicated bearer or PDN connection between the LS and SCS/AS such that the connection will be associated with the SCS/AS.

Table 1 provides expansions of many acronyms used in describing the methods and apparatuses discussed herein.

TABLE 1

| Acronyms and Abbreviations | |
|---|---|
| AAA | Authentication, Authorization, and Accounting |
| AE | Application Entity |
| AESE | Architecture Enhancements for Service Capability Exposure |
| APN | Access Point Name |
| API | Application Program Interface |
| AS | Application Server |
| eNB | Evolved UTRAN Node B |
| EPC | Evolved Packet Core |
| EPS | Evolved Packet System |
| GGSN | Gateway GPRS Support Node |
| GPRS | General packet radio service |
| GTP | GPRS Tunneling Protocol |
| HeNB | Home eNB (an LTE femtocell or Small Cell) |
| HLR | Home Location Register |
| HSS | Home Subscriber Server |
| IE | Information Element |
| IMSI | International Mobile Subscriber Identity |
| L-GW | Local Gateway |
| LGW-PGW | Local Gateway to Packet Data Network Gateway |
| LBI | Linked Bearer Identifier |
| LIPA | Local Internet Protocol Access |
| LIPA-APN | LIPA Access Point Name |

TABLE 1-continued

Acronyms and Abbreviations

| | |
|---|---|
| LTE | Long Term Evolution |
| LS | Local Server |
| MCN | Mobile Core Network |
| MME | Mobility Management Entity |
| MSC | Mobile Switching Center |
| NAS | Non Access Stratum |
| NAT | Network Address Translation |
| PCRF | Policy and Charging Rules Function |
| PDN | Packet Data Network |
| PTI | Procedure Transaction Identifier |
| P-GW | Packet Data Network Gateway |
| QoS | Quality of Service |
| RAN | Radio Access Network |
| RAT | Radio Access Technology |
| RRC | Radio Resource Control |
| SCS | Service Capability Server |
| SCEF | Service Capability Exposure Function |
| (S)Gi-LAN | LAN between the GGSN/P-GW and the Internet |
| SGSN | Serving GPRS Support Node |
| S-GW | Serving Gateway |
| TAD | Traffic Aggregate Description |
| TFT | Traffic Flow Template |
| UE | User Equipment |

FIGS. 2-10 depict call flows and architectures, based on standards and proposed standards, that may be adapted to effect the UE and SCS/AS initiated connection creation methods described here.

Figure 2:
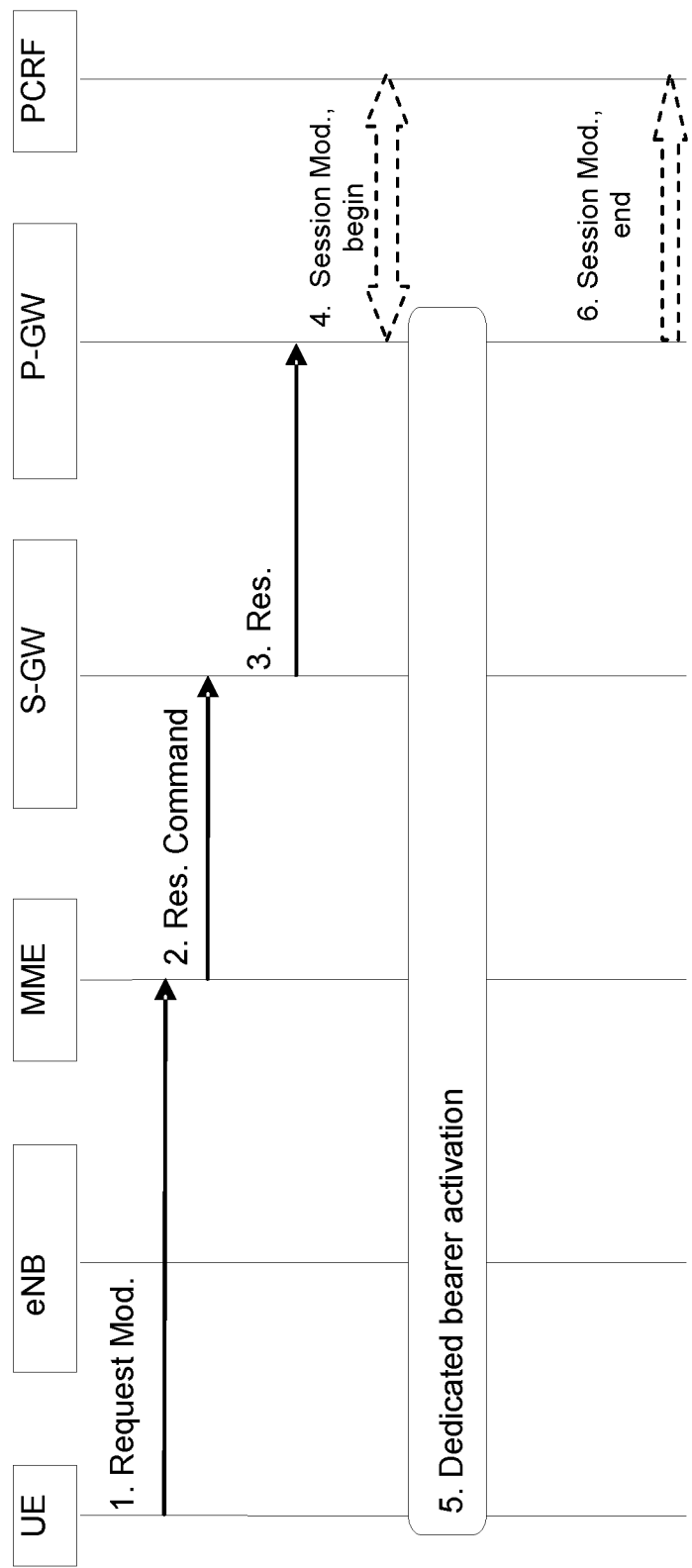
FIG. 2 is an example call flow for a method for UE-requested bearer resource modification.

FIG. 2 is a call flow for an example method for UE-requested bearer resource modification. A UE may request a modification of bearer resources using the "UE requested bearer resource modification" procedure, as explained in clause 5.4.5 of 3GPP TS 23.401, "General Packet Radio Service (GPRS) enhancements for Evolved Universal Terrestrial Radio Access Network (E-UTRAN) access," V12.4.0, March 2014. Such a request may be used to request a new Quality of Service (QoS) or modify particular packet filters. The UE may accept such request and invoke dedicated bearer activation/deactivation or modification procedures TS 23.401.

Figure 3:
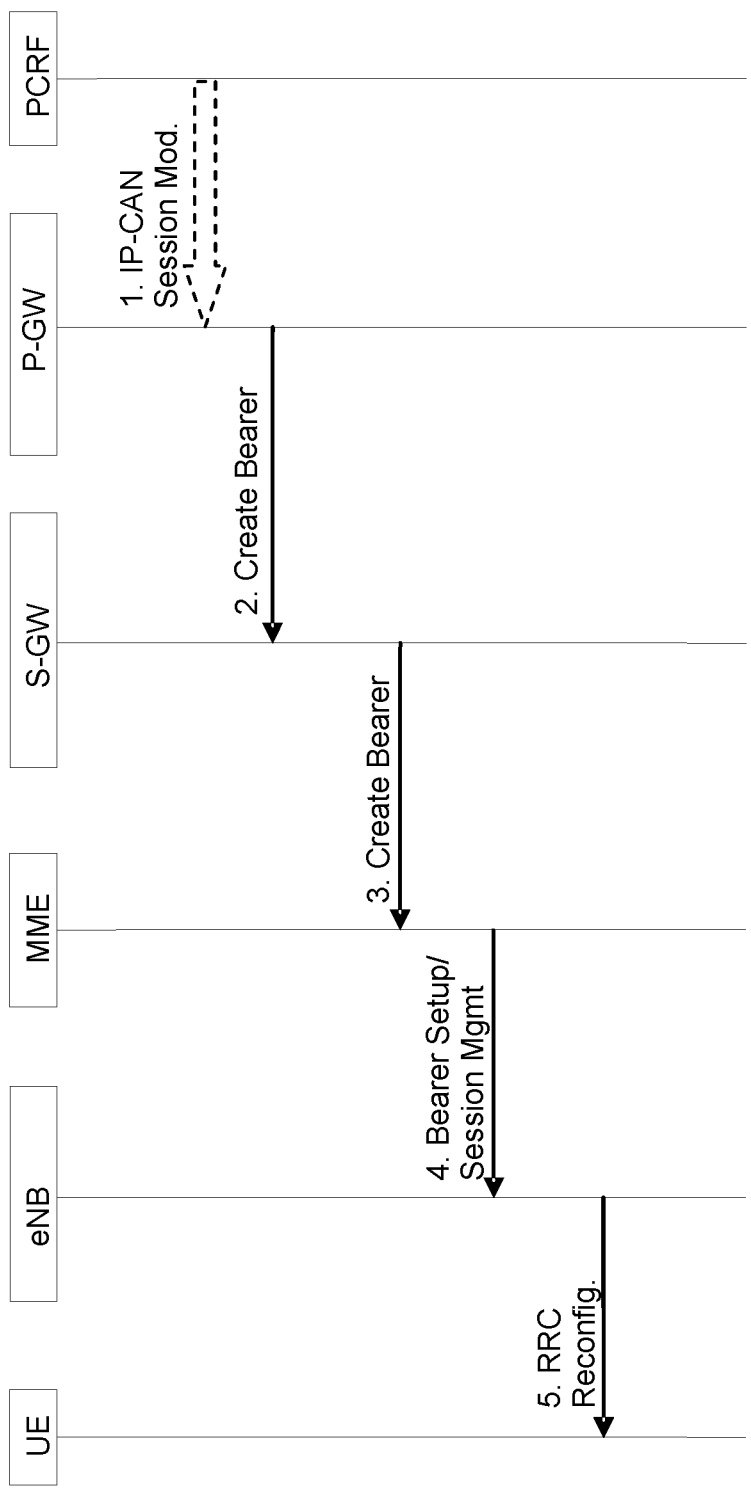
FIGS. 3 and 4 depict an example call flow for a method for dedicated bearer activation.
Figure 4:
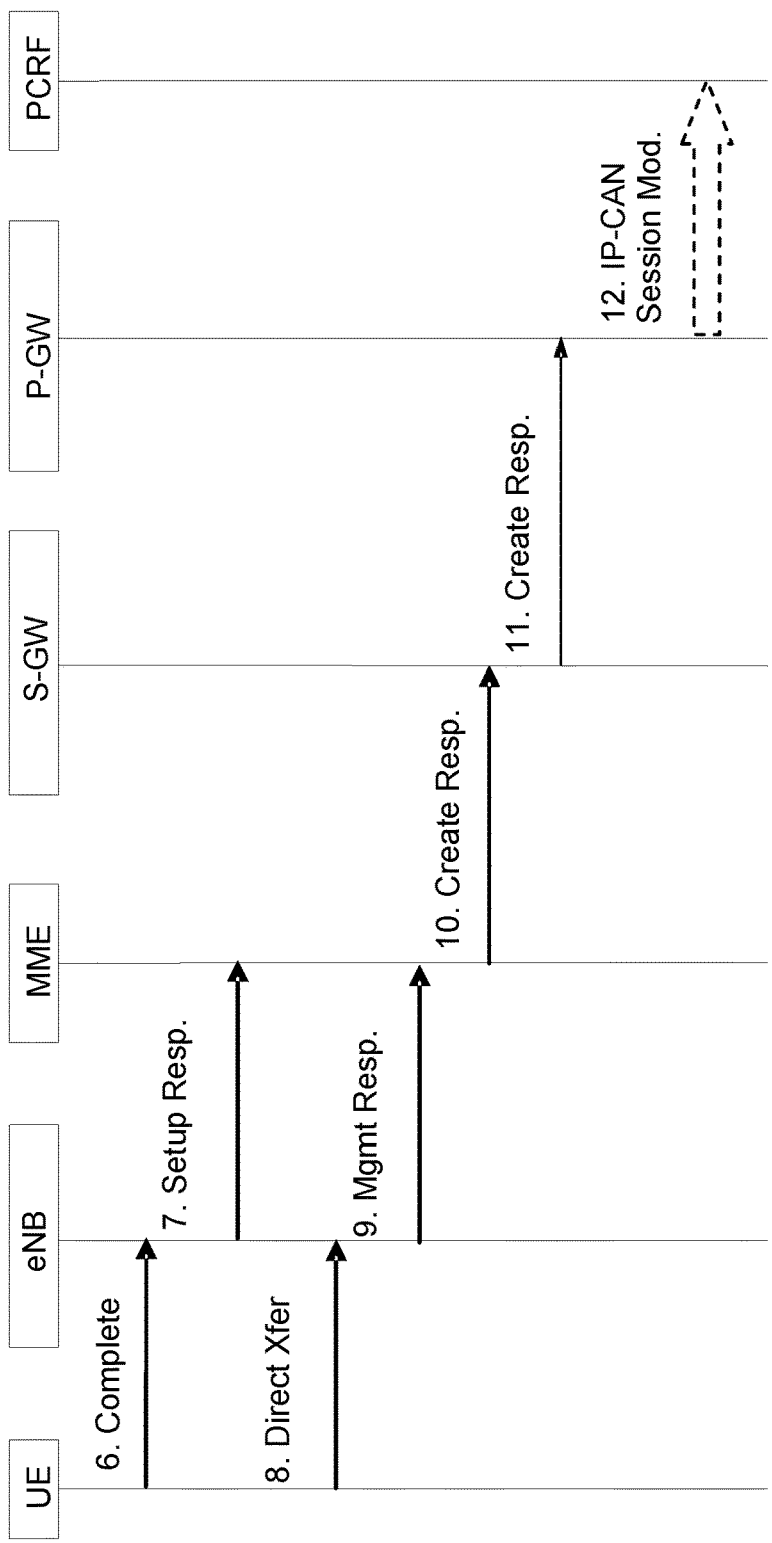
Figure 5:
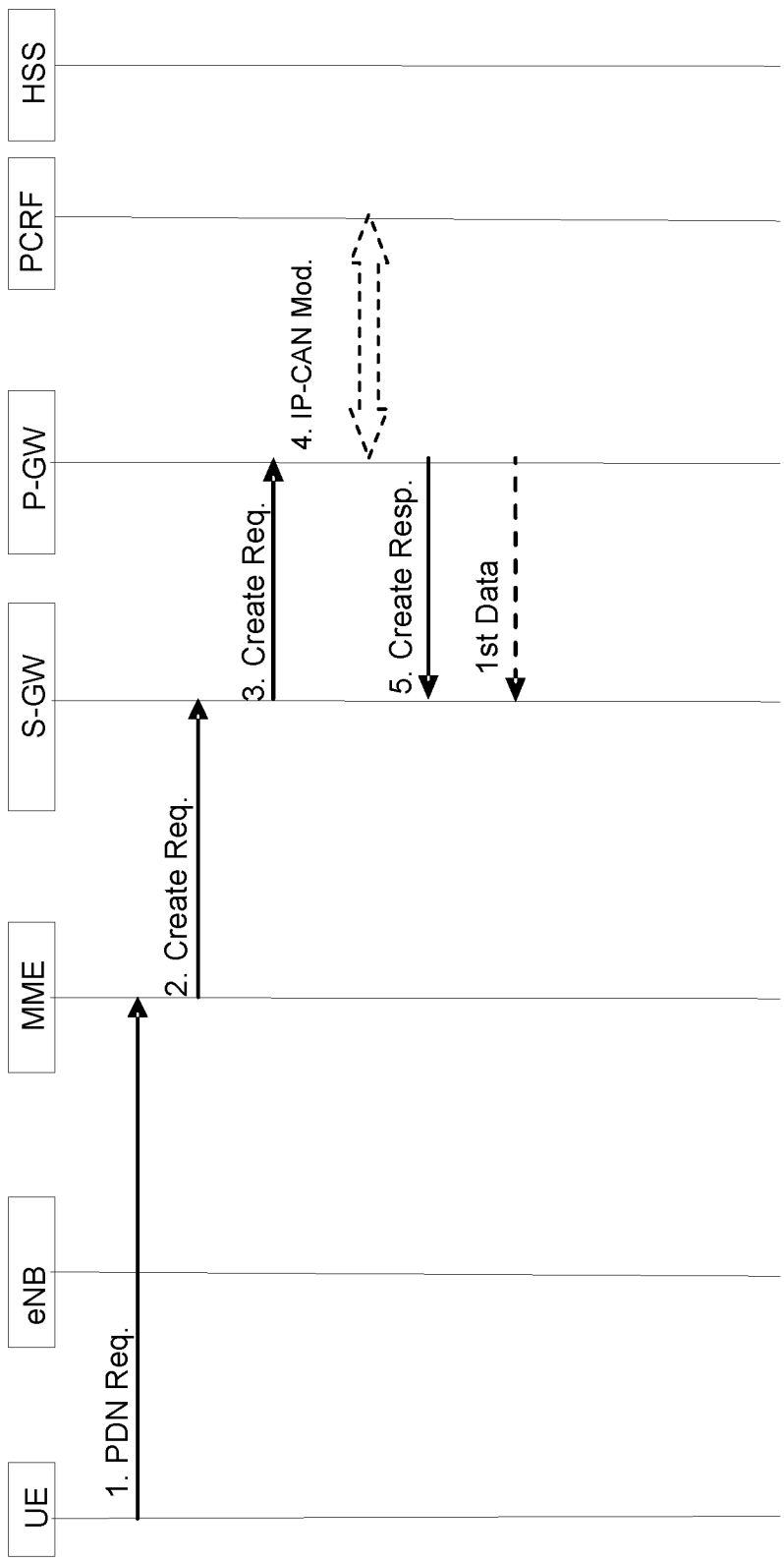
FIGS. 5-7 depict an example call flow for a method of establishing UE-requested PDN connectivity.

FIGS. 3 and 4 depict an example call flow for dedicated bearer activation. The PDN-GW may invoke a "dedicated bearer activation" procedure, based on a UE's request (Section 2.2) as explained in clause 5.4.1 of TS 23.401. The dedicated bearer will be established over the same existing default PDN connection between the UE and PDN-GW. Such dedicated bearer will have associated packet filters, which will be stored in a Traffic Flow Template (TFT). The TFT will be used to traffic the intended packets over the dedicated bearer, as opposed to the default bearer.

Figure 6:
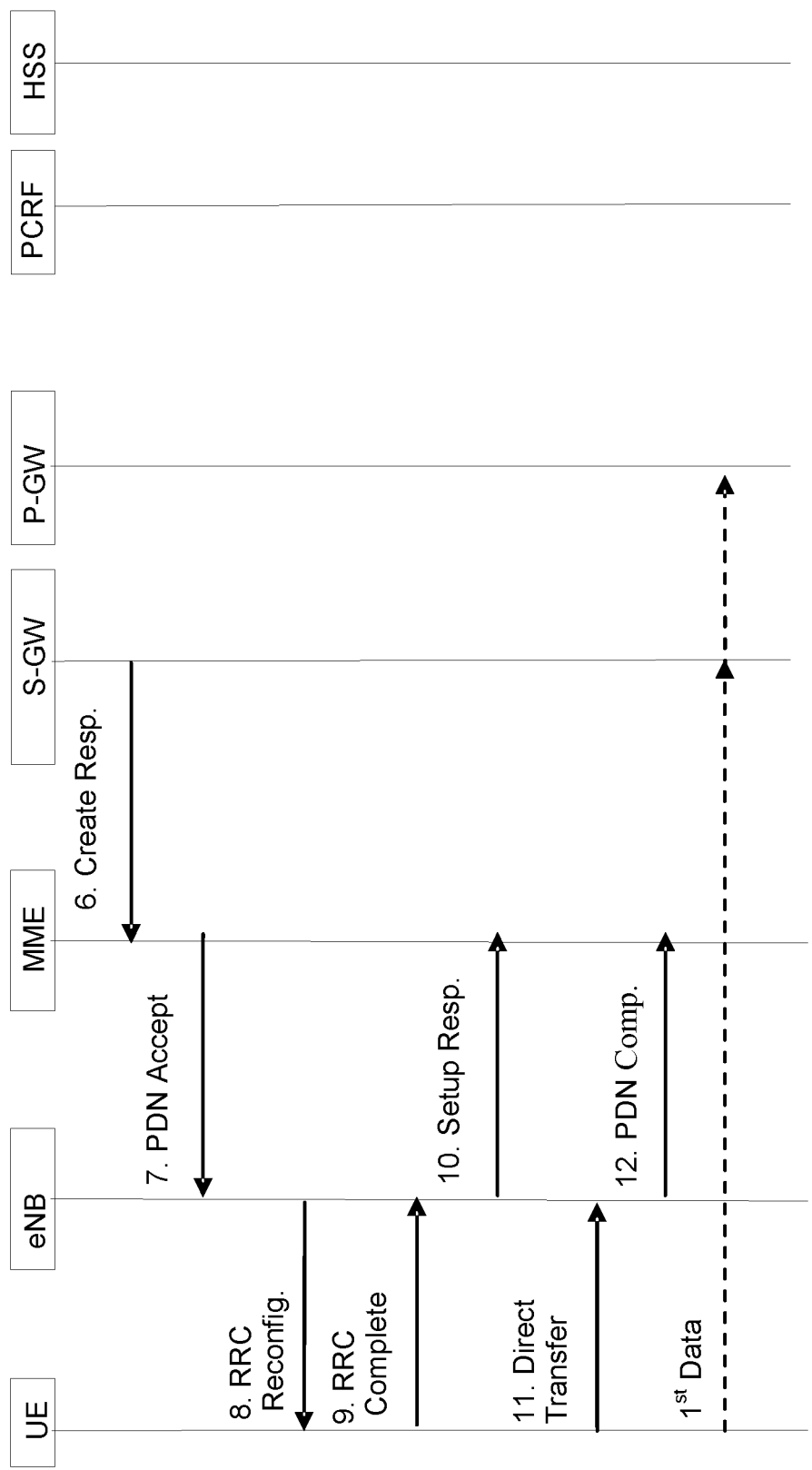
Figure 7:
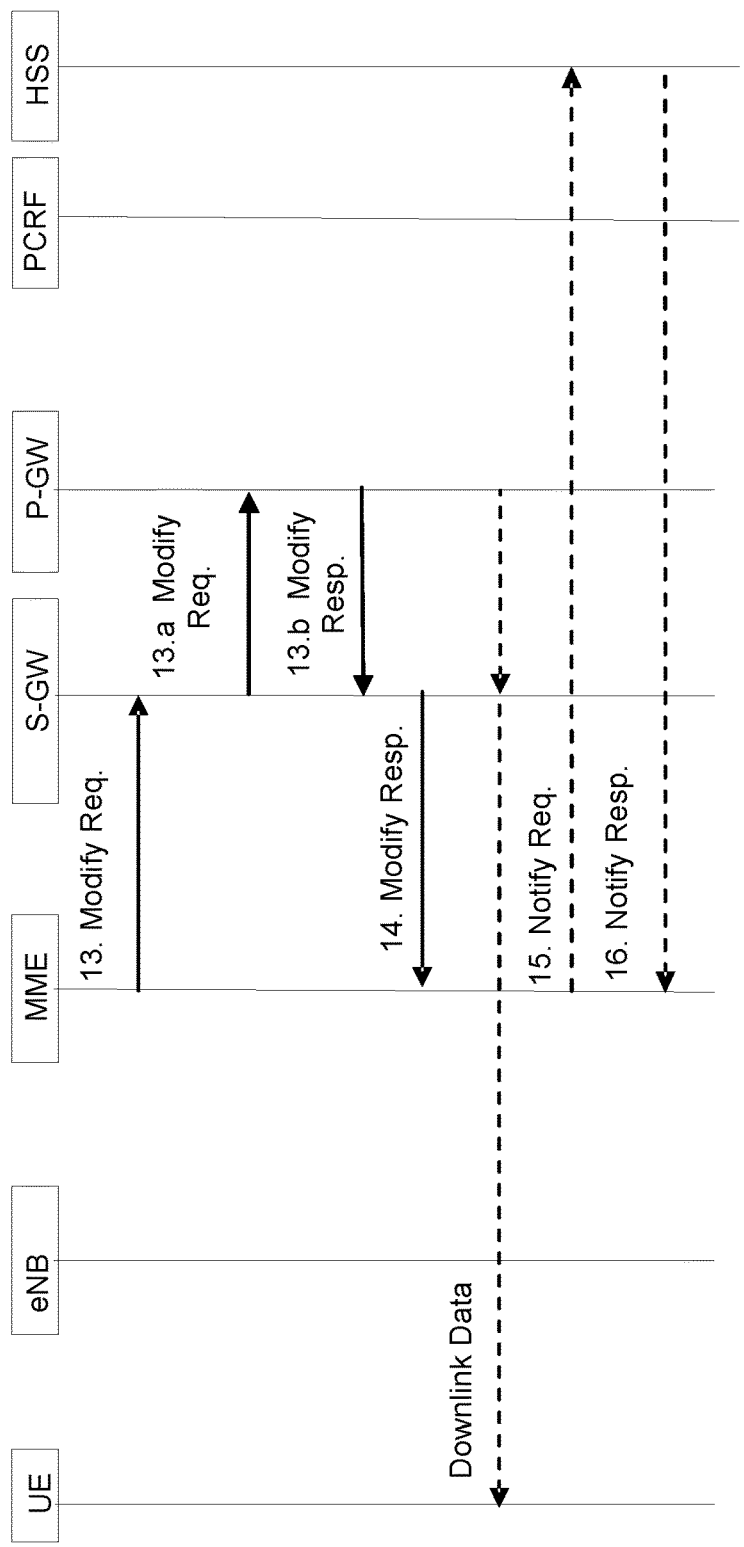

FIGS. 6-7 depict an example call flow for a method of establishing UE-requested PDN connectivity. Unlike the bearer resource modification procedure described in reference to FIG. 2, here, a UE may request a new PDN connection as described in clause 5.10.2 of TS 23.401. In response, a default bearer will be activated over the new PDN connection. Furthermore, the P-GW will assign a new IP address to the UE over the new PDN connection.

Figure 8:
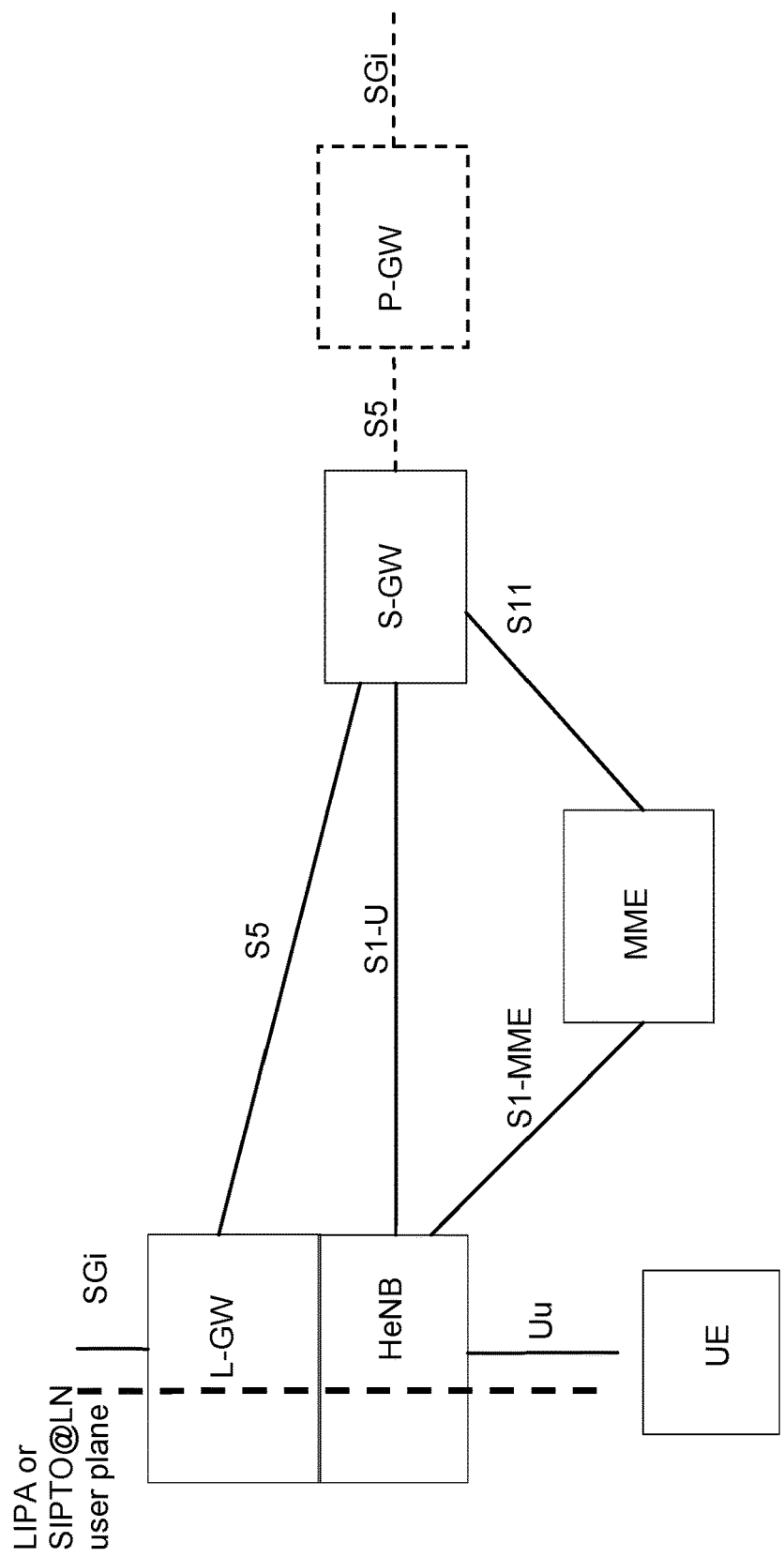
FIG. 8 shows an example architecture for a LIPA L-GW co-located with a HeNB.
Figure 9:
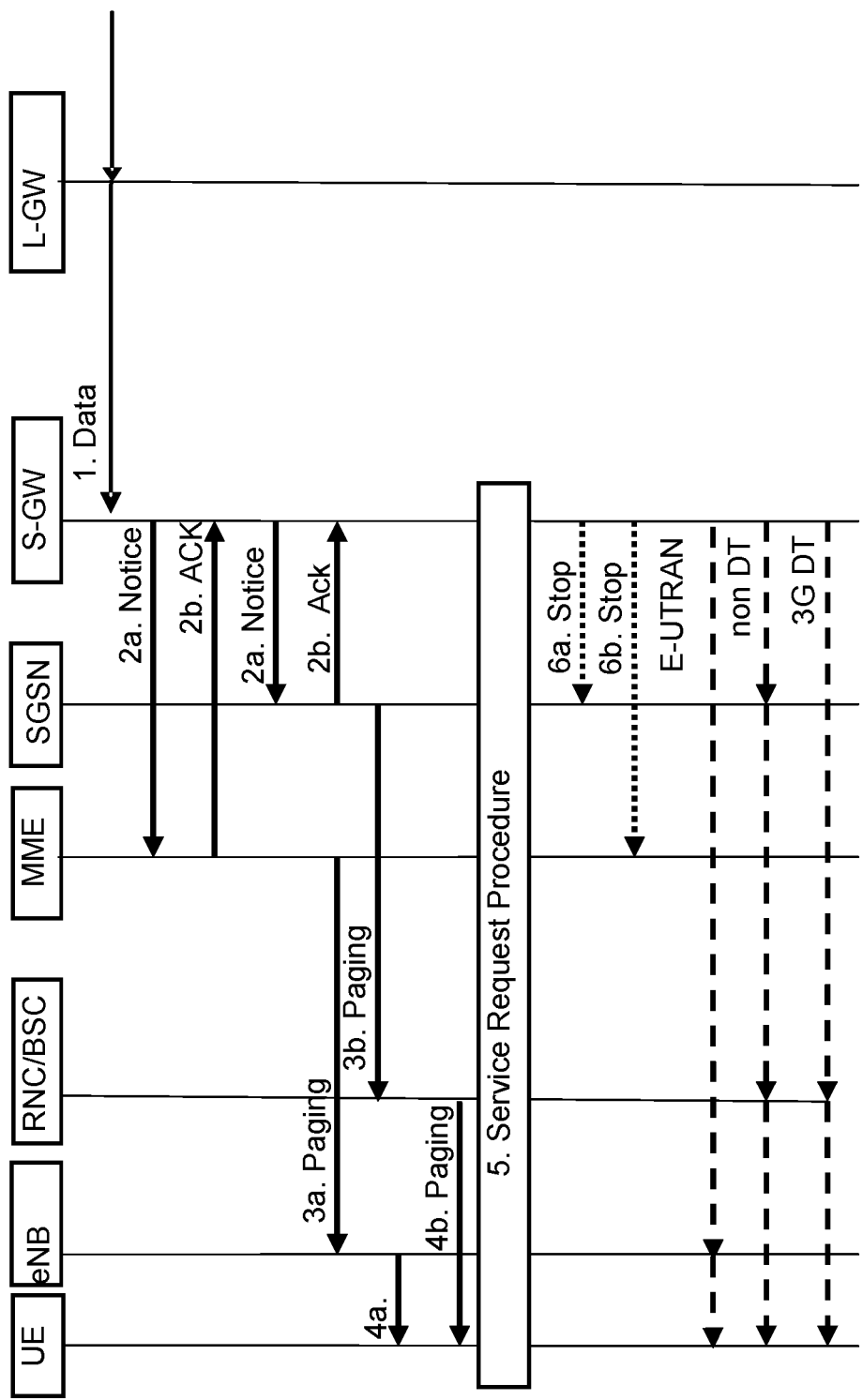
FIG. 9 is an example call flow for a network-triggered service request method.

LIPA enables a UE to access the available local IP services via a HeNB and a Local Gateway (L-GW), without the user plane traversing the mobile operator's network, except the HeNB, per clause 4.4.16 of TS 23.401. FIG. 8 depicts an example LIPA architecture for HeNB co-located with L-GW, which is currently the only scenario standardized for LIPA, per clause 4.4.9 of TS 23.401. A direct user plane is established between the HeNB and L-GW which is managed via a Correlation ID parameter. More precisely, the HeNB uses the Correlation ID to match the radio bearers (from the UE) with the direct user plane connections (from the L-GW). There is no support for LIPA dedicated bearer activation.

In FIG. 8, there is an S5 reference point between the L-GW and S-GW. Such a reference point is utilized in case the L-GW has downlink data to a UE, which is in ECM-IDLE state. In other words, when a local server (LS), not shown in FIG. 8, sends downlink data towards the L-GW and the target UE is in the ECM-IDLE state, the L-GW sends the first downlink packet to the S-GW. Accordingly, the S-GW triggers the MME to page the UE. Once the UE is in ECM-CONNECTED state, downlink data flows directly from the L-GW to the UE through the HeNB. See FIG. 9 and in clause 5.3.4.3 of TS 23.401.

Figure 10:
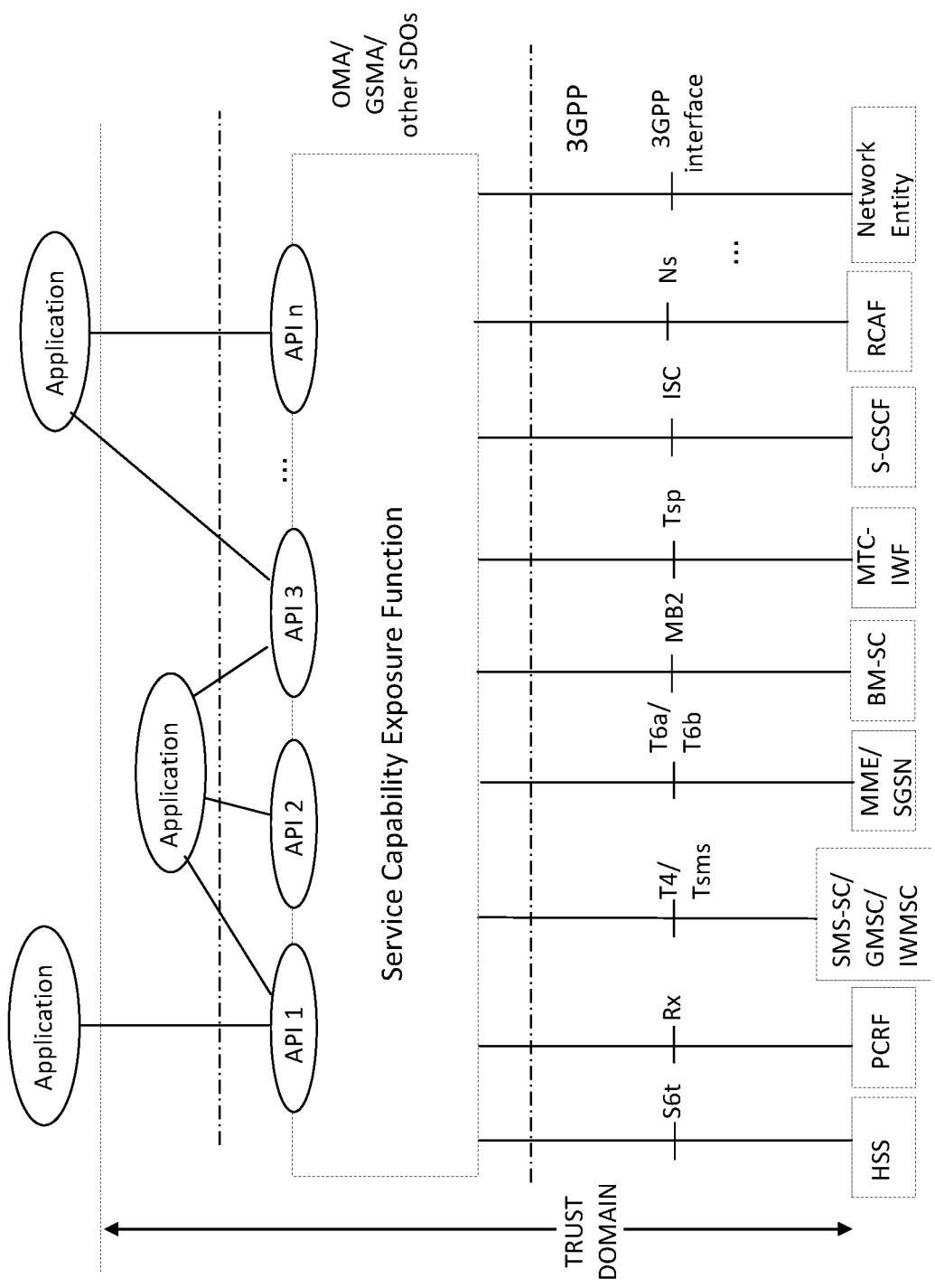
FIG. 10 is an example of a 3GPP SCEF architecture.

3GPP has a framework to expose underlying network capabilities to application/service providers in 3GPP TS 23.682, "Architecture Enhancements to facilitate communications with Packet Data Networks and Applications". This includes a function called a Service Capability Exposure Function (SCEF). The SCEF provides access to network capabilities through homogenous network application programming interfaces (e.g. Network API) defined by OMA, GSMA, and possibly other standardization bodies. The SCEF abstracts the services from the underlying 3GPP network interfaces and protocols. FIG. 10 is an example architecture showing an SCEF in relation to applications and an EPC. Although not shown in FIG. 10, a GMLC may be one of the Network Entities that may connect to the SCEF.

Figure 11:
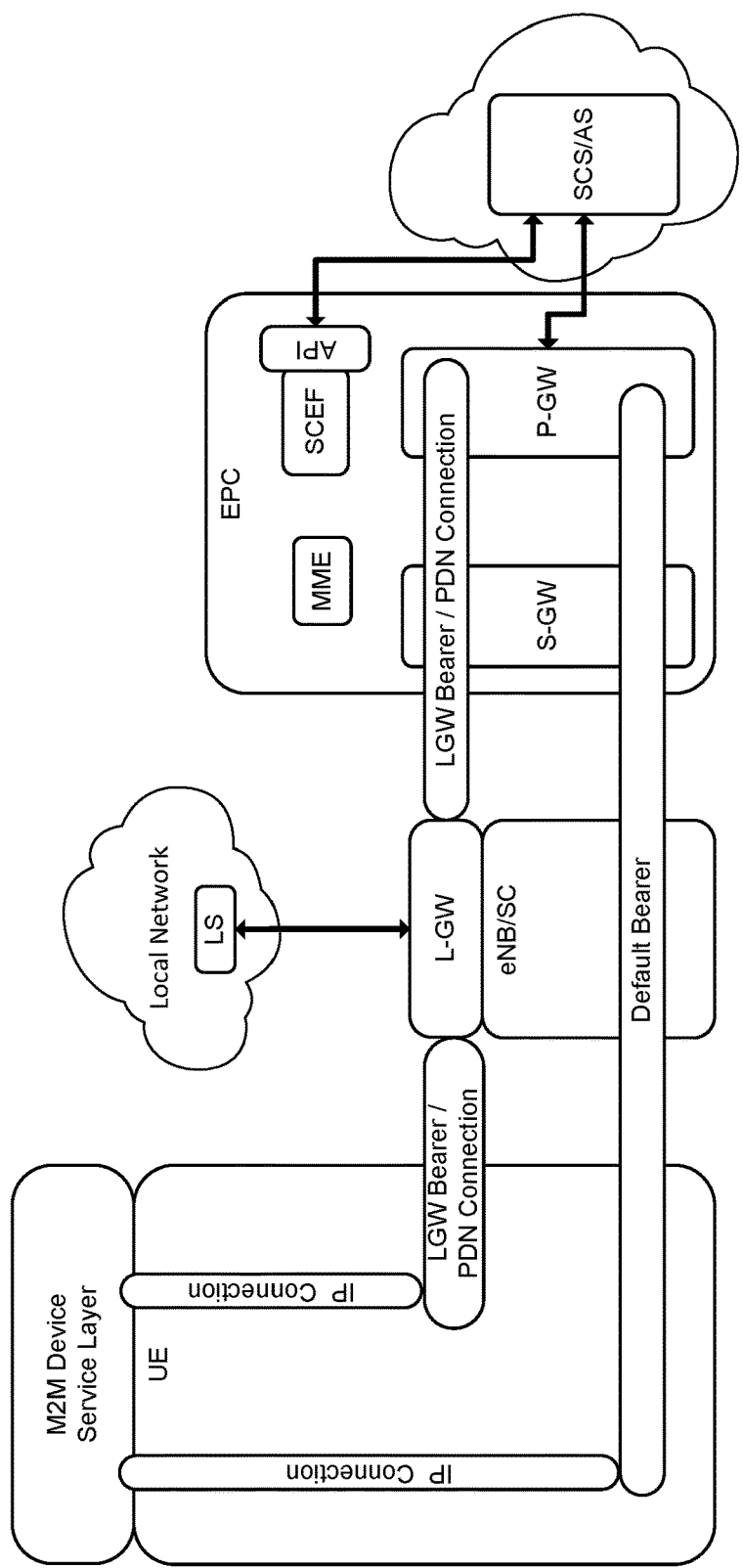
FIG. 11 is an example network architecture showing LGW-PGW bearer/PDN connections.

FIG. 11 shows an example network architecture showing LGW-PGW bearer/PDN connection. The UE has a default PDN connection with a default bearer to the SCS/AS. The UE also has a LIPA PDN connection. A tunnel between the L-GW and P-GW may be created such that the tunnel is associated with a particular SCS/AS or UE.

Figure 12:
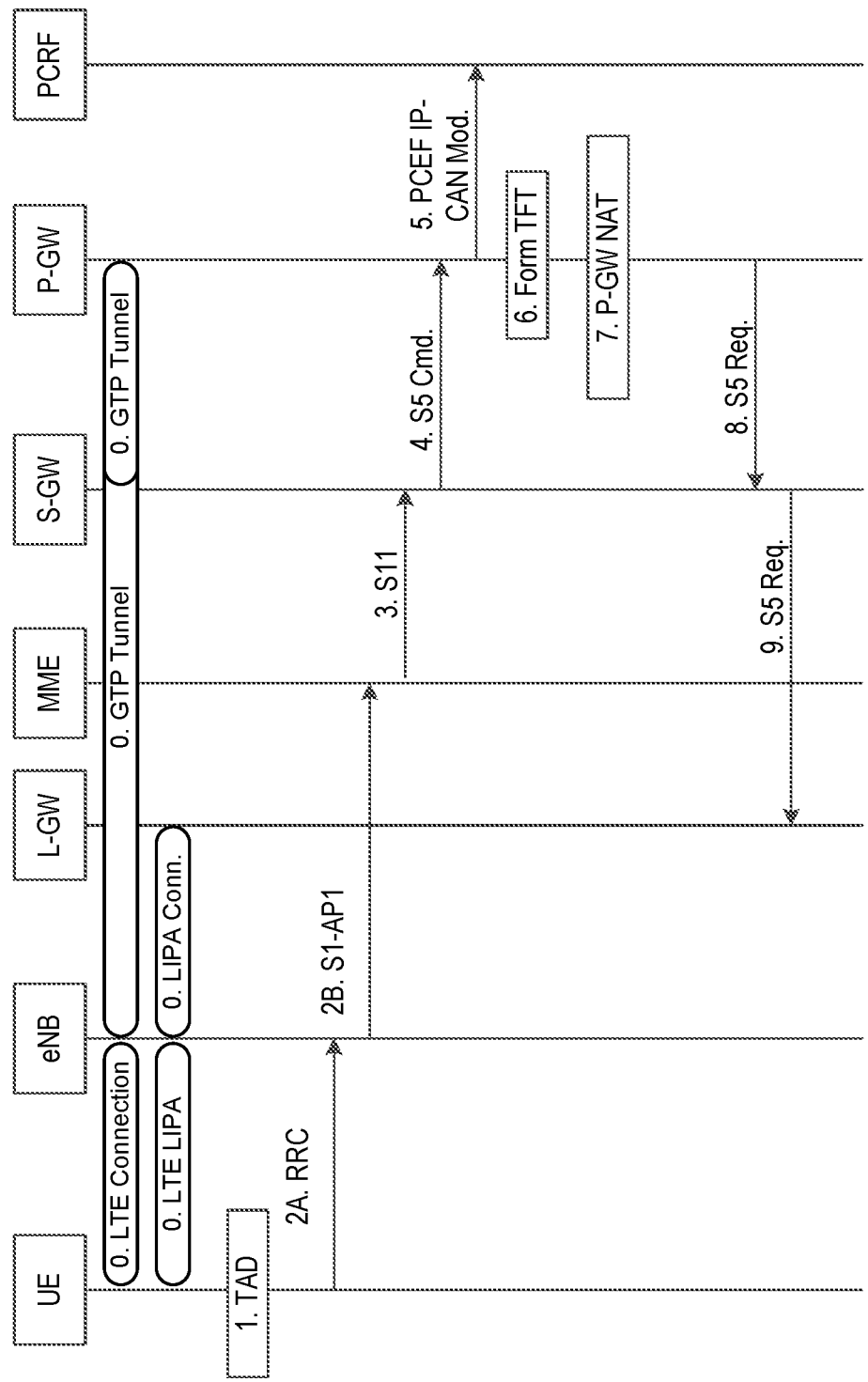
FIGS. 12 and 13 depict an example call flow for a UE-initiated LGW-PGW bearer creation method.
Figure 13:
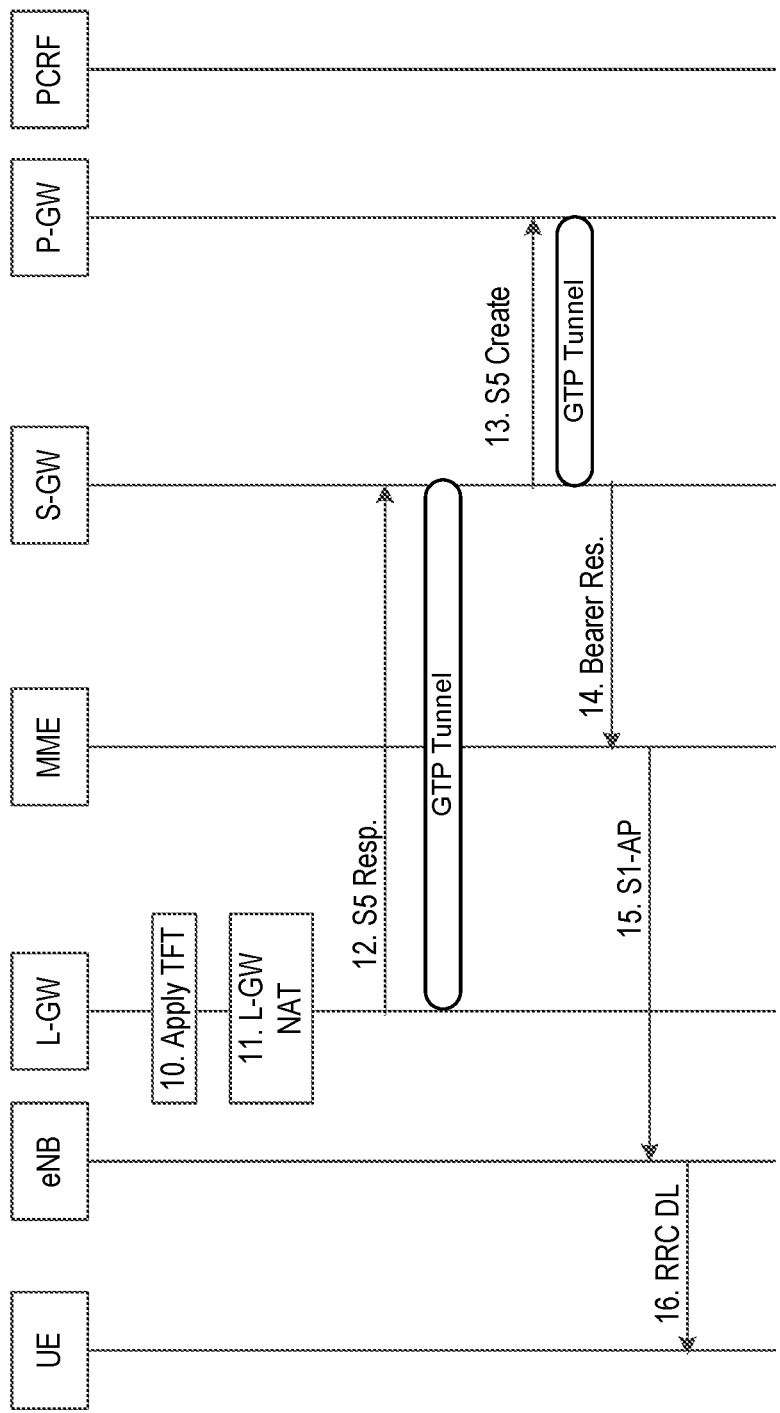
Figure 14:
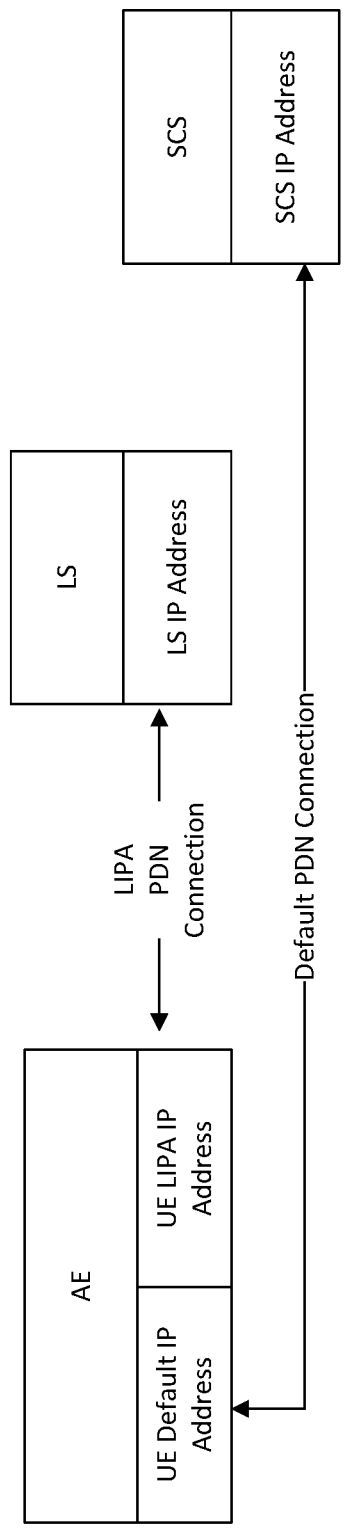
FIG. 14 depicts example IP address allocations to an AE, LS, and SCS.

FIGS. 12 and 13 show an example call flow whereby a UE initiates an LGW-PGW bearer creation. The UE may be aware that there is an LS that could share context information with an AS/SCS associated with the UE. For example, an LS may be able to tell the SCS/AS what stores are in close proximity to the UE so that the SCS/AS can push coupon offers to the UE. In such a situation, it is advantageous for the LS to be able to send data to the SCS/AS.

A UE may initiate an LGW-PGW bearer creation, with a minimum of radio signaling to the UE, via modification of the method for "UE Requested Bearer Resource Modification" described in clause 5.4.5 of TS 23.401 to establish a dedicated bearer between the UE and P-GW. Here, a bearer is established between the L-GW and P-GW instead.

Referring to FIG. 12, in step 0, a default PDN connection is established between the UE and the P-GW. Further, a LIPA connection is established between the UE and the L-GW. Consequently, the UE has two IP addresses: a public IP address that was allocated by the P-GW, and an LIPA IP address that was allocated by the L-GW. FIG. 13 illustrates the IP address allocations of the UE, LS, and SCS.

Referring again to FIG. 12, in step 1 the UE forms a Traffic Aggregate Description (TAD) that indicates that any data packet assigned to LS-PORT-NUM X should be sent over a new dedicated bearer. For example, while in communication with LS, the UE may recognize that it could benefit by allowing the LS to send context information to the SCS/AS directly. The UE may then decide that it wants to allow the LS to communicate with the SCS/AS so that context information can be sent to SCS/AS. The UE and LS may negotiate a port number that will be used for LS-to-SCS/AS communication, the LS may inform the UE of what port number will be used, or the UE may inform the LS of what port number will be used for LS-to-SCS/AS communication. Alternatively, a well-known port number may be used.

Next the UE sends an RRC "UL Information Transfer" (NAS-PDU) message 2A from the UE to the eNB. Message 2A contains NAS-PDU "Request Bearer Resource Modification" (LBI, PTI, EPS Bearer Identity, QoS, TAD, Bind-To-LGW-Flag, LS-IP-ADDRESS, Protocol Configuration Options) information. The eNB conveys the UE's NAS message 2A in an S1-AP "Uplink NAS Transport" (NAS-PDU, L-GW Transport Layer Address or Local Home Network ID) message 2B. The inclusion of the L-GW address is indicated in clause 8.6.2.3 of 3GPP TS 36.413, "Evolved Universal Terrestrial Radio Access Network (E-UTRAN); S1 Application Protocol (S1AP)," V12.1.0, March 2014. As indicated in Section 5.4.5 of TS 23.401, the UE sends the Linked Bearer Id (LBI) only when the requested operation is "add" to indicate to which PDN connection the additional bearer resource is linked to. The Procedure Transaction Identifier (PTI) is dynamically allocated by the UE for this procedure. The TAD indicates one requested operation (add) and includes the packet filter(s) to be added, which is formed in the previous step. By adding the Bind-To-LGW-Flag IE, the UE is able to inform the MME that this is a special request to create bearer between the L-GW and P-GW. Finally, the LS-IP-ADDRESS is the local (LIPA) IP address of the LS.

The inclusion of the Bind-To-LGW-Flag IE causes the MME to allocate a new bearer ID, namely, LGW-Bearer-ID, to reference the bearer between the L-GW and P-GW. The MME then sends the "Bearer Resource Command" (IMSI, LBI, PTI, EPS Bearer Identity, QoS, TAD, LS-IP-ADDRESS, Protocol Configuration Options, Bind-To-LGW-Flag, LGW-Bearer-ID, L-GW Address or Local Home Network ID) message 3 to the S-GW. For convenience, we will refer to the "L-GW Transport Layer Address" as the "L-GW Address".

The serving gateway (S-GW) forwards the MME message by sending a "Bearer Resource Command" (IMSI, LBI, PTI, EPS Bearer Identity, QoS, TAD, LS-IP-ADDRESS, Protocol Configuration Options, Bind-To-LGW-Flag, LGW-Bearer-ID, L-GW address or Local Home Network ID) message 4 to the P-GW.

The P-GW then sends a IP-CAN Session modification (TAD, Bind-To-LGW-Flag, LGW-Bearer-ID) message 5 to the PCRF. The 'Bind-To-LGW-Flag' is included to indicate to the PCRF that the newly requested bearer is associated with an LS, rather than a UE.

In step 6, the P-GW processes message 5. If the request 5 is accepted, the P-GW adds the received TAD from the UE to form an updated Traffic Flow Template (TFT). The TFT will be used to link packet data to be sent over LS-PORT-NUM X to the LGW-Bearer-ID dedicated bearer.

In step 7, the P-GW will create a new Network Address Translation (NAT) entry indicating that if data to be sent over LS-PORT-NUM X and the destination IP address is the UE's default IP address (UE-IP-Address), the local LS IP address (LS-IP-ADDRESS) should be used in place of the UE's IP Address (UE-IP-ADDRESS).

Normally, a NAT is formed in the P-GW. That logical function typically resides in the (S)Gi-LAN. To effect the call flow depicted in FIG. 12, it is not necessary to locate all NAT functionality at the P-GW. Rather, the P-GW need only be responsible for charging the destination IP address of specific traffic flows that match specific TFT rules. In this example, the destination IP address of IP packets that are addressed to the UE's IP address and LS-PORT-NUM will be changed to the local LS IP address (LS-IP-ADDRESS). Alternatively, the P-GW may be allowed to configure an external NAT function with this rule. See FIG. 15.

The P-GW then initiates steps similar to the "Dedicated Bearer Activation" procedure of clause 5.4.1.1 of TS 23.401. The P-GW sends a "Create Bearer Request" (IMSI, PTI, EPS Bearer QoS, TFT, P-GW S5 TEID, Charging Id, LBI, Protocol Configuration Options, SCS-IP-ADDRESS, UE-IP-ADDRESS) message 8 to the S-GW over the S5 interface. The PTI parameter is included to correlate message 8 to the request in message 4. The PTI parameter is only used when the procedure was initiated by a "UE Requested Bearer Resource Modification" procedure, which is the case here. The PTI will be used also in the end of this call flow to inform the UE about the success of the bearer request. Given that the PTI IE exists, there is no need to include the 'LGW-Bearer-ID' IE, since the S-GW already knows both IEs.

In turn, the S-GW sends a "Create Bearer Request" (IMSI, PTI, EPS Bearer QoS, TFT, S-GW TEID, P-GW TED, LBI, Protocol Configuration Options, LGW-Bearer-ID, SCS-IP-ADDRESS, UE-IP-ADDRESS) message 9 to the L-GW over the S5 interface. The S1-TEID IE (to eNB), which would normally have been used to identify the eNB to S-GW tunnel, is replaced by an S-GW TEID which identifies an L-GW to S-GW tunnel. Further, 'LGW-Bearer-ID', SCS-IP-ADDRESS, and UE-IP-ADDRESS IEs are included in the "Create Bearer Request" message to the L-GW. The PTI is not known by the L-GW, and so having both the PTI and 'LGW-Bearer-ID' IEs this message is advantageous. Finally, the TFT is included to carry the TFT rules to the L-GW.

The call flow of FIG. 12 is continued in FIG. 13. In step 10, the L-GW applies the received TFT to link packet data to be sent over LS-PORT-NUM X to the LGW-Bearer-ID dedicated bearer.

Figure 16:
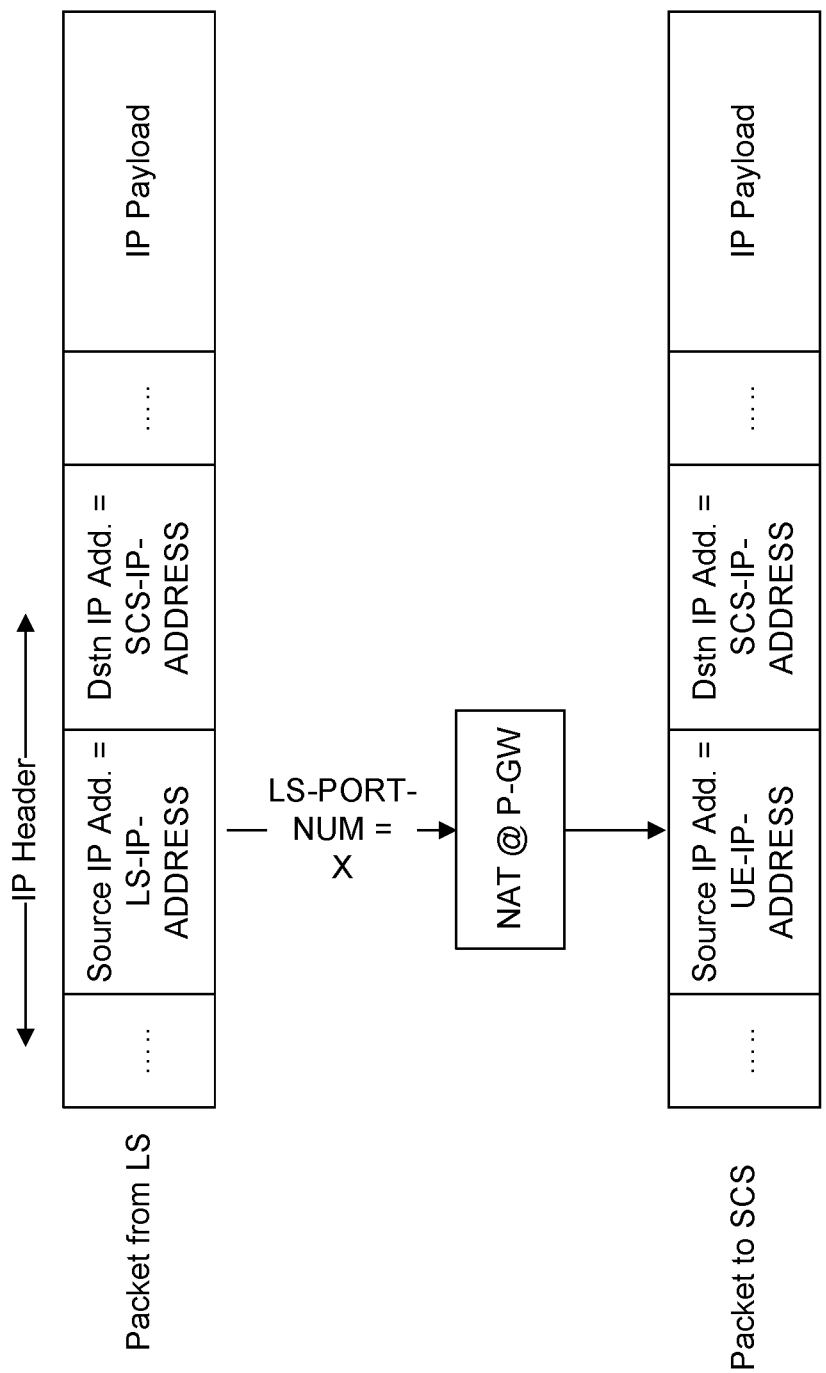
FIG. 16 depicts the relationship of data in packets for the uplink of NAT data to an SCS.

In step 11, the L-GW creates a new NAT entry indicating that, if data is to be sent over the LIPA connection from the LS using LS-PORT-NUM X and the destination IP address is SCS (SCS-IP-ADDRESS), the source Address should be changed to the UE's public IP address (UE-IP-ADDRESS). The SCS-IP-ADDRESS and UE-IPADDRESS were received in step 9. This action is illustrated in FIG. 16.

Referring again to FIG. 13, the L-GW acknowledges the bearer activation to the S-GW by sending a "Create Bearer Response" (LGW-Bearer-ID, LGW-TEID) message 12 to the S-GW. A GTP tunnel between the L-GW and S-GW is now created.

Next, the S-GW acknowledges the bearer activation to the P-GW by sending a "Create Bearer Response" (LGW-Bearer-ID, SGW-TEID) message 13. A GTP tunnel between the P-GW and the S-GW is now created.

As the complete tunnel between the P-GW and the L-GW is now established through the S-GW, the S-GW sends a new "Bearer Resource Response" (LGW-Bearer-ID) message 14 to the MME to indicate the success of creating the GTP tunnel between L-GW and P-GW.

The MME conveys the success by sending a NAS "Bearer Resource Modification Response" (PTI, LGW-Bearer-ID) message 15 to the eNB, which forwards the success to the UE in message 16. This message, which is not included in the standard dedicated bearer activation procedure, informs the UE about the success of its request. Prior to receiving message 16 the UE knows only the PTI, and does not know the LGW-Bearer-ID. Once the UE receives this response message 16, identified by the PTI, the UE knows that its request is successful and that the LGW-Bearer-ID is the newly created bearer ID between the L-GW and P-GW. The NAS-PDU is sent first from the MME to the eNB using the S1-AP "Downlink NAS Transport" (NAS-PDU) message 15. The NAS-PDU is next forwarded to the UE in the "DL Information Transfer" (NAS-PDU) message 16.

Standard protocol messages for "UE requested bearer activation" and "Dedicated bearer activation" procedures may be adapted to support the establishment of a bearer between the L-GW and P-GW. Referring again to FIG. 2, a UE sends an NAS "Request Bearer Resource Modification" message 1 to the MME, Here, in addition to the LBI, PTI, EPS Bearer Identity, QoS, TAD, and Protocol Configuration Options information, message 1 also includes a Bind-To-LGW-Flag, LIPA-APN, and LS-IP-ADDRESS information. As indicated in Section 5.4.5 of TS 23.401, the UE sends the Linked Bearer Id (LBI) only when the requested operation is add to indicate to which PDN connection the additional bearer resource is linked to. The TAD indicates one requested operation (add) and includes the packet filter(s) to be added. The Bind-To-LGW-Flag tells the MME that this is a special request to create a new bearer. This new bearer will not be used by the UE to send and receive data. Instead, it will be used by a service in the local network to send data via the L-GW. The LIPA-APN is used by the MME to determine the L-GW Identity. The LS-IP-ADDRESS is the IP address of the LS.

Next, the MME sends a "Bearer Resource Command" message 2 to the S-GW. Here, in addition to the IMSI, LBI, PTI, EPS Bearer Identity, QoS, TAD, and Protocol Configuration Options, message 2 also includes a Bind-To-LGW-Flag, L-GW Address, and an LS-IP-ADDRESS. The Bind-To-LGW-Flag tells the S-GW that this new bearer will be bound to the L-GW. This new bearer will be used by a service in the local network to send data via the L-GW. The L-GW Address, or a Local Home Network ID, identifies the particular L-GW that is associated with the LIPA-APN that was provided in message 1.

The S-GW sends a Bearer Resource Command message 3 to the P-GW. Here, in addition to the IMSI, LBI, PTI, EPS Bearer Identity, QoS, TAD, and Protocol Configuration Options, message 3 includes a Bind-To-LGW-Flag and LS-IP-ADDRESS.

At this point, a dedicated bearer activation procedure will be executed, shown in FIGS. 3 and 4 and described in section 5.4.1 of TS 23.401, with some differences. Here, the messages in FIGS. 3 and 4 include the Bind-To-LGW-Flag, L-GW Address or Local Home Network ID, SCS-IP-ADDRESS, and UE-IP-ADDRESS IE's.

Figure 15:
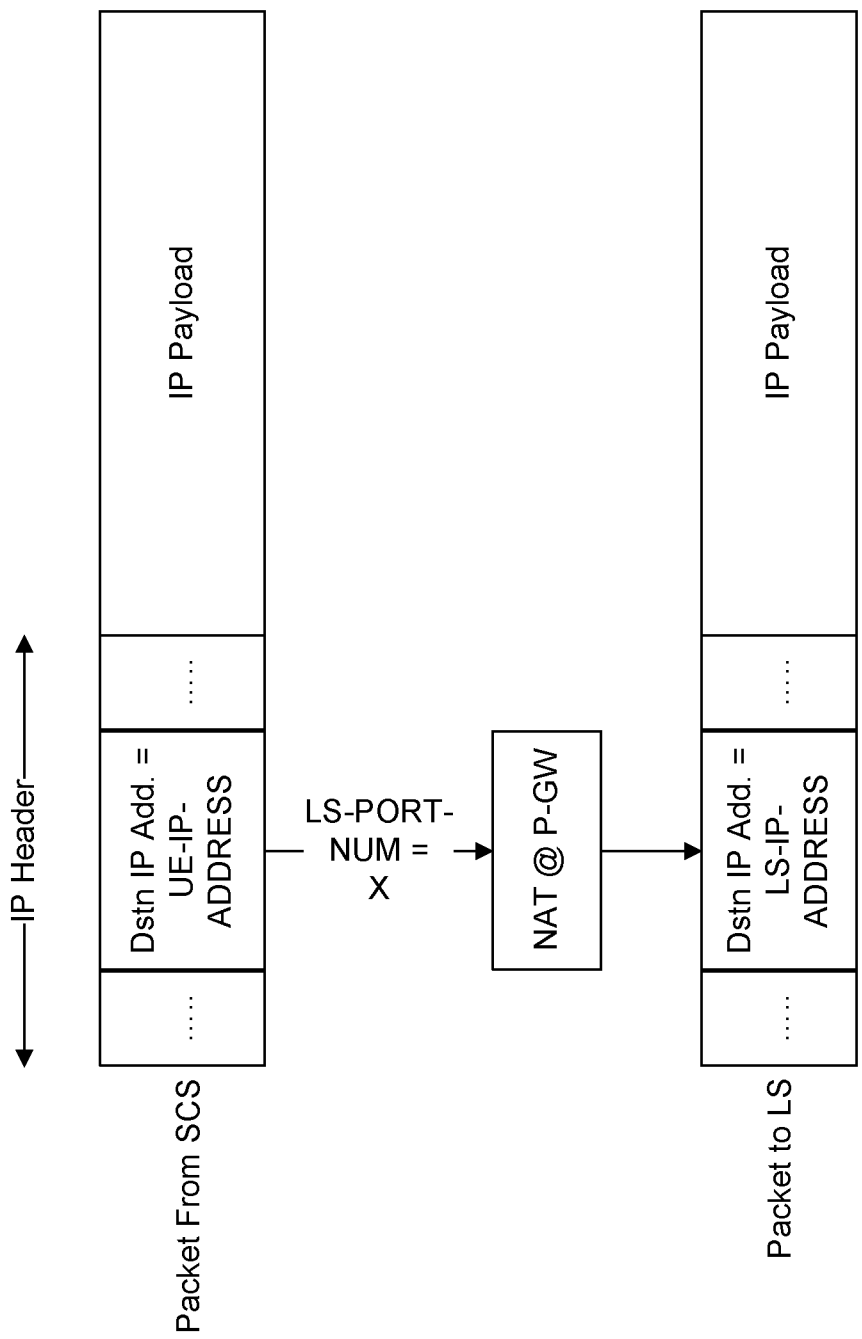
FIG. 15 depicts the relationship of data in packets for the downlink of NAT data from an SCS.

Further, not shown in FIG. 4, after step 11, the S-GW sends a Create Session Request to the L-GW. The L-GW responds with a Create Session Response to the S-GW (P-GW Address for the user plane, P-GW TEID of the user plane, P-GW TED of the control plane, PDN Type, PDN Address, EPS Bearer Id, EPS Bearer QoS, Protocol Configuration Options, Charging Id, Prohibit Payload Compression, APN Restriction, Cause, MS Info Change Reporting Action (Start) (if the P-GW decides to receive UE's location information during the session), CSG Information Reporting Action (Start) (if the P-GW decides to receive UE's User CSG information during the session), Presence Reporting Area Action (if the P-GW decides to receive notifications about a change of UE presence in Presence Reporting Area), PDN Charging Pause Enabled indication (if P-GW has chosen to enable the function), APN-AMBR). The NAT at the P-GW and L-GW is similar to what is shown in FIGS. 15 and 16.

Figure 17:
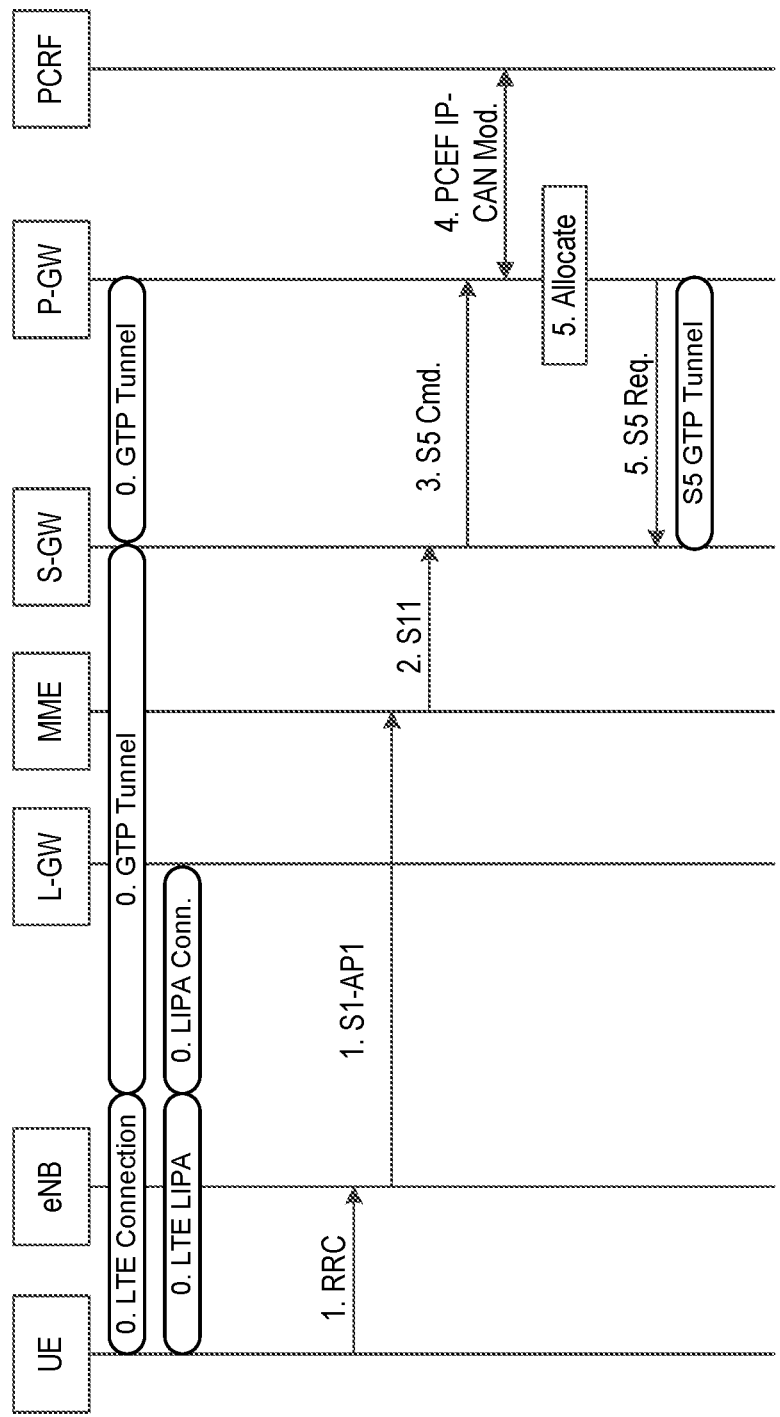
FIGS. 17 and 18 depict an example call flow for a UE-initiated LGW-PGW session creation method.
Figure 18:
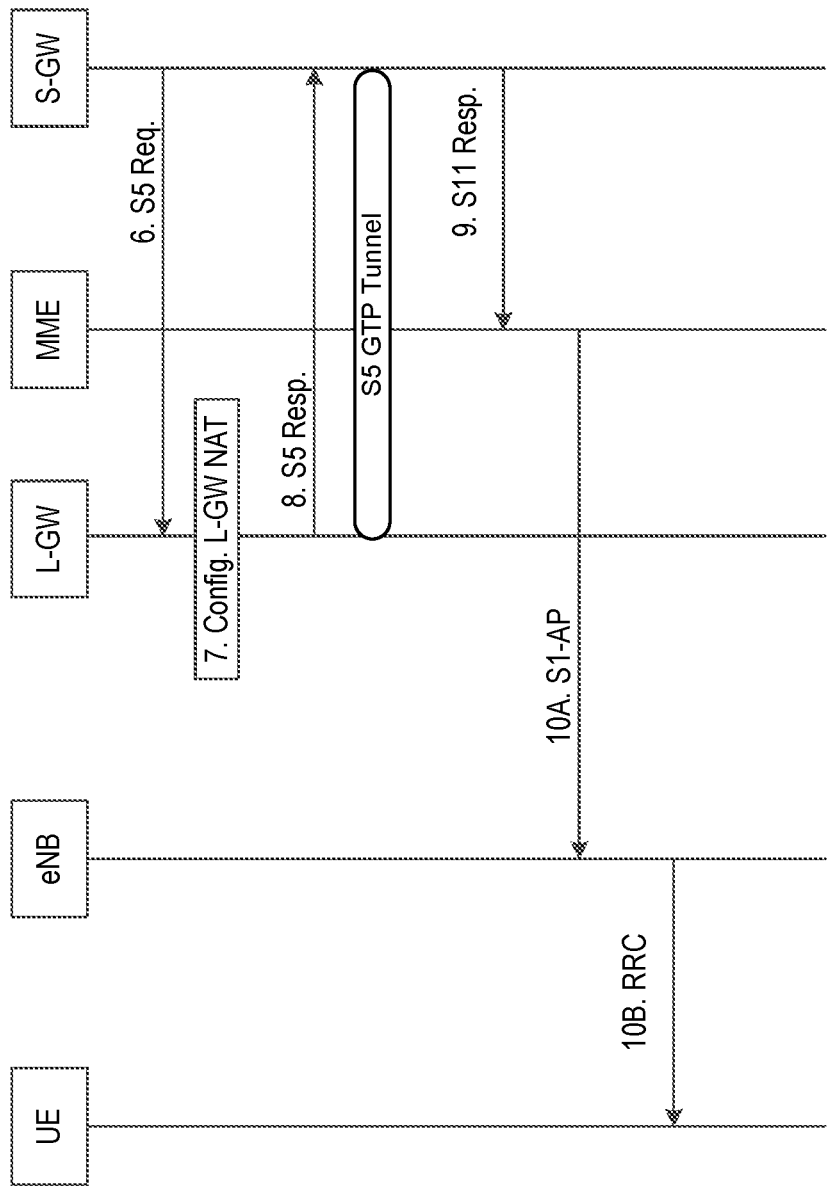

FIGS. 17 and 18 show an example call flow whereby a UE initiates the creation of a new connection between an L-GW and a P-GW. The call flow is similar to the "UE Requested PDN Connectivity" method presented in clause 5.10.2 of TS 23.401, with some modifications.

Referring to FIG. 17. In step 0, a default PDN connection is established between a UE and a PDN gateway (P-GW), and a LIPA connection is established between the UE and the L-GW. Consequently, the UE has a public IP address, allocated by the P-GW. Furthermore, the UE has a different local IP address, allocated by the L-GW.

The UE intends to send a NAS-PDU "PDN Connectivity Request" (APN, LIPA-APN, PDN Type, Protocol Configuration Options, Request Type, Bind-To-LGW-Flag) to the MME. This is done in two steps. First the NAS-PDU is carried in an RRC "UL Information Transfer" (NAS-PDU) in message 1A from the UE to the eNB. This is indicated in clause 5.6.2 of 3GPP TS 36.331, "Radio Resource Control (RRC) Protocol specification," V12.1.0, March 2014.

Second, the eNB conveys the UE's NAS information in a S1-AP "Uplink NAS Transport" (NAS-PDU, L-GW Transport Layer Address) message 1b. This is indicated in clause 8.6.2.3 of TS 36.413.

In addition, a 'Bind-To-LGW-Flag' IE may be used to inform the MME that this is a special request to create a new PDN connection between the L-GW and P-GW. Furthermore, a LIPA-APN IE may be used to indicate the APN of the local service.

From the 'Bind-To-LGW-Flag' IE in message 1A, the MME understands that this request is related to connection between LGW and P-GW. Accordingly, the MME allocates a special bearer Id (LGW-Bearer-ID) and sends message 2 to the S-GW. Message 2 contains a "Create Session Request" (IMSI, MSISDN, MME TEID for control plane, RAT type, P-GW address, L-GW Address or Local Home Network ID, Default EPS Bearer QoS, PDN Type, subscribed APN-AMBR, APN, LIPA-APN, LGW-Bearer-ID, Protocol Configuration Options, Handover Indication, ME Identity, User Location Information (ECGI), UE Time Zone, User CSG Information, MS Info Change Reporting support indication, Selection Mode, Charging Characteristics, Trace Reference, Trace Type, Trigger Id, OMC Identity, Maximum APN Restriction, Dual Address Bearer Flag, Bind-To-LGW-Flag). In this way, the MME conveys the LIPA-related parameters (LIPA-APN, L-GW Address or Local Home Network ID) to the S-GW.

Next the S-GW creates a new entry in its EPS Bearer table and sends message 3 to the P-GW indicated in the P-GW address received in message 2. Message 3 contains a "Create Session Request" (IMSI, MSISDN, S-GW Address for the user plane, S-GW TEID of the user plane, S-GW TEID of the control plane, RAT type, Default EPS Bearer QoS, PDN Type, subscribed APN-AMBR, APN, LGW-Bearer-ID, Protocol Configuration Options, Handover Indication, ME Identity, User Location Information (ECGI), UE Time Zone, User CSG Information, MS Info Change Reporting support indication, PDN Charging Pause Support indication, Selection Mode, Charging Characteristics, Trace Reference, Trace Type, Trigger Id, OMC Identity, Maximum APN Restriction, Dual Address Bearer Flag, Bind-To-LGW-Flag). There is no need to convey the 'L-GW Address' or Local Home Network ID IEs to the P-GW. This information needs to be available at the S-GW.

In message 4, the P-GW initiates IP-CAN Session modification to the PCRF carrying the (Bind-To-LGW-Flag, LGW-Bearer-ID) information. The 'Bind-To-LGW-Flag' is included to indicate to the PCRF that the newly requested PDN connection is associated with an LS, rather than a UE.

In step 5A, the P-GW creates a new entry in its EPS bearer context table and generates a 'LGW-Charging Id' for the LGW-Bearer-ID Bearer. The new entry allows the P-GW to route user plane PDUs between the S-GW and the packet data network, and to start charging. Furthermore, the P-GW allocates a new IP address to be assigned to the LS, namely, 'LS-IP-ADDRESS-new'. The P-GW may include the IP address of the SCS 'SCS-IP-ADDRESS', to be used in the NAT function at the L-GW.

The P-GW returns message 5B to the S-GW. Message 5B contains a "Create Session Response" (P-GW Address for the user plane, P-GW TED of the user plane, P-GW TEID of the control plane, PDN Type, LS-IPADDRESS-new, LGW-Bearer-ID, EPS Bearer QoS, Protocol Configuration Options, LGW-Charging Id, Prohibit Payload Compression, APN Restriction, Cause, PDN Charging Pause Enabled indication (if P-GW has chosen to enable the function), APN-AMBR, SCS-IP-ADDRESS)S-GW, establishing a GTP tunnel between the S-GW and P-GW.

The call flow of FIG. 17 is continued in FIG. 18. The S-GW initiates S-GW a GTP tunnel to the L-GW by sending S-GW message 6 to the L-GW indicated in the L-GW Address or Local Home Network ID specified in message 2. Message 6 contains a "Create Session Request" (IMSI, MSISDN, S-GW Address for the user plane, S-GW TED of the user plane, S-GW TEID of the control plane, RAT type, Default EPS Bearer QoS, PDN Type, LS-IP-ADDRESS-new, SCS-IP-ADDRESS, subscribed APN-AMBR, LIPA-APN, LGW-Bearer-ID, Protocol Configuration Options, Handover Indication, ME Identity, User Location Information (ECGI), UE Time Zone, User CSG Information, MS Info Change Reporting support indication, PDN Charging Pause Support indication, Selection Mode, Charging Characteristics, Trace Reference, Trace Type, Trigger Id, OMC Identity, Maximum APN Restriction, Dual Address Bearer Flag, Bind-To-LGW-Flag). The 'LIPA-APN' is included in this step as it is targeting a session to the L-GW. Furthermore, the 'LS-IP-ADDRESS-new' and 'SCS-IP-ADDRESS' IP addresses are included to be used in the NAT construction at the L-GW.

Figure 19:
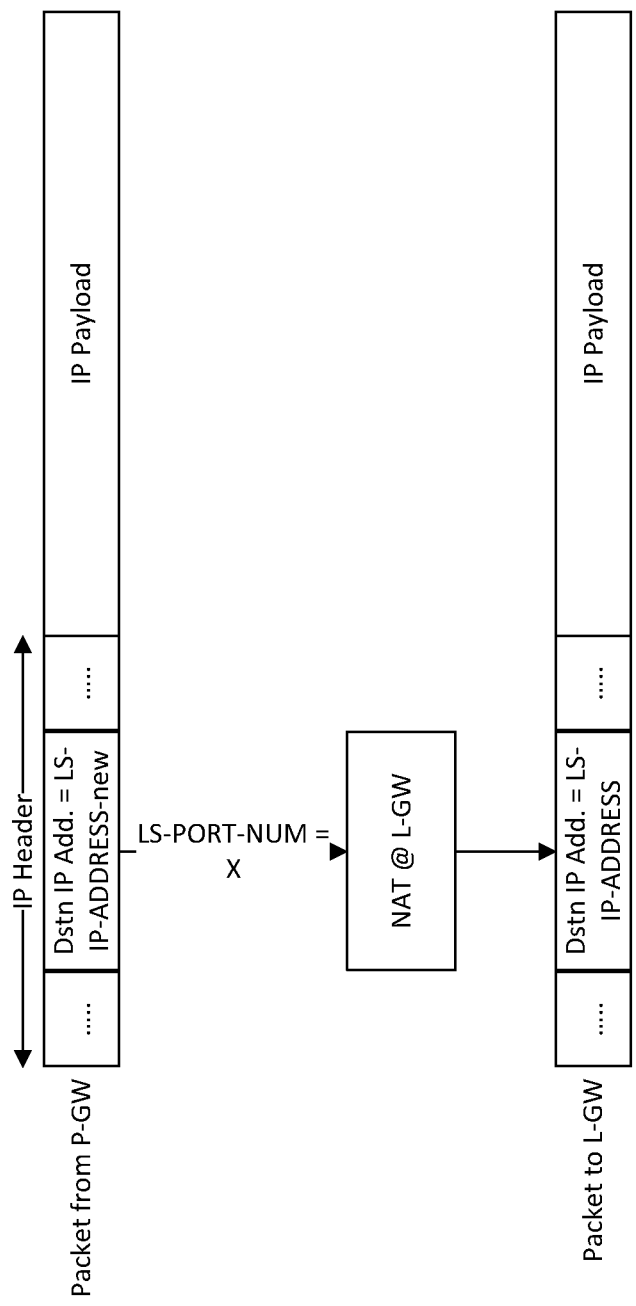
FIG. 19 depicts the relationship of data in packets for the downlink of NAT data to an L-GW.
Figure 20:
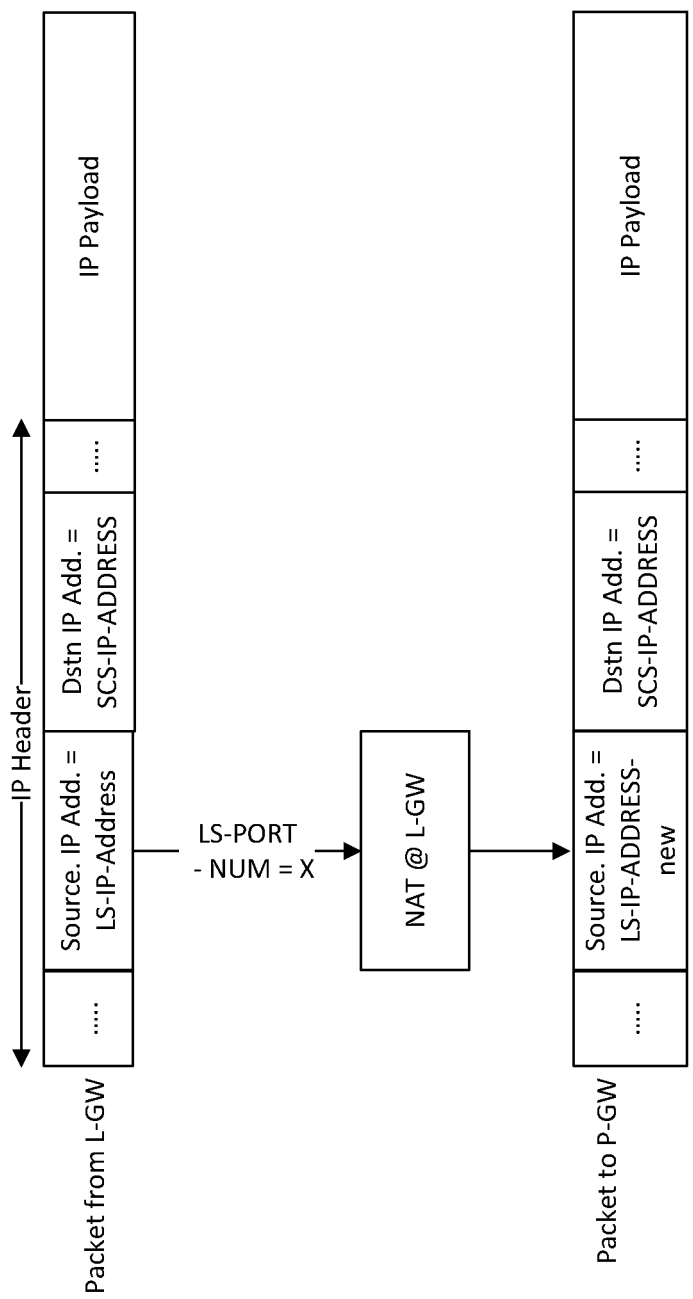
FIG. 20 depicts the relationship of data in packets for the uplink of NAT data from an L-GW.

In step 7, the L-GW associates the PDN connection with a new IP address 'LS-IP-ADDRESS—new'. Normally, this IP address would be used by the UE. However, this IP address will be used by the LS. Accordingly in order to route the traffic between the SCS and LS, the L-GW establish a NAT. FIGS. 19 and 20 illustrate the NAT function that will be performed at the L-GW. The LS-IP-ADDRESS is the local LS IP address over the LIPA connection.

Referring again to FIG. 18, in step 7 the L-GW further creates a new entry in its EPS bearer context table. This is analogous to step 5A performed by the P-GW. The new entry allows the L-GW to route user plane PDUs between the S-GW and the LIPA packet data network.

In message 8, the L-GW returns to the S-GW a "Create Session Response" (L-GW Address or Local Home Network ID for the user plane, L-GW TEID of the user plane, L-GW TEID of the control plane, PDN Type, LGW-Bearer-ID, EPS Bearer QoS, Protocol Configuration Options, Prohibit Payload Compression, APN Restriction, Cause, APN-AMBR), establishing S-GW a GTP tunnel between the S-GW and L-GW. The L-GW will not generate a new charging ID, as the P-GW will be the one responsible for charging the new LGW-P-GW connection using the 'LGW-Charging Id' create in steps 5A and 5B.

Once the S-GW creates a tunnel with the P-GW and L-GW, in message 9 the S-GW acknowledges the MME's request by sending to the MMW a "Create Session Response" (PDN Type, IP-UE-new, S-GW address for User Plane, S-GW TEID for User Plane, S-GW TEID for control plane, LGW-Bearer-ID, EPS Bearer QoS, P-GW address and TEID, L-GW address or Local Home Network ID, Protocol Configuration Options, Prohibit Payload Compression, APN Restriction, Cause, MS Info Change Reporting Action (Start), CSG Information Reporting Action (Start), Presence Reporting Area Action, APN-AMBR).

The MME acknowledges the UE's request by sending a NAS PDU "PDN Connectivity Accept" (APN, LIPA-APN, PDN Type, IP-UE-new, LGW-Bearer-ID, Session Management Request, Protocol Configuration Options) message 10A to eNB. Message 10A using an S1-AP "Downlink NAS Transport" (NAS-PDU) format.

The eNB forwards to the NAS-PDU information to the UE in a "DL Information Transfer" (NAS-PDU) message 10AB.

When multiple requests are initiated by multiple UEs to establish the same LS-SCS (LGW-PGW) connection, the P-GW accepts the request of the first UE to establish such connection. The subsequent requests are not be executed by the P-GW, and acknowledgements would be sent to the subsequent requesting UEs indicating that the new dedicated bearer or PDN connection is already established. The 'LGW-Bearer-ID' is included in such acknowledgement messages.

Figure 21:
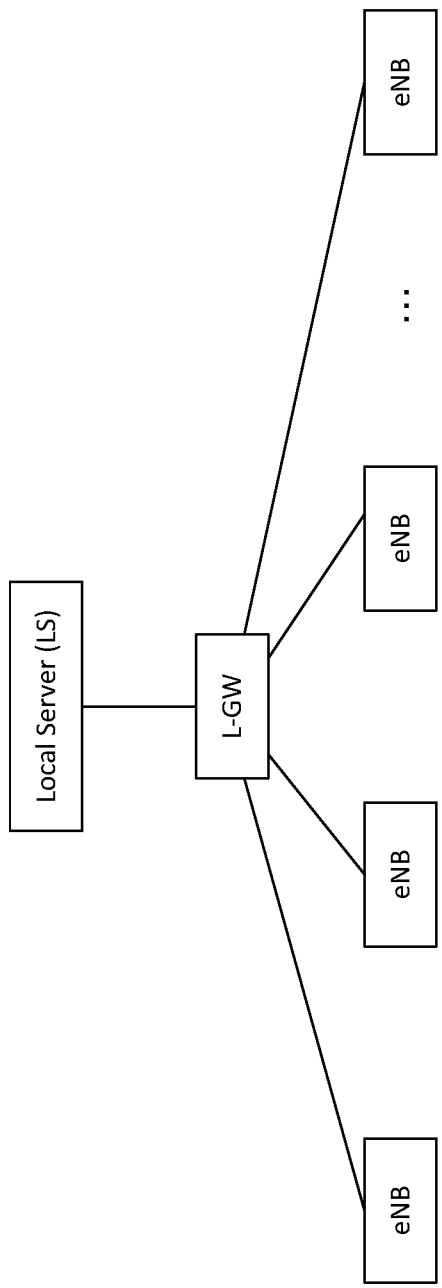
FIG. 21 is an example network architecture in which multiple eNBs connected to one L-GW.

FIG. 21 shows an example configuration where an L-GW is connected to multiple eNBs. For example, the eNBs may be deployed at Road Side Units (RSUs) distributed across a certain geographic area, where the RSUs are all connected to one L-GW, and where the L-GW in turn is connected to a Location Server (LS), whereby the LS captures and provides information about the area covered by the multiple eNBs.

Referring to FIG. 21, for a LIPA connection to exist between a UE and a L-GW, as discussed in reference to FIGS. 12, 13, 17, and 18, there will be a GTP tunnel between the eNB and L-GW. This is similar to the GTP tunnel that can exist between the eNB and S-GW over the S1-U reference point. Consequently, the eNB knows the L-GW IP address, which is required to construct the GTP tunnel. The L-GW IP address can therefore be used by the eNBs, for UE-initiated LGW-PGW bearer creation and UE-initiated LGW-PWG new PDN connection creation For example, in FIG. 12 the eNB and L-GW are collocated. The eNB conveys the information in the UE's NAS message 2A via the S1-AP "Uplink NAS Transport" message 2B, including the NAS-PDU and the L-GW address or Local Home Network ID. In the multiple-eNB scenario of FIG. 21, the eNB may include the L-GW address or Local Home Network ID in a S1-AP "Uplink NAS Transport" message sent the MME.

Similarly, in FIG. 17, the eNB and L-GW are collocated. The UE sends the LIPA-APN in the NAS "PDN Connectivity Request" message 1A to the eNB. The eNB appends the L-GW address or Local Home Network ID in the S1-AP "Uplink NAS Transport" message 1B sent to the MME. In the multiple-eNB scenario shown in FIG. 21, the eNB may include the L-GW IP address in the S1-AP "Uplink NAS Transport" message to the MME. Thereby an eNB may learn the L-GW IP address as a part of establishing the GTP tunnel between itself and L-GW. This does not require a change to the NAS message from the UE carrying the LIPA-APN to the MME.

Figure 22:
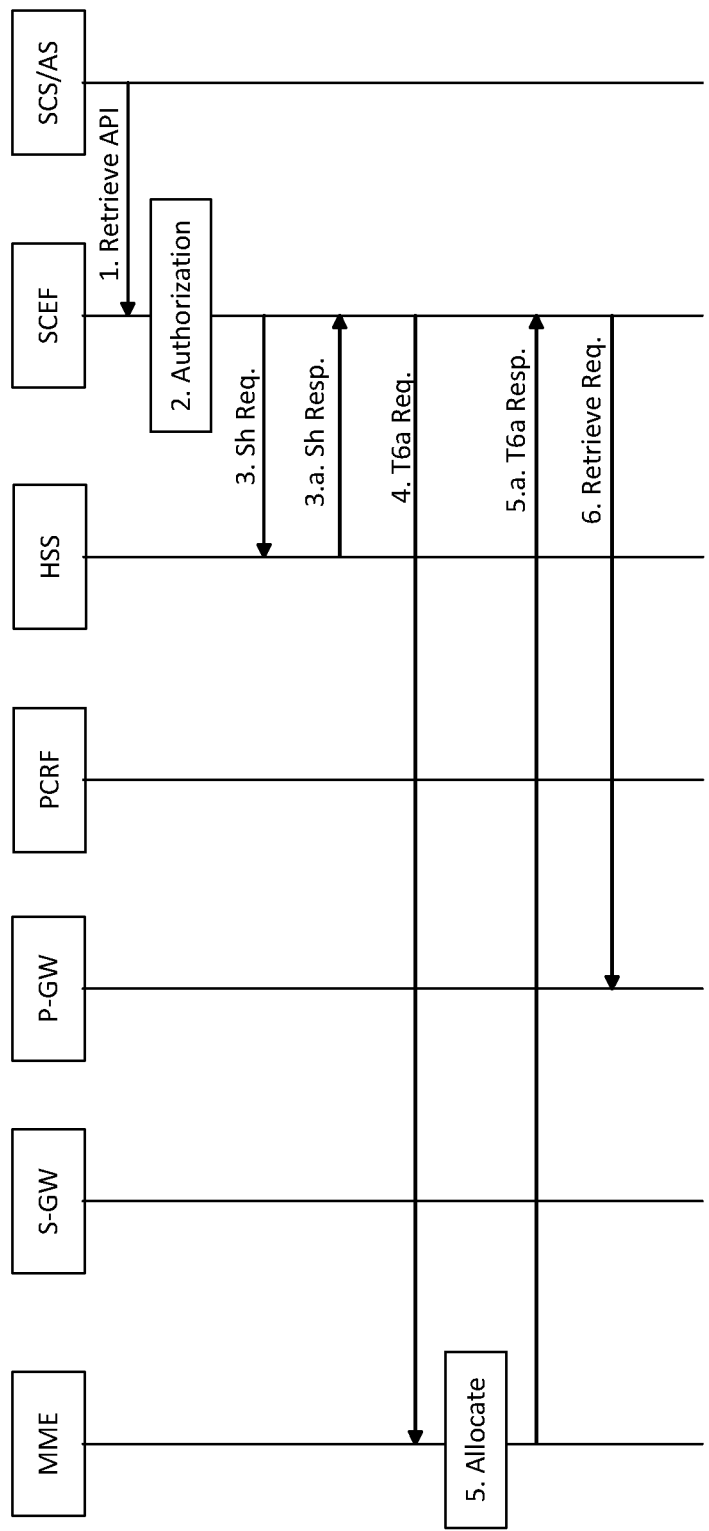
FIGS. 22-24 depict example call flows for an SCEF-initiated LGW-PGW bearer creation method.
Figure 23:
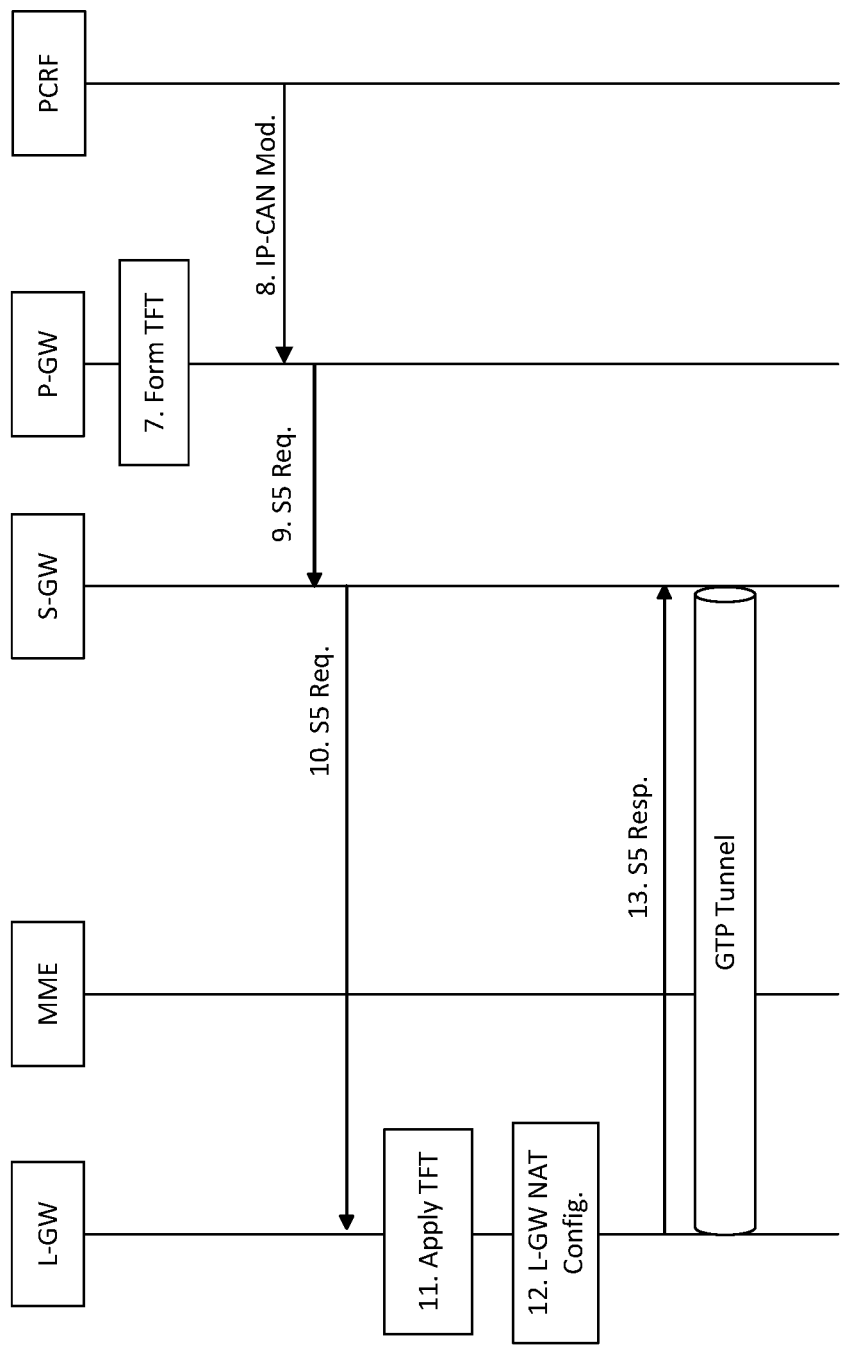
Figure 24:
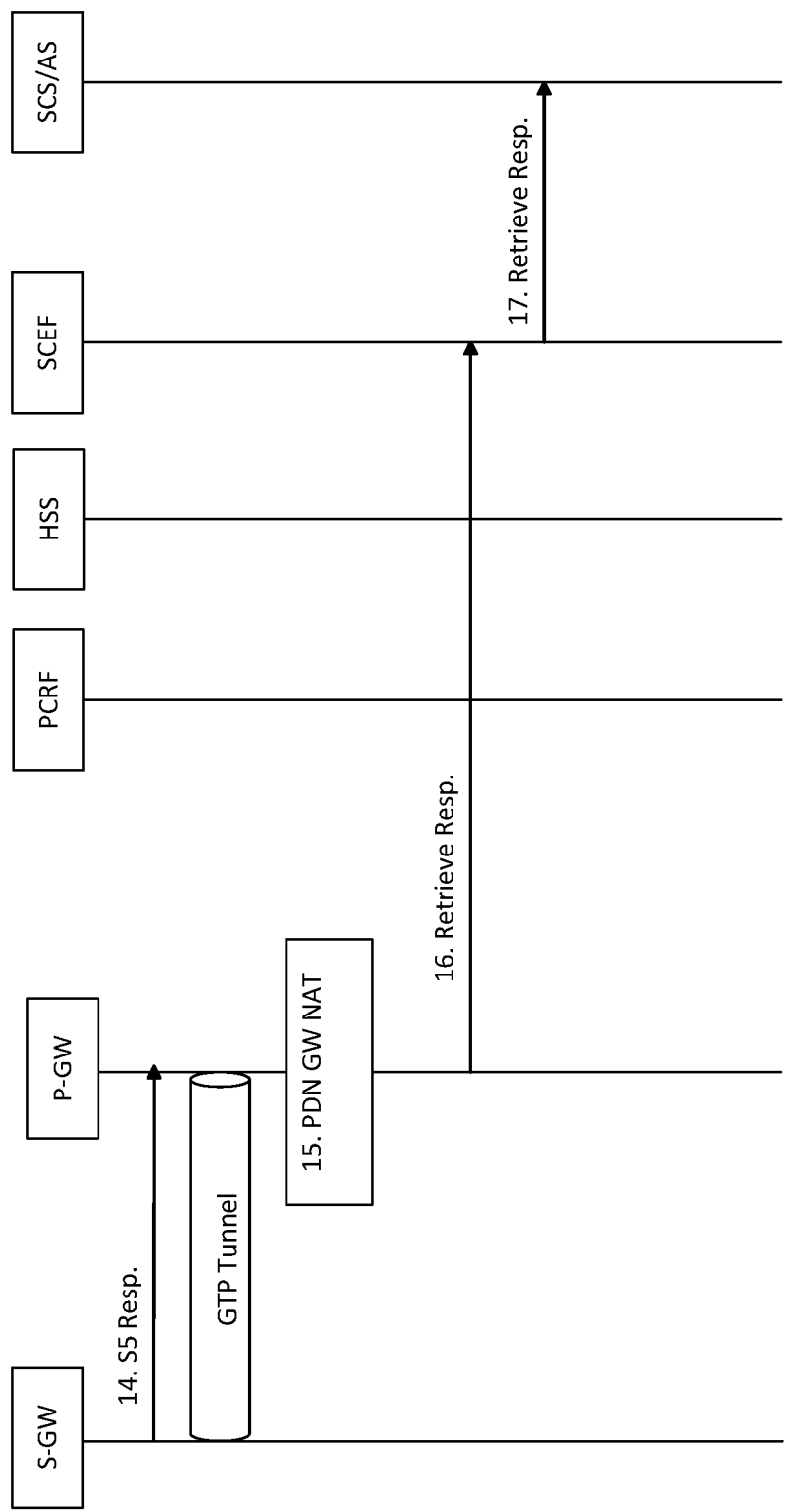

FIGS. 22-24 are example call flows of a method by which an SCS may initiate LGW-PGW bearer creation. An SCS/AS requests local information to be provided by a particular local server. The local server is connect to a UE through an existing LIPA connection. The request is initiated by the SCS/AS and managed by the SCEF. To do so, the SCEF communicates with the P-GW (P-GW) and the MME as follows.

Prior to the sending of message 1, a default PDN connection is established between the UE and the P-GW. A LIPA connection is established between the UE and the L-GW. Consequently, the UE has a public IP address that is allocated by the P-GW. Furthermore, the UE has a different local IP address that is allocated by the L-GW.

In message 1, the SCS/AS starts inquiring about the local information of a given UE, to be provided by an LS, by sending a "Retrieve Local Information Request" (External ID, SCS Identifier, LS-PORT-NUM=X) API to the SCEF. The 'LS-PORT-NUM' IE is included to be used to send the local information over LS-PORT-NUM X.

In step 2, the SCEF checks to see if the SCS/AS is authorized to get the local server information about the requested UE. If the SCS/AS is authorized, the SCEF sends message 3. Otherwise, the flow stops and the SCEF reports the rejection and its cause to the SCS/AS.

In message 3, once the request is authorized, the SCEF sends "Subscriber Information Request" (External ID, SCS Identifier) to the HSS, over the Sh reference point, to obtain the UE's IMSI and to obtain the identities of the UE's serving nodes (e.g. MME).

In message 3a, the HSS replies by sending "Subscriber Information Response" (IMSI or External Identifier, Serving nodes) message to the SCEF. The HSS resolves the External Identifier to IMSI and retrieves the related HSS stored routing information including the identities of the UE's serving CN node(s) (MME, SGSN, 3GPP AAA server or MSC). Optionally, the HSS sends the IMSI to the SCEF.

In message 4, once the SCEF receives the MME address and UE's identity, the SCEF sends a "Create Bearer Request" (IMSI, Bind-To-LGW-Flag) message to the MME over the T6a reference point. Using a 'Bind-To-LGW-Flag' IE, the SCEF is able to inform the MME that this is a special request to create bearer between the L-GW and P-GW, which are associated with the UE, defined by its IMSI.

In step 5, once the MME receives the bearer request initiation, it allocates a new bearer ID, namely, LGW-Bearer-ID, to reference the bearer between the L-GW and P-GW.

In message 5a, the MME sends a "Create Bearer Response" (LGW-Bearer-ID, L-GW Address or Local Home Network ID, P-GW ID) message to the SCEF over the Tx reference point. The MME stores the L-GW address or Local Home Network ID, which is periodically received from the eNB in every "Uplink NAS Transport" message.

In message 6, once the SCEF has received the P-GW ID, the SCEF sends a "Retrieve Local Information Request" (IMSI, Bind-To-LGW-Flag, LGW-Bearer-ID, L-GW Address or Local Home Network ID, LS-PORT-NUM=X) to the P-GW. In this way, the SCEF informs the P-GW that the SCEF is interested in receiving the local server information over LS-PORT-NUM X from the LS that has a LIPA connection with UE (identified via its IMSI).

The call flow of FIG. 22 is continued in FIG. 23. In step 7, the P-GW forms an updated TFT indicating that any data packet assigned to LS-PORT-NUM X should be sent over the new dedicated bearer LGW-Bearer-ID received in message 6.

In message 8, the P-GW initiates IP-CAN Session modification by sending a PCRF carrying TAD, Bind-To-LGW-Flag, and LGW-Bearer-ID information. The 'Bind-To-LGW-Flag' is included to indicate to the PCRF that the newly requested bearer is associated with an LS, rather than a UE.

In message 9, the P-GW initiates a "Dedicated Bearer Activation" procedure similar clause 5.4.1.1 of TS 23.401. Message 9 includes a "Create Bearer Request" (IMSI, EPS Bearer QoS, TFT, P-GW S5 TEID, Bind-To-LGW-Flag, LGW-Bearer-ID, L-GW Address or Local Home Network ID, SCS-IP-ADDRESS). Message 9 is sent to the S-GW (S-GW) over the S5 reference point. The SCS-IP-ADDRESS denotes the public IP address of the SCS, which is needed for the NAT at the L-GW.

In message 10, the S-GW sends the "Create Bearer Request" (IMSI, EPS Bearer QoS, TFT, S-GW TEID, P-GW TEID, Bind-To-LGW-Flag, LGW-Bearer-ID, SCS-IP-ADDRESS) information to the L-GW (defined using the L-GW Address or Local Home Network ID IE) over S5. The TFT is included to carry the TFT rules to the L-GW. Using the 'Bind-To-LGW-Flag' IE, the S-GW will be able to inform the L-GW that this is a special request to create bearer (with ID LGW-Bearer-ID) between the L-GW and P-GW.

Steps 11-14 are similar to steps 10-13 in of FIG. 13. Here in FIG. 23, the L-GW additionally inserts the 'LS-IP-ADDRESS' IE, which is the local LIPA IP address of the LS, to the S-GW and P-GW. The 'LS-IP-ADDRESS' IP address is already available at the L-GW, and used over the existing LIPA connection.

The call flow of FIG. 23 is continued in FIG. 24. In message 14, the S-GW informs the P-GW of a new NAT entry. If data is to be sent over LS-PORT-NUM X, and the destination IP address is the typical UE public IP address (IP-UE), in accordance with the NAT the address will now be changed to the local LS IP address (LS-IP-ADDRESS).

In step 15, as the new bearer is now established between the L-GW and P-GW, the PDN-GW indicates so by sending a "Retrieve Location Information Response" message to the SCEF.

In message 16, the P-GW sends a "Retrieve Local Information Response" to the SCEF.

Finally, in message 17, the SCEF responds to the API in step 1 by sending the "Retrieve Local Information Response" information to the SCS/AS.

Figure 25:
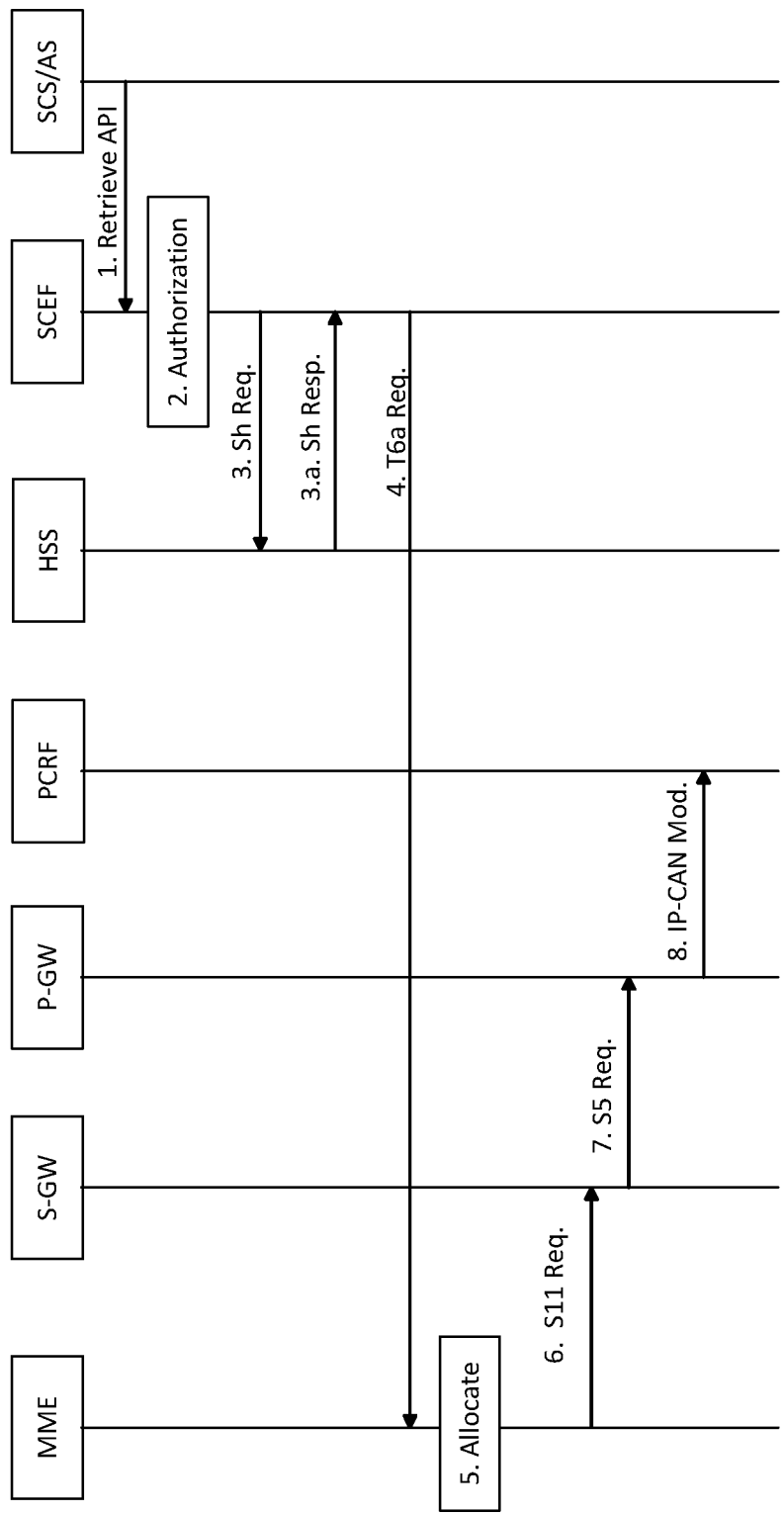
FIGS. 25-27 depict example call flows for an SCEF-initiated LGW-PGW session creation method.
Figure 26:
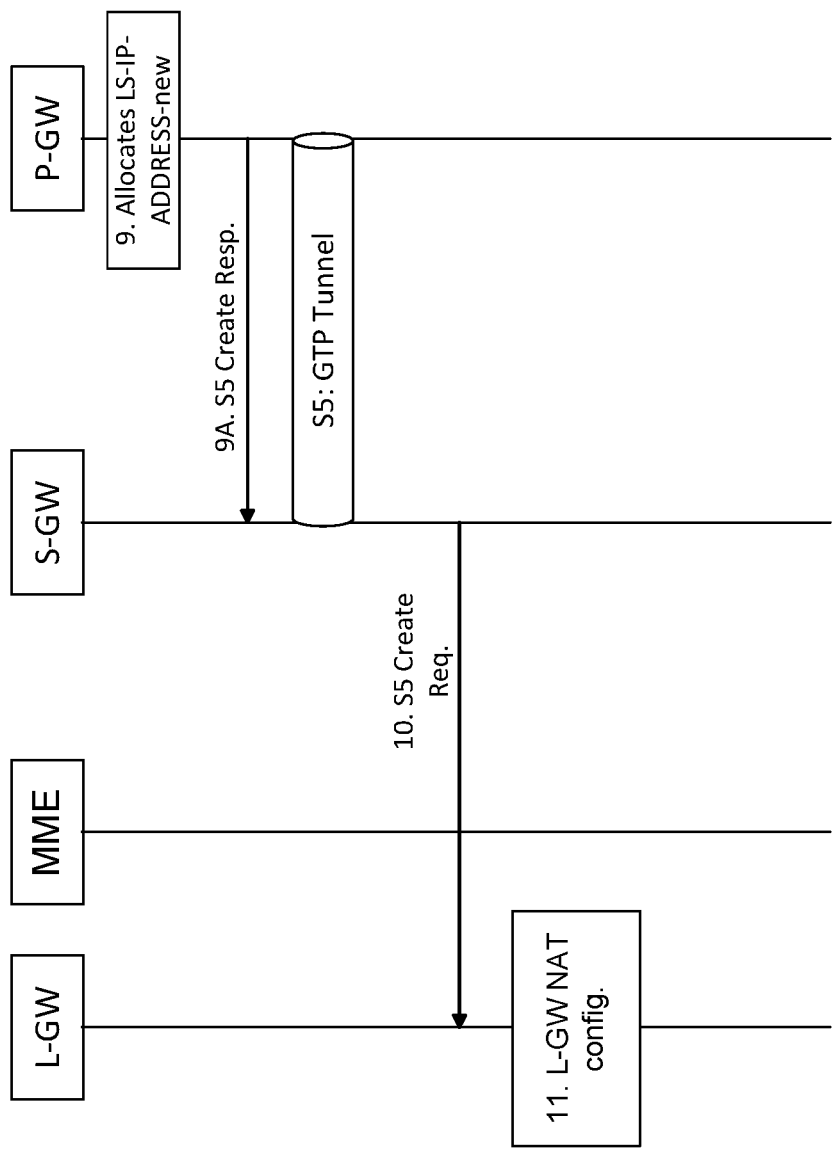
Figure 27:
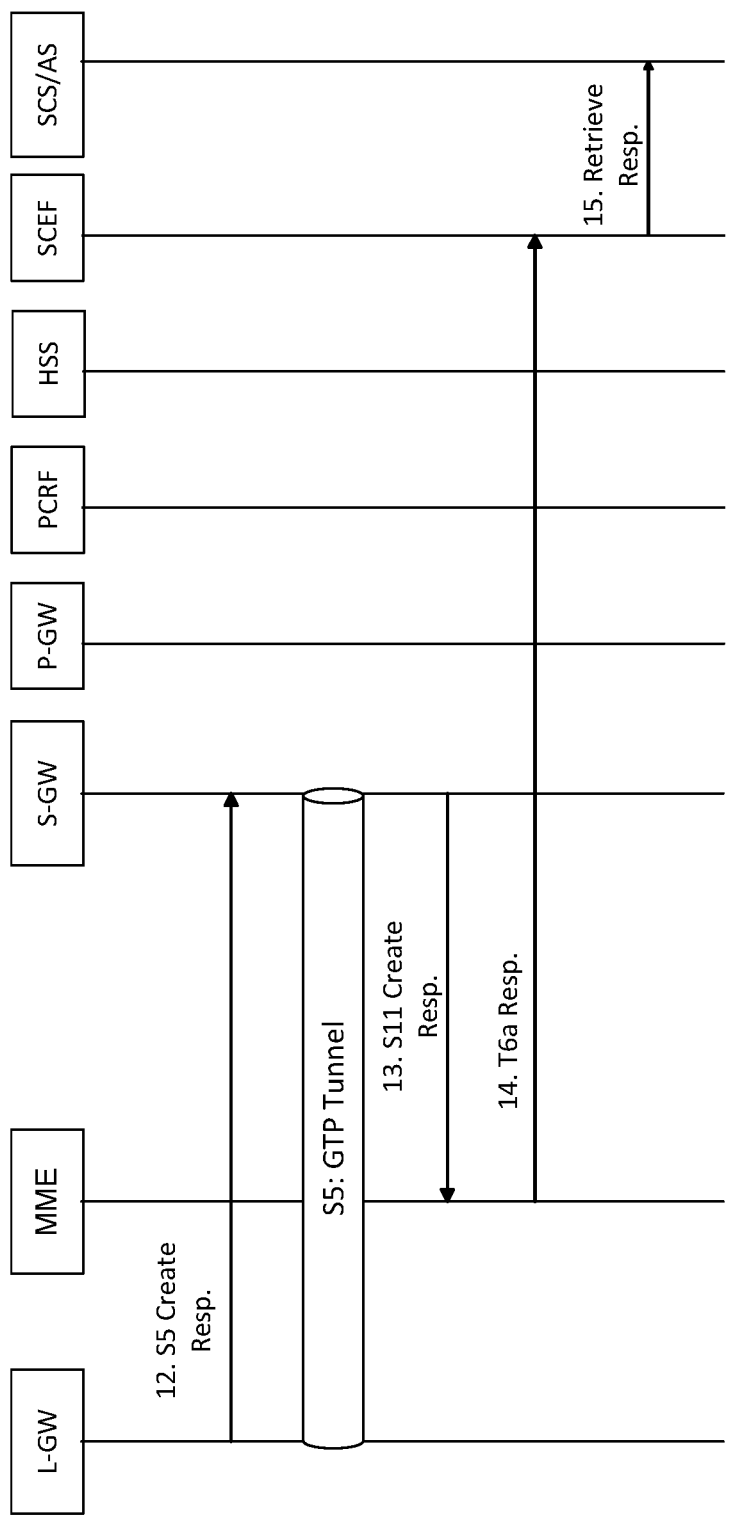

FIGS. 25-27 are example call flows of a method by which an SCS may initiate LGW-PGW PDN connection. An SCS/AS requests the creation of a new PDN connection between the L-GW and P-GW, which are serving a particular user. In FIG. 25, prior to the sending of message 1, a default PDN connection is established between the UE and the P-GW, and a LIPA connection is established between the UE and the L-GW. Consequently, the UE has a public IP address that was allocated by the P-GW. Furthermore, the UE has a different local IP address that was allocated by the L-GW. The MME managed the LIPA connection, and therefore the MME is aware of the L-GW Address or Local Home Network ID and LIPA-APN.

In FIG. 25, message 1, step 2, and messages 3 and 3a are similar to the counterpart operations described in connection to FIG. 22. In message 1, the SCS/AS starts inquiring about the local information of a given UE, to be provided by an LS, by sending a "Retrieve Local Information Request" (External ID, SCS Identifier, LS-PORT-NUM=X) API to the SCEF. The 'LS-PORT-NUM' IE is included to be used to send the local information over LS-PORT-NUM X. In step 2, the SCEF checks to see if the SCS/AS is authorized to get the local server information about the requested UE. If the SCS/AS is authorized, the SCEF sends message 3. Otherwise, the flow stops and the SCEF reports the rejection and its cause to the SCS/AS. In message 3, once the request is authorized, the SCEF sends "Subscriber Information Request" (External ID, SCS Identifier) to the HSS, over the Sh reference point, to obtain the UE's IMSI and to obtain the identities of the UE's serving nodes (e.g. MME). In message 3a, the HSS replies by sending "Subscriber Information Response" (IMSI or External Identifier, Serving nodes) message to the SCEF. The HSS resolves the External Identifier to IMSI and retrieves the related HSS stored routing information including the identities of the UE's serving CN node(s) (MME, SGSN, 3GPP AAA server or MSC). Optionally, the HSS sends the IMSI to the SCEF. In message 4, the SCEF sends a "Create Session Request" (IMSI, Bind-To-LGW-Flag) information to the MME over the Tx reference point. Using the 'Bind-To-LGW-Flag' IE, the SCEF will be able to inform the MME that this is a special request to create bearer between the L-GW and P-GW, which are associated with the UE, defined by its IMSI.

In step 5, once the MME receives the bearer request initiation, it allocates a new bearer ID, namely, LGW-Bearer-ID, to reference the bearer between the L-GW and P-GW.

In FIGS. 25-27, the messages 6, 7, 8, 9A, 10, 12, and 13, and steps 9 and 11 are similar to the counterpart operations described in connection to in FIGS. 22 and 23. In step 6, the MME sends the "Create Bearer Request" (IMSI, EPS Bearer QoS, TFT, S-GW TEID, P-GW TEID, Bind-To-LGW-Flag, LGW-Bearer-ID, SCS-IP-ADDRESS) information to the S-GW (defined using the L-GW Address or Local Home Network ID IE) over S11. The TFT is included to carry the TFT rules to the L-GW. Using the 'Bind-To-LGW-Flag' IE, the S-GW will be able to inform the L-GW that this is a special request to create bearer (with ID LGW-Bearer-ID) between the L-GW and P-GW. In step 7, the "Create Bearer Request" is forwarded to the P-GW over the S5 interface. In message 8, the P-GW initiates IP-CAN Session modification by sending a PCRF carrying TAD, Bind-To-LGW-Flag, and LGW-Bearer-ID information. The 'Bind-To-LGW-Flag' is included to indicate to the PCRF that the newly requested bearer is associated with an LS, rather than a UE. In step 9, the P-GW creates a new entry in its EPS bearer context table and generates a 'LGW-Charging Id' for the LGW-Bearer-ID Bearer. The new entry allows the P-GW to route user plane PDUs between the S-GW and the packet data network, and to start charging. Furthermore, the P-GW allocates a new IP address to be assigned to the LS, namely, 'LS-IP-ADDRESS-new'. The P-GW may include the IP address of the SCS 'SCS-IP-ADDRESS', to be used in the NAT function at the L-GW. In message 9A, the P-GW returns to the S-GW a "Create Session Response" (L-GW Address or Local Home Network ID for the user plane, L-GW TEID of the user plane, L-GW TEID of the control plane, PDN Type, LGW-Bearer-ID, EPS Bearer QoS, Protocol Configuration Options, Prohibit Payload Compression, APN Restriction, Cause, APN-AMBR), establishing a GTP tunnel between the S-GW and P-GW. In message 10, the S-GW sends the "Create Bearer Request" (IMSI, EPS Bearer QoS, TFT, S-GW TEID, P-GW TEID, Bind-To-LGW-Flag, LGW-Bearer-ID, SCS-IP-ADDRESS) information to the L-GW (defined using the L-GW Address or Local Home Network ID IE) over S5. The TFT is included to carry the TFT rules to the L-GW. Using the 'Bind-To-LGW-Flag' IE, the S-GW will be able to inform the L-GW that this is a special request to create bearer (with ID LGW-Bearer-ID) between the L-GW and P-GW. In step 11, the L-GW creates a new NAT entry indicating that, if data is to be sent over the LIPA connection from the LS using LS-PORT-NUM X and the destination IP address is SCS (SCS-IP-ADDRESS), the source Address should be changed to the UE's public IP address (UE-IP-ADDRESS). In step 12, the L-GW will acknowledge the S-GW's request to create a bearer. In step 13, the S-GW responds to the MME's request in step 6.

The MME sends a "Create Session Response" (LGW-Bearer-ID) message 14 to the SCEF, since the new session is now established between the L-GW and P-GW.

Finally, the SCEF responds to the API the first step by sending "Retrieve Local Information Response" message 15 to the SCS/AS.

If multiple UE or SCS entities initiate requests to establish the same LS-SCS (LGW-PGW) connection, the P-GW would only accept the first request. All the subsequent requests will not be executed by the P-GW, and an acknowledgement would be sent to the requesting entity indicating that the requested dedicated bearer or PDN connection is already established.

Figure 28:
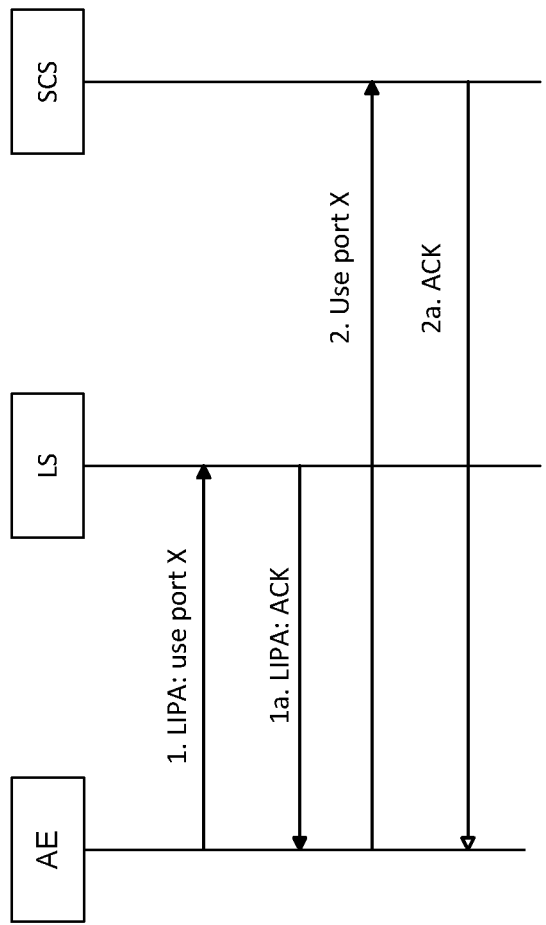
FIG. 28 is an example call flow for conveying port number to an LS and an SCS over a user plane for UE-initiated methods.

FIG. 28 is an example call flow of user plane communications for an AE initiated connection. The AE, which may be hosted on the UE, can inform both the LS and SCS, over the user plane, about the port number to use for the direct communication between each other. In message 1, the AE informs the LS over the existing LIPA connection that the AE needs to use port LS-PORT-NUM X to communicate with the SCS. In message 1a, the LS acknowledges message 1. In message 2, the AE informs the SCS over the default public PDN connection that the AE needs to use port LS-PORT-NUM X to communicate with the LS. In message 2a, the SCS acknowledges message 2. The AE may then communicate this port number to the network. The port number may then be used to configure NAT rules in the L-GW, P-GW, and/or S(G)i-LAN.

Figure 29:
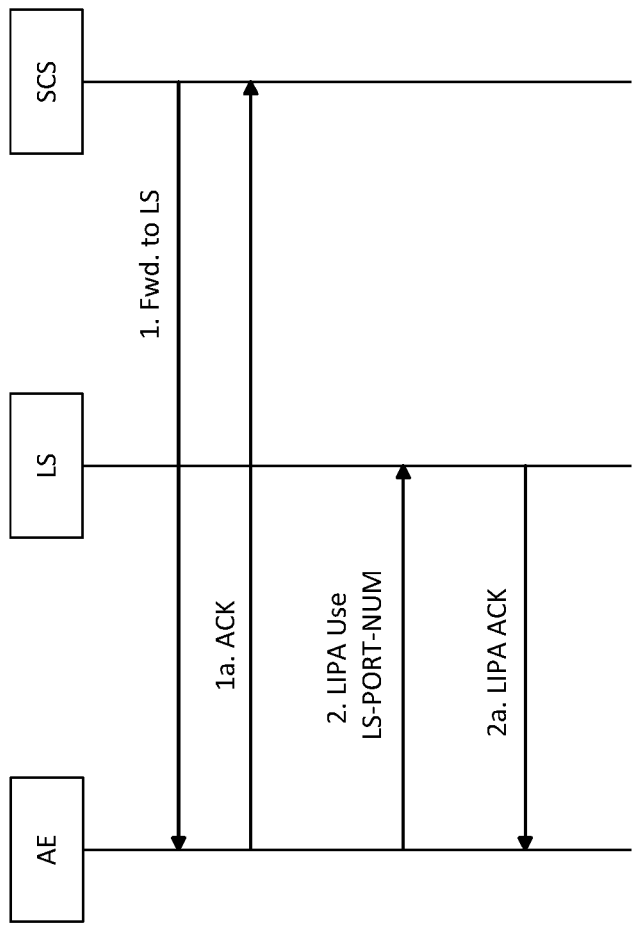
FIG. 29 is an example call flow for conveying port number to an LS for SCS-initiated methods.

FIG. 29 is an example call flow of user plane communications for an SCS initiated connection. In message 1, the SCS initiates LGW-PGW connections establishment by sending a message in which SCS will choose an LS-PORT-NUM (=X) to be used for its communication with the LS. In order for the SCS to send the port number to the LS, it first sends the port number to the AE over the 3GPP default PDN connection. In message 1a, the AE acknowledges receipt of message 1. Then in message 2, the AE forwards the port number to the LS over the LIPA connection. In message 2a, the LS acknowledges message 2. Using this method, the SCS does not need to know the local IP address of the LS.

FIG. 30 illustrates an example graphical user interface (GUI) that allows a user to view or adjust system operation. In the example of FIG. 30, the user may use to approve or disapprove of the local server sending information to the SCS/AS.

Figure 31:
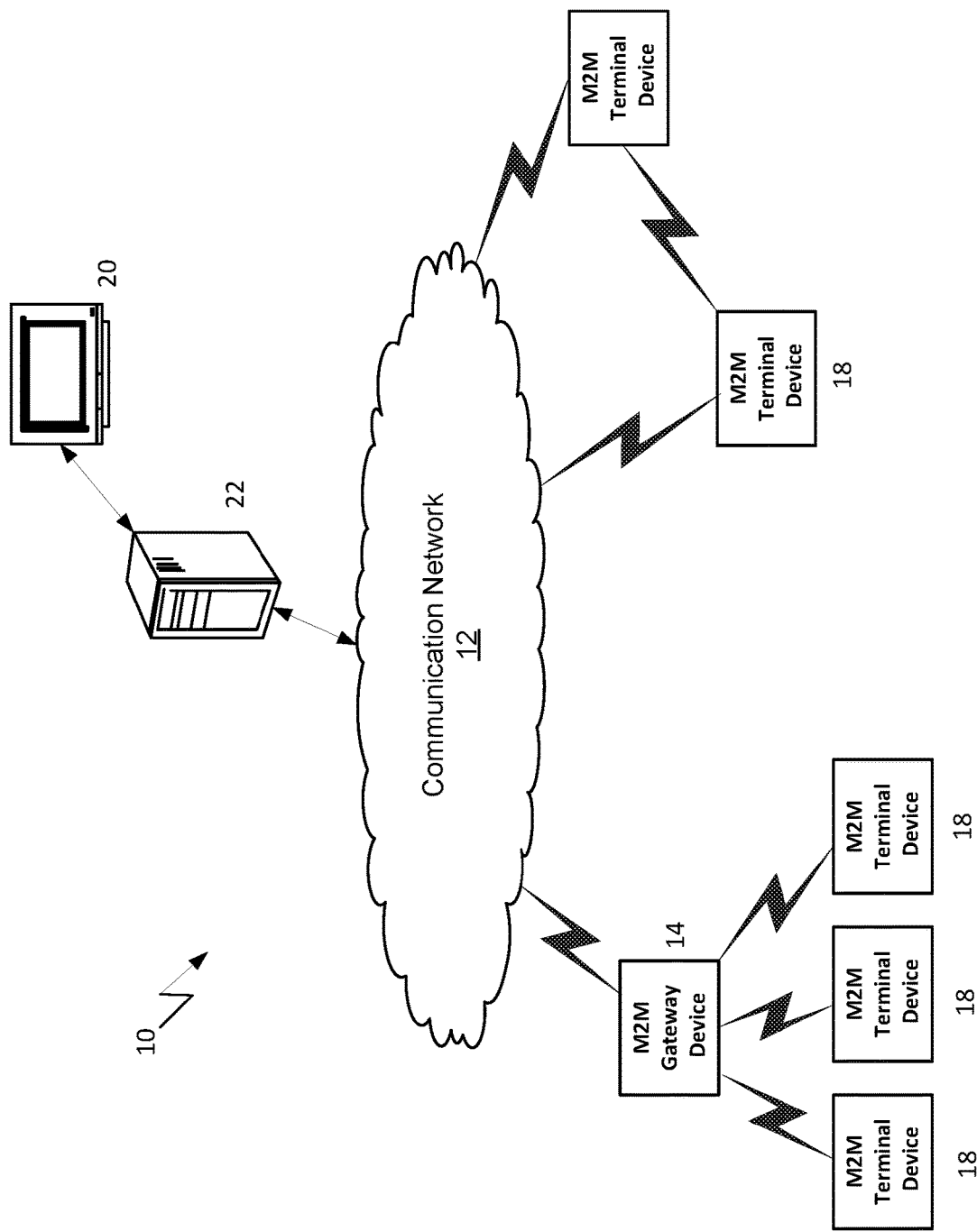
FIG. 31 is a system diagram of an example machine-to-machine (M2M), Internet of Things (IoT), or Web of Things (WoT) communication system in which one or more disclosed embodiments may be implemented.

FIG. 31 is a diagram of an example machine-to machine (M2M), Internet of Things (IoT), or Web of Things (WoT) communication system 10 in which one or more disclosed embodiments may be implemented. Generally, M2M technologies provide building blocks for the IoT/WoT, and any M2M device, M2M gateway, M2M server, or M2M service platform may be a component or node of the IoT/WoT as well as an IoT/WoT Service Layer, etc. Any of the client, proxy, or server devices illustrated in any of FIG. 2-14, 17-18, or 21-29 may comprise a node of a communication system such as the ones illustrated in FIG. 8, 10, 11, 21, 31, or 32.

The service layer may be a functional layer within a network service architecture. Service layers are typically situated above the application protocol layer such as HTTP, CoAP or MQTT and provide value added services to client applications. The service layer also provides an interface to core networks at a lower resource layer, such as for example, a control layer and transport/access layer. The service layer supports multiple categories of (service) capabilities or functionalities including a service definition, service runtime enablement, policy management, access control, and service clustering. Recently, several industry standards bodies, e.g., oneM2M, have been developing M2M service layers to address the challenges associated with the integration of M2M types of devices and applications into deployments such as the Internet/Web, cellular, enterprise, and home networks. A M2M service layer can provide applications and/or various devices with access to a collection of or a set of the above mentioned capabilities or functionalities, supported by the service layer, which can be referred to as a CSE or SCL. A few examples include but are not limited to security, charging, data management, device management, discovery, provisioning, and connectivity management which can be commonly used by various applications. These capabilities or functionalities are made available to such various applications via APIs which make use of message formats, resource structures and resource representations defined by the M2M service layer. The CSE or SCL is a functional entity that may be implemented by hardware and/or software and that provides (service) capabilities or functionalities exposed to various applications and/or devices (i.e., functional interfaces between such functional entities) in order for them to use such capabilities or functionalities.

As shown in FIG. 31, the M2M/IoT/WoT communication system 10 includes a communication network 12. The communication network 12 may be a fixed network (e.g., Ethernet, Fiber, ISDN, PLC, or the like) or a wireless network (e.g., WLAN, cellular, or the like) or a network of heterogeneous networks. For example, the communication network 12 may be comprised of multiple access networks that provide content such as voice, data, video, messaging, broadcast, or the like to multiple users. For example, the communication network 12 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like. Further, the communication network 12 may comprise other networks such as a core network, the Internet, a sensor network, an industrial control network, a personal area network, a fused personal network, a satellite network, a home network, or an enterprise network for example.

As shown in FIG. 31, the M2M/IoT/WoT communication system 10 may include the Infrastructure Domain and the Field Domain. The Infrastructure Domain refers to the network side of the end-to-end M2M deployment, and the Field Domain refers to the area networks, usually behind an M2M gateway. The Field Domain and Infrastructure Domain may both comprise a variety of different nodes (e.g., servers, gateways, device, and the like) of the network. For example, the Field Domain may include M2M gateways 14 and devices 18. It will be appreciated that any number of M2M gateway devices 14 and M2M devices 18 may be included in the M2M/IoT/WoT communication system 10 as desired. Each of the M2M gateway devices 14 and M2M devices 18 are configured to transmit and receive signals, using communications circuitry, via the communication network 12 or direct radio link. A M2M gateway 14 allows wireless M2M devices (e.g., cellular and non-cellular) as well as fixed network M2M devices (e.g., PLC) to communicate either through operator networks, such as the communication network 12 or direct radio link. For example, the M2M devices 18 may collect data and send the data, via the communication network 12 or direct radio link, to an M2M application 20 or other M2M devices 18. The M2M devices 18 may also receive data from the M2M application 20 or an M2M device 18. Further, data and signals may be sent to and received from the M2M application 20 via an M2M Service Layer 22, as described below. M2M devices 18 and gateways 14 may communicate via various networks including, cellular, WLAN, WPAN (e.g., Zigbee, 6LoWPAN, Bluetooth), direct radio link, and wireline for example. Exemplary M2M devices include, but are not limited to, tablets, smart phones, medical devices, temperature and weather monitors, connected cars, smart meters, game consoles, personal digital assistants, health and fitness monitors, lights, thermostats, appliances, garage doors and other actuator-based devices, security devices, and smart outlets.

Figure 32:
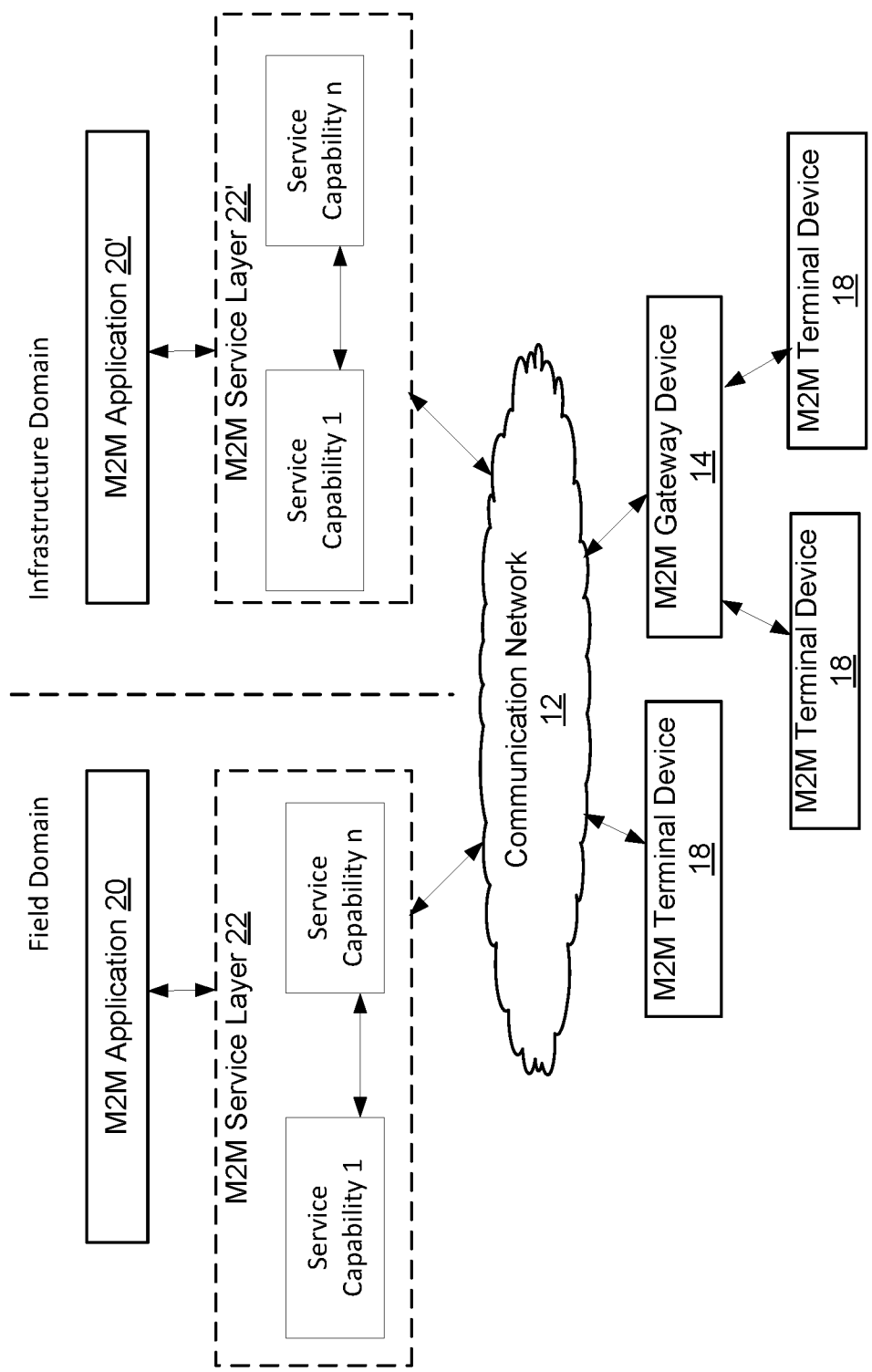
FIG. 32 is a system diagram of an example architecture that may be used within the M2M/IoT/WoT communications system illustrated in FIG. 31.

Referring to FIG. 32, the illustrated M2M Service Layer 22 in the field domain provides services for the M2M application 20, M2M gateways 14, and M2M devices 18 and the communication network 12. It will be understood that the M2M Service Layer 22 may communicate with any number of M2M applications, M2M gateways 14, M2M devices 18, and communication networks 12 as desired. The M2M Service Layer 22 may be implemented by one or more nodes of the network, which may comprise servers, computers, devices, or the like. The M2M Service Layer 22 provides service capabilities that apply to M2M devices 18, M2M gateways 14, and M2M applications 20. The functions of the M2M Service Layer 22 may be implemented in a variety of ways, for example as a web server, in the cellular core network, in the cloud, etc.

Similar to the illustrated M2M Service Layer 22, there is the M2M Service Layer 22' in the Infrastructure Domain. M2M Service Layer 22' provides services for the M2M application 20' and the underlying communication network 12 in the infrastructure domain. M2M Service Layer 22' also provides services for the M2M gateways 14 and M2M devices 18 in the field domain. It will be understood that the M2M Service Layer 22' may communicate with any number of M2M applications, M2M gateways and M2M devices. The M2M Service Layer 22' may interact with a Service Layer by a different service provider. The M2M Service Layer 22' may be implemented by one or more nodes of the network, which may comprise servers, computers, devices, virtual machines (e.g., cloud computing/storage farms, etc.) or the like.

Referring also to FIG. 32, the M2M Service Layers 22 and 22' provide a core set of service delivery capabilities that diverse applications and verticals may leverage. These service capabilities enable M2M applications 20 and 20' to interact with devices and perform functions such as data collection, data analysis, device management, security, billing, service/device discovery, etc. Essentially, these service capabilities free the applications of the burden of implementing these functionalities, thus simplifying application development and reducing cost and time to market. The Service Layers 22 and 22' also enable M2M applications 20 and 20' to communicate through various networks such as network 12 in connection with the services that the Service Layers 22 and 22' provide.

The M2M applications 20 and 20' may include applications in various industries such as, without limitation, transportation, health and wellness, connected home, energy management, asset tracking, and security and surveillance.

As mentioned above, the M2M Service Layer, running across the devices, gateways, servers and other nodes of the system, supports functions such as, for example, data collection, device management, security, billing, location tracking/geofencing, device/service discovery, and legacy systems integration, and provides these functions as services to the M2M applications 20 and 20'.

Generally, a Service Layer, such as the Service Layers 22 and 22' illustrated in FIG. 32, defines a software middleware layer that supports value-added service capabilities through a set of Application Programming Interfaces (APIs) and underlying networking interfaces. Both the ETSI M2M and oneM2M architectures define a Service Layer. ETSI M2M's Service Layer is referred to as the Service Capability Layer (SCL). The SCL may be implemented in a variety of different nodes of the ETSI M2M architecture. For example, an instance of the Service Layer may be implemented within an M2M device (where it is referred to as a device SCL (DSCL)), a gateway (where it is referred to as a gateway SCL (GSCL)) and/or a network node (where it is referred to as a network SCL (NSCL)). The oneM2M Service Layer supports a set of Common Service Functions (CSFs) (i.e., service capabilities). An instantiation of a set of one or more particular types of CSFs is referred to as a Common Services Entity (CSE) which may be hosted on different types of network nodes (e.g., infrastructure node, middle node, application-specific node). The Third Generation Partnership Project (3GPP) has also defined an architecture for machine-type communications (MTC). In that architecture, the Service Layer, and the service capabilities it provides, are implemented as part of a Service Capability Server (SCS). Whether embodied in a DSCL, GSCL, or NSCL of the ETSI M2M architecture, in a Service Capability Server (SCS) of the 3GPP MTC architecture, in a CSF or CSE of the oneM2M architecture, or in some other node of a network, an instance of the Service Layer may be implemented as a logical entity (e.g., software, computer-executable instructions, and the like) executing either on one or more stand-alone nodes in the network, including servers, computers, and other computing devices or nodes, or as part of one or more existing nodes. As an example, an instance of a Service Layer or component thereof may be implemented in the form of software running on a network node (e.g., server, computer, gateway, device or the like) having the general architecture illustrated in FIG. 32 or FIG. 34 described below.

Further, the methods and functionalities described herein may be implemented as part of an M2M network that uses a Service Oriented Architecture (SOA) and/or a Resource-Oriented Architecture (ROA) to access services.

Figure 33:
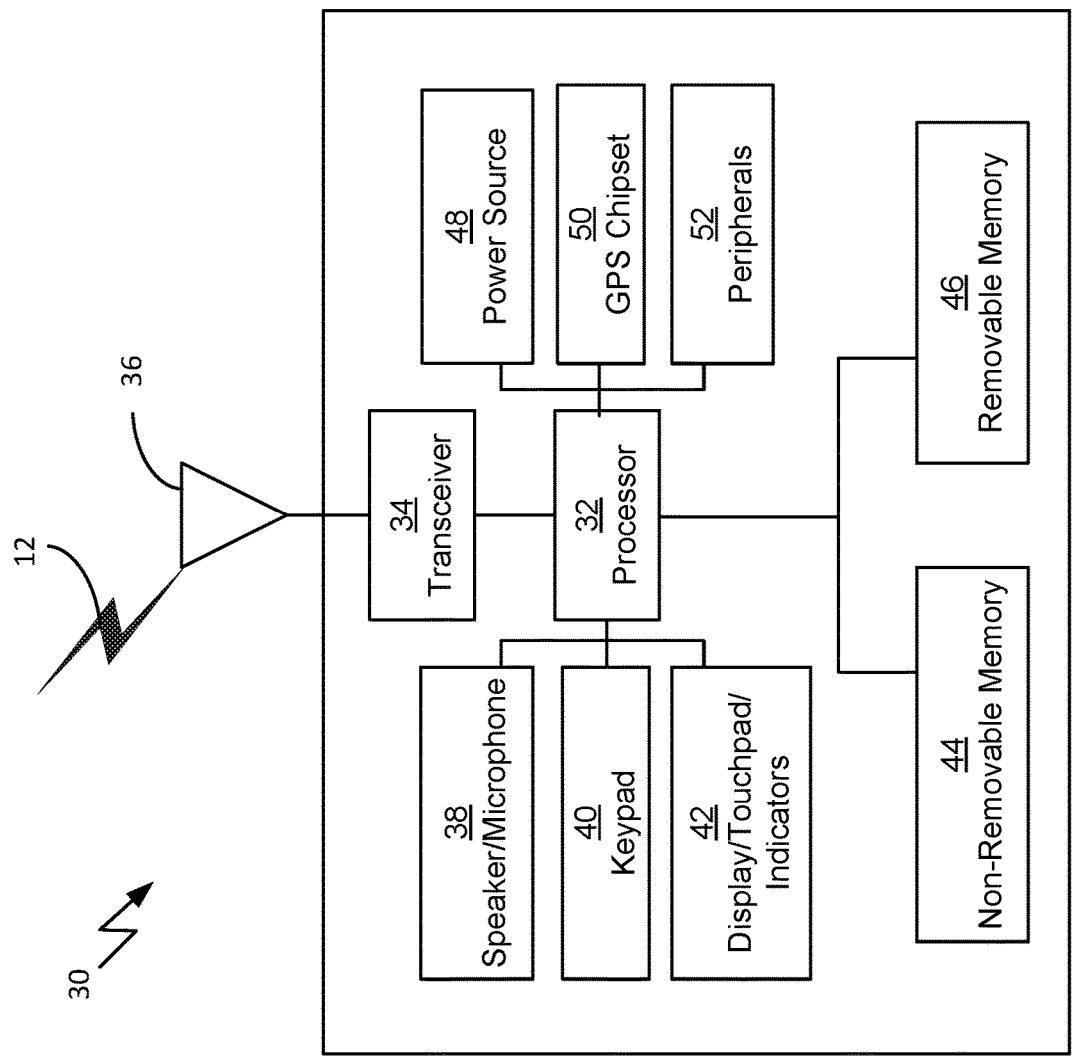
FIG. 33 is a system diagram of an example communication network node, such as an M2M/IoT/WoT device, gateway, or server that may be used within the communications system illustrated in FIGS. 31 and 32.

FIG. 33 is a block diagram of an example hardware/software architecture of a node of a network, such as one of the clients, servers, or proxies illustrated in FIG. 2-14, 17-18, or 21-29, which may operate as an M2M server, gateway, device, or other node in an M2M network such as that illustrated in FIG. 8, 10, 11, 21, 31, or 32. As shown in FIG. 33, the node 30 may include a processor 32, non-removable memory 44, removable memory 46, a speaker/microphone 38, a keypad 40, a display, touchpad, and/or indicators 42, a power source 48, a global positioning system (GPS) chipset 50, and other peripherals 52. The node 30 may also include communication circuitry, such as a transceiver 34 and a transmit/receive element 36. It will be appreciated that the node 30 may include any sub-combination of the foregoing elements while remaining consistent with an embodiment. This node may be a node that implements the connection initiation steps herein, e.g., in relation to FIG. 2-13, 17-18, or 22-29, or in a claim.

The processor 32 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. In general, the processor 32 may execute computer-executable instructions stored in the memory (e.g., memory 44 and/or memory 46) of the node in order to perform the various required functions of the node. For example, the processor 32 may perform signal coding, data processing, power control, input/output processing, and/or any other functionality that enables the node 30 to operate in a wireless or wired environment. The processor 32 may run application-layer programs (e.g., browsers) and/or radio access-layer (RAN) programs and/or other communications programs. The processor 32 may also perform security operations such as authentication, security key agreement, and/or cryptographic operations, such as at the access-layer and/or application layer for example.

As shown in FIG. 33, the processor 32 is coupled to its communication circuitry (e.g., transceiver 34 and transmit/receive element 36). The processor 32, through the execution of computer executable instructions, may control the communication circuitry in order to cause the node 30 to communicate with other nodes via the network to which it is connected. In particular, the processor 32 may control the communication circuitry in order to perform the connection initiation steps herein, e.g., in relation to FIG. 2-13, 17-18, or 22-29, or in a claim. While FIG. 33 depicts the processor 32 and the transceiver 34 as separate components, it will be appreciated that the processor 32 and the transceiver 34 may be integrated together in an electronic package or chip.

The transmit/receive element 36 may be configured to transmit signals to, or receive signals from, other nodes, including M2M servers, gateways, device, and the like. For example, in an embodiment, the transmit/receive element 36 may be an antenna configured to transmit and/or receive RF signals. The transmit/receive element 36 may support various networks and air interfaces, such as WLAN, WPAN, cellular, and the like. In an embodiment, the transmit/receive element 36 may be an emitter/detector configured to transmit and/or receive IR, UV, or visible light signals, for example. In yet another embodiment, the transmit/receive element 36 may be configured to transmit and receive both RF and light signals. It will be appreciated that the transmit/receive element 36 may be configured to transmit and/or receive any combination of wireless or wired signals.

In addition, although the transmit/receive element 36 is depicted in FIG. 33 as a single element, the node 30 may include any number of transmit/receive elements 36. More specifically, the node 30 may employ MIMO technology. Thus, in an embodiment, the node 30 may include two or more transmit/receive elements 36 (e.g., multiple antennas) for transmitting and receiving wireless signals.

The transceiver 34 may be configured to modulate the signals that are to be transmitted by the transmit/receive element 36 and to demodulate the signals that are received by the transmit/receive element 36. As noted above, the node 30 may have multi-mode capabilities. Thus, the transceiver 34 may include multiple transceivers for enabling the node 30 to communicate via multiple RATs, such as UTRA and IEEE 802.11, for example.

The processor 32 may access information from, and store data in, any type of suitable memory, such as the non-removable memory 44 and/or the removable memory 46. For example, the processor 32 may store session context in its memory, as described above. The non-removable memory 44 may include random-access memory (RAM), read-only memory (ROM), a hard disk, or any other type of memory storage device. The removable memory 46 may include a subscriber identity module (SIM) card, a memory stick, a secure digital (SD) memory card, and the like. In other embodiments, the processor 32 may access information from, and store data in, memory that is not physically located on the node 30, such as on a server or a home computer. The processor 32 may be configured to control lighting patterns, images, or colors on the display or indicators 42 to reflect the status of an M2M Service Layer session migration or sharing or to obtain input from a user or display information to a user about the node's session migration or sharing capabilities or settings. In another example, the display may show information with regard to a session state.

The processor 32 may receive power from the power source 48, and may be configured to distribute and/or control the power to the other components in the node 30. The power source 48 may be any suitable device for powering the node 30. For example, the power source 48 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 32 may also be coupled to the GPS chipset 50, which is configured to provide location information (e.g., longitude and latitude) regarding the current location of the node 30. It will be appreciated that the node 30 may acquire location information by way of any suitable location-determination method while remaining consistent with an embodiment.

The processor 32 may further be coupled to other peripherals 52, which may include one or more software and/or hardware modules that provide additional features, functionality and/or wired or wireless connectivity. For example, the peripherals 52 may include various sensors such as an accelerometer, biometrics (e.g., finger print) sensors, an e-compass, a satellite transceiver, a sensor, a digital camera (for photographs or video), a universal serial bus (USB) port or other interconnect interfaces, a vibration device, a television transceiver, a hands free headset, a Bluetooth® module, a frequency modulated (FM) radio unit, a digital music player, a media player, a video game player module, an Internet browser, and the like.

The node 30 may be embodied in other apparatuses or devices, such as a sensor, consumer electronics, a wearable device such as a smart watch or smart clothing, a medical or eHealth device, a robot, industrial equipment, a drone, a vehicle such as a car, truck, train, or airplane. The node 30 may connect to other components, modules, or systems of such apparatuses or devices via one or more interconnect interfaces, such as an interconnect interface that may comprise one of the peripherals 52.

Figure 34:
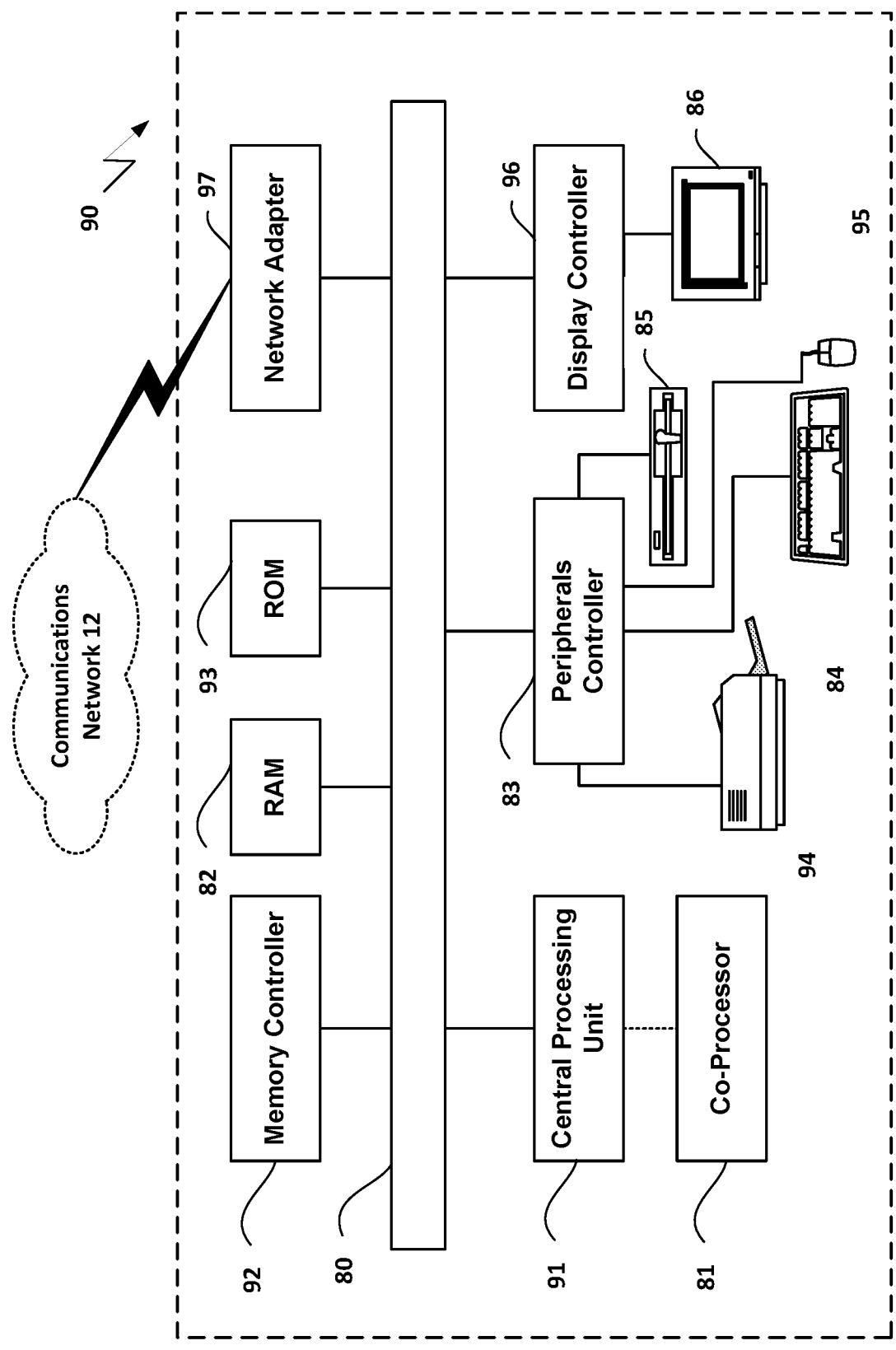
FIG. 34 is a block diagram of an example computing system in which a node of the communication system of FIGS. 31 and 32 may be embodied.

FIG. 34 is a block diagram of an exemplary computing system 90 in which one or more apparatuses of the communications networks illustrated in FIGS. 2-14, 17-18, 21-29, 35, 37, 38 and 39 may be embodied, such as certain nodes or functional entities in the RAN 103/104/105, Core Network 106/107/109, PSTN 108, Internet 110, or Other Networks 112.

Computing system 90 may comprise a computer or server and may be controlled primarily by computer readable instructions, which may be in the form of software, wherever, or by whatever means such software is stored or accessed. Such computer readable instructions may be executed within a processor 91, to cause computing system 90 to do work. The processor 91 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 91 may perform signal coding, data processing, power control, input/output processing, and/or any other functionality that enables the computing system 90 to operate in a communications network. Coprocessor 81 is an optional processor, distinct from main processor 91, that may perform additional functions or assist processor 91. Processor 91 and/or coprocessor 81 may receive, generate, and process data related to the methods and apparatuses disclosed herein.

In operation, processor 91 fetches, decodes, and executes instructions, and transfers information to and from other resources via the computing system's main data-transfer path, system bus 80. Such a system bus connects the components in computing system 90 and defines the medium for data exchange. System bus 80 typically includes data lines for sending data, address lines for sending addresses, and control lines for sending interrupts and for operating the system bus. An example of such a system bus 80 is the PCI (Peripheral Component Interconnect) bus.

Memories coupled to system bus 80 include random access memory (RAM) 82 and read only memory (ROM) 93. Such memories include circuitry that allows information to be stored and retrieved. ROMs 93 generally contain stored data that cannot easily be modified. Data stored in RAM 82 can be read or changed by processor 91 or other hardware devices. Access to RAM 82 and/or ROM 93 may be controlled by memory controller 92. Memory controller 92 may provide an address translation function that translates virtual addresses into physical addresses as instructions are executed. Memory controller 92 may also provide a memory protection function that isolates processes within the system and isolates system processes from user processes. Thus, a program running in a first mode can access only memory mapped by its own process virtual address space; it cannot access memory within another process's virtual address space unless memory sharing between the processes has been set up.

In addition, computing system 90 may contain peripherals controller 83 responsible for communicating instructions from processor 91 to peripherals, such as printer 94, keyboard 84, mouse 95, and disk drive 85.

Display 86, which is controlled by display controller 96, is used to display visual output generated by computing system 90. Such visual output may include text, graphics, animated graphics, and video. The visual output may be provided in the form of a graphical user interface (GUI). Display 86 may be implemented with a CRT-based video display, an LCD-based flat-panel display, gas plasma-based flat-panel display, or a touch-panel. Display controller 96 includes electronic components required to generate a video signal that is sent to display 86.

Further, computing system 90 may contain communication circuitry, such as for example a network adapter 97, that may be used to connect computing system 90 to an external communications network, such as network 12 of FIGS. 31 and 32, the RAN 103/104/105, Core Network 106/107/109, PSTN 108, Internet 110, or Other Networks 112 of FIGS. 35, 36, 37, 38, and 39, to enable the computing system 90 to communicate with other nodes or functional entities of those networks. The communication circuitry, alone or in combination with the processor 91, may be used to perform the transmitting and receiving steps of certain apparatuses, nodes, or functional entities described herein.

It is understood that any or all of the apparatuses, systems, methods and processes described herein may be embodied in the form of computer executable instructions (e.g., program code) stored on a computer-readable storage medium which instructions, when executed by a processor, such as processors 118 or 91, cause the processor to perform and/or implement the systems, methods and processes described herein. Specifically, any of the steps, operations or functions described herein may be implemented in the form of such computer executable instructions, executing on the processor of an apparatus or computing system configured for wireless and/or wired network communications. Computer readable storage media include volatile and nonvolatile, removable and non-removable media implemented in any non-transitory (e.g., tangible or physical) method or technology for storage of information, but such computer readable storage media do not includes signals. Computer readable storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other tangible or physical medium which can be used to store the desired information and which can be accessed by a computing system.

The 3rd Generation Partnership Project (3GPP) develops technical standards for cellular telecommunications network technologies, including radio access, the core transport network, and service capabilities—including work on codecs, security, and quality of service. Recent radio access technology (RAT) standards include WCDMA (commonly referred as 3G), LTE (commonly referred as 4G), and LTE-Advanced standards. 3GPP has begun working on the standardization of next generation cellular technology, called New Radio (NR), which is also referred to as "5G." 3GPP NR standards development is expected to include the definition of next generation radio access technology (new RAT), which is expected to include the provision of new flexible radio access below 6 GHz, and the provision of new ultra-mobile broadband radio access above 6 GHz. The flexible radio access is expected to consist of a new, non-backwards compatible radio access in new spectrum below 6 GHz, and it is expected to include different operating modes that can be multiplexed together in the same spectrum to address a broad set of 3GPP NR use cases with diverging requirements. The ultra-mobile broadband is expected to include cmWave and mmWave spectrum that will provide the opportunity for ultra-mobile broadband access for, e.g., indoor applications and hotspots. In particular, the ultra-mobile broadband is expected to share a common design framework with the flexible radio access below 6 GHz, with cmWave and mmWave specific design optimizations.

3GPP has identified a variety of use cases that NR is expected to support, resulting in a wide variety of user experience requirements for data rate, latency, and mobility. The use cases include the following general categories: enhanced mobile broadband (e.g., broadband access in dense areas, indoor ultra-high broadband access, broadband access in a crowd, 50+ Mbps everywhere, ultra-low cost broadband access, mobile broadband in vehicles), critical communications, massive machine type communications, network operation (e.g., network slicing, routing, migration and interworking, energy savings), and enhanced vehicle-to-everything (eV2X) communications. Specific service and applications in these categories include, e.g., monitoring and sensor networks, device remote controlling, bi-directional remote controlling, personal cloud computing, video streaming, wireless cloud-based office, first responder connectivity, automotive ecall, disaster alerts, real-time gaming, multi-person video calls, autonomous driving, augmented reality, tactile internet, and virtual reality to name a few. All of these use cases and others are contemplated herein.

Figure 35:
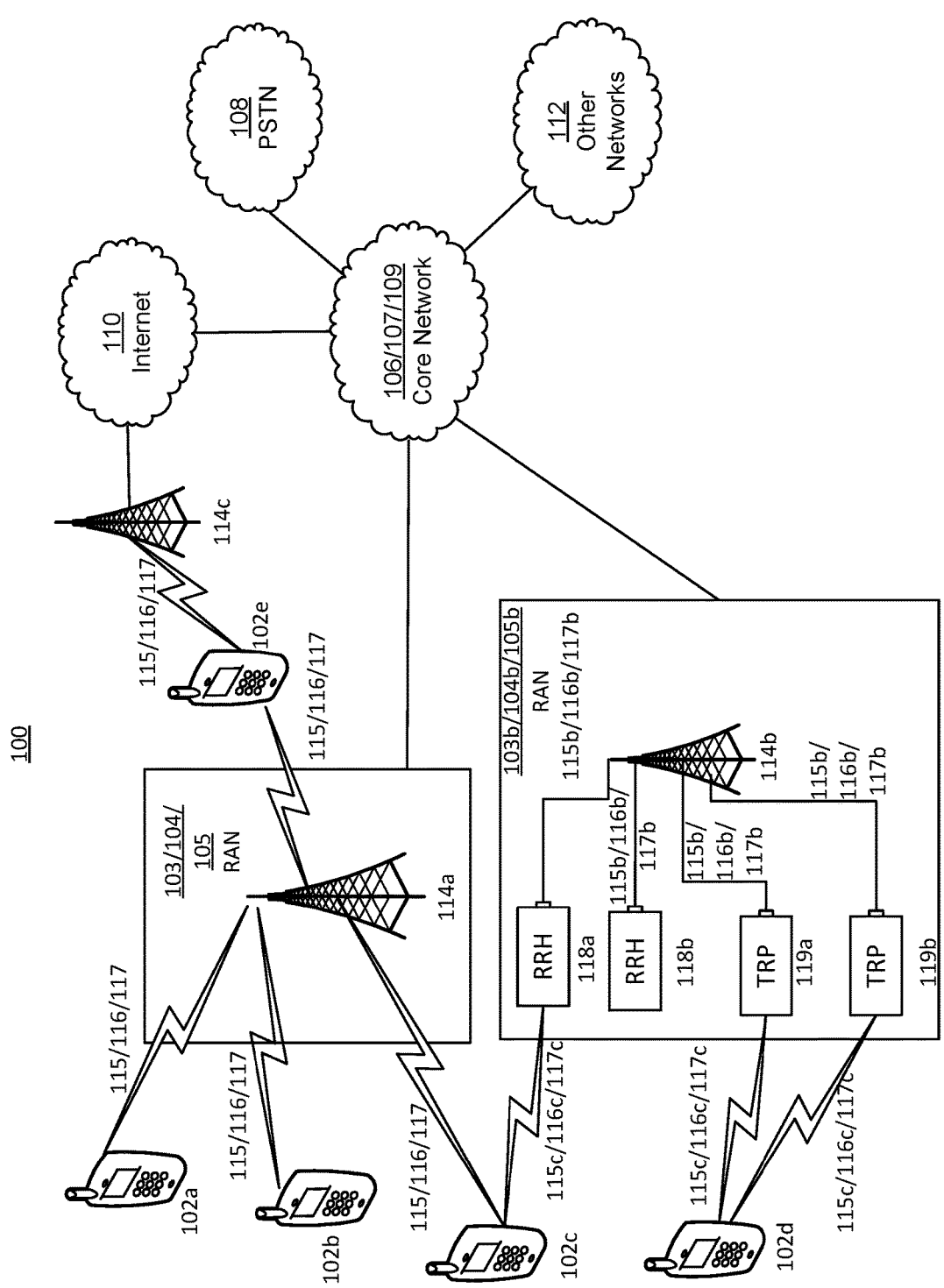
FIG. 35 illustrates an example communications system.

FIG. 35 illustrates one embodiment of an example communications system 100 in which the methods and apparatuses described and claimed herein may be embodied. As shown, the example communications system 100 may include wireless transmit/receive units (WTRUs) 102a, 102b, 102c, and/or 102d (which generally or collectively may be referred to as WTRU 102), a radio access network (RAN) 103/104/105/103b/104b/105b, a core network 106/107/109, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d, 102e may be any type of apparatus or device configured to operate and/or communicate in a wireless environment. Although each WTRU 102a, 102b, 102c, 102d, 102e is depicted in FIGS. 35-39 as a hand-held wireless communications apparatus, it is understood that with the wide variety of use cases contemplated for 5G wireless communications, each WTRU may comprise or be embodied in any type of apparatus or device configured to transmit and/or receive wireless signals, including, by way of example only, user equipment (UE), a mobile station, a fixed or mobile subscriber unit, a pager, a cellular telephone, a personal digital assistant (PDA), a smartphone, a laptop, a tablet, a netbook, a notebook computer, a personal computer, a wireless sensor, consumer electronics, a wearable device such as a smart watch or smart clothing, a medical or eHealth device, a robot, industrial equipment, a drone, a vehicle such as a car, truck, train, or airplane, and the like.

The communications system 100 may also include a base station 114a and a base station 114b. Base stations 114a may be any type of device configured to wirelessly interface with at least one of the WTRUs 102a, 102b, 102c to facilitate access to one or more communication networks, such as the core network 106/107/109, the Internet 110, and/or the other networks 112. Base stations 114b may be any type of device configured to wiredly and/or wirelessly interface with at least one of the RRHs (Remote Radio Heads) 118a, 118b and/or TRPs (Transmission and Reception Points) 119a, 119b to facilitate access to one or more communication networks, such as the core network 106/107/109, the Internet 110, and/or the other networks 112. RRHs 118a, 118b may be any type of device configured to wirelessly interface with at least one of the WTRU 102c, to facilitate access to one or more communication networks, such as the core network 106/107/109, the Internet 110, and/or the other networks 112. TRPs 119a, 119b may be any type of device configured to wirelessly interface with at least one of the WTRU 102d, to facilitate access to one or more communication networks, such as the core network 106/107/109, the Internet 110, and/or the other networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 103/104/105, which may also include other base stations and/or network elements (not shown), such as a base station controller (BSC), a radio network controller (RNC), relay nodes, etc. The base station 114b may be part of the RAN 103b/104b/105b, which may also include other base stations and/or network elements (not shown), such as a base station controller (BSC), a radio network controller (RNC), relay nodes, etc. The base station 114a may be configured to transmit and/or receive wireless signals within a particular geographic region, which may be referred to as a cell (not shown). The base station 114b may be configured to transmit and/or receive wired and/or wireless signals within a particular geographic region, which may be referred to as a cell (not shown). The cell may further be divided into cell sectors. For example, the cell associated with the base station 114a may be divided into three sectors. Thus, in an embodiment, the base station 114a may include three transceivers, e.g., one for each sector of the cell. In an embodiment, the base station 114a may employ multiple-input multiple output (MIMO) technology and, therefore, may utilize multiple transceivers for each sector of the cell.

The base stations 114a may communicate with one or more of the WTRUs 102a, 102b, 102c over an air interface 115/116/117, which may be any suitable wireless communication link (e.g., radio frequency (RF), microwave, infrared (IR), ultraviolet (UV), visible light, cmWave, mmWave, etc.). The air interface 115/116/117 may be established using any suitable radio access technology (RAT).

The base stations 114b may communicate with one or more of the RRHs 118a, 118b and/or TRPs 119a, 119b over a wired or air interface 115b/116b/117b, which may be any suitable wired (e.g., cable, optical fiber, etc.) or wireless communication link (e.g., radio frequency (RF), microwave, infrared (IR), ultraviolet (UV), visible light, cmWave, mmWave, etc.). The air interface 115b/116b/117b may be established using any suitable radio access technology (RAT).

The RRHs 118a, 118b and/or TRPs 119a, 119b may communicate with one or more of the WTRUs 102c, 102d over an air interface 115c/116c/117c, which may be any suitable wireless communication link (e.g., radio frequency (RF), microwave, infrared (IR), ultraviolet (UV), visible light, cmWave, mmWave, etc.). The air interface 115c/116c/117c may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 103/104/105 and the WTRUs 102a, 102b, 102c, or RRHs 118a, 118b and TRPs 119a, 119b in the RAN 103b/104b/105b and the WTRUs 102c, 102d, may implement a radio technology such as Universal Mobile Telecommunications System (UMTS) Terrestrial Radio Access (UTRA), which may establish the air interface 115/116/117 or 115c/116c/117c respectively using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In an embodiment, the base station 114a and the WTRUs 102a, 102b, 102c, or RRHs 118a, 118b and TRPs 119a, 119b in the RAN 103b/104b/105b and the WTRUs 102c, 102d, may implement a radio technology such as Evolved UMTS Terrestrial Radio Access (E-UTRA), which may establish the air interface 115/116/117 or 115c/116c/117c respectively using Long Term Evolution (LTE) and/or LTE-Advanced (LTE-A). In the future, the air interface 115/116/117 may implement 3GPP NR technology.

In an embodiment, the base station 114a in the RAN 103/104/105 and the WTRUs 102a, 102b, 102c, or RRHs 118a, 118b and TRPs 119a, 119b in the RAN 103b/104b/105b and the WTRUs 102c, 102d, may implement radio technologies such as IEEE 802.16 (e.g., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114c in FIG. 35 may be a wireless router, Home Node B, Home eNode B, or access point, for example, and may utilize any suitable RAT for facilitating wireless connectivity in a localized area, such as a place of business, a home, a vehicle, a campus, and the like. In an embodiment, the base station 114c and the WTRUs 102e, may implement a radio technology such as IEEE 802.11 to establish a wireless local area network (WLAN). In an embodiment, the base station 114c and the WTRUs 102d, may implement a radio technology such as IEEE 802.15 to establish a wireless personal area network (WPAN). In yet another embodiment, the base station 114c and the WTRUs 102e, may utilize a cellular-based RAT (e.g., WCDMA, CDMA2000, GSM, LTE, LTE-A, etc.) to establish a picocell or femtocell. As shown in FIG. 35, the base station 114b may have a direct connection to the Internet 110. Thus, the base station 114c may not be required to access the Internet 110 via the core network 106/107/109.

The RAN 103/104/105 and/or RAN 103b/104b/105b may be in communication with the core network 106/107/109, which may be any type of network configured to provide voice, data, applications, and/or voice over internet protocol (VoIP) services to one or more of the WTRUs 102a, 102b, 102c, 102d. For example, the core network 106/107/109 may provide call control, billing services, mobile location-based services, pre-paid calling, Internet connectivity, video distribution, etc., and/or perform high-level security functions, such as user authentication.

Although not shown in FIG. 35, it will be appreciated that the RAN 103/104/105 and/or RAN 103b/104b/105b and/or the core network 106/107/109 may be in direct or indirect communication with other RANs that employ the same RAT as the RAN 103/104/105 and/or RAN 103b/104b/105b or a different RAT. For example, in addition to being connected to the RAN 103/104/105 and/or RAN 103b/104b/105b, which may be utilizing an E-UTRA radio technology, the core network 106/107/109 may also be in communication with another RAN (not shown) employing a GSM radio technology.

The core network 106/107/109 may also serve as a gateway for the WTRUs 102a, 102b, 102c, 102d, 102e to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 103/104/105 and/or RAN 103b/104b/105b or a different RAT.

Some or all of the WTRUs 102a, 102b, 102c, 102d in the communications system 100 may include multi-mode capabilities, e.g., the WTRUs 102a, 102b, 102c, 102d, and 102e may include multiple transceivers for communicating with different wireless networks over different wireless links. For example, the WTRU 102e shown in FIG. 35 may be configured to communicate with the base station 114a, which may employ a cellular-based radio technology, and with the base station 114c, which may employ an IEEE 802 radio technology.

Figure 36:
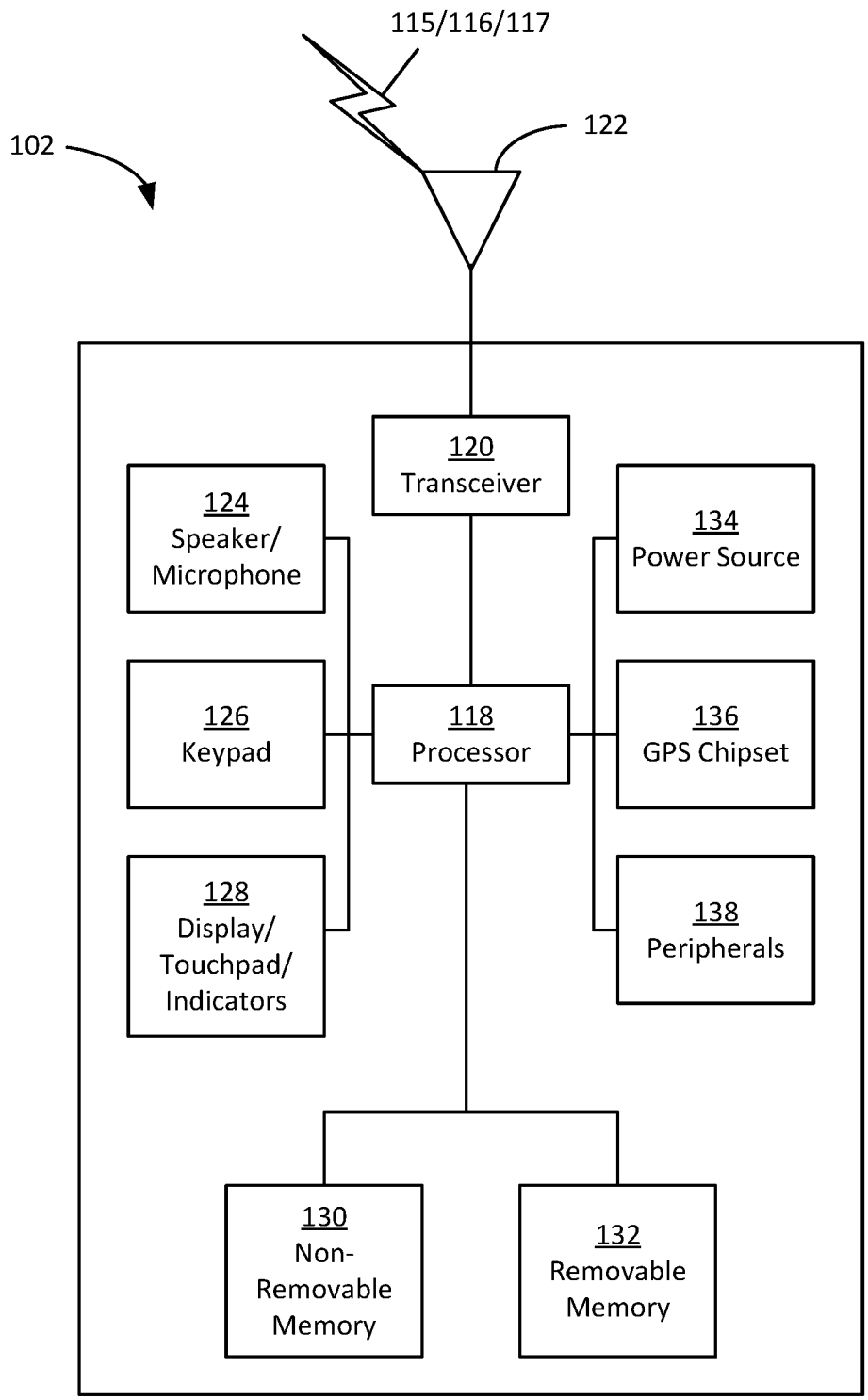
FIG. 36 is a block diagram of an example apparatus or device configured for wireless communications such as, for example, a wireless transmit/receive unit (WTRU).

FIG. 36 is a block diagram of an example apparatus or device configured for wireless communications in accordance with the embodiments illustrated herein, such as for example, a WTRU 102. As shown in FIG. 36, the example WTRU 102 may include a processor 118, a transceiver 120, a transmit/receive element 122, a speaker/microphone 124, a keypad 126, a display/touchpad/indicators 128, non-removable memory 130, removable memory 132, a power source 134, a global positioning system (GPS) chipset 136, and other peripherals 138. It will be appreciated that the WTRU 102 may include any sub-combination of the foregoing elements while remaining consistent with an embodiment. Also, embodiments contemplate that the base stations 114a and 114b, and/or the nodes that base stations 114a and 114b may represent, such as but not limited to, transceiver station (BTS), a Node-B, a site controller, an access point (AP), a home node-B, an evolved home node-B (eNodeB), a home evolved node-B (HeNB), a home evolved node-B gateway, and proxy nodes, among others, may include some or all of the elements depicted in FIG. 36 and described herein.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 36 depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 115/116/117. For example, in an embodiment, the transmit/receive element 122 may be an antenna configured to transmit and/or receive RF signals. Although not shown in FIG. 35, it will be appreciated that the RAN 103/104/105 and/or the core network 106/107/109 may be in direct or indirect communication with other RANs that employ the same RAT as the RAN 103/104/105 or a different RAT. For example, in addition to being connected to the RAN 103/104/105, which may be utilizing an E-UTRA radio technology, the core network 106/107/109 may also be in communication with another RAN (not shown) employing a GSM radio technology.

The core network 106/107/109 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 103/104/105 or a different RAT.

Some or all of the WTRUs 102a, 102b, 102c, 102d in the communications system 100 may include multi-mode capabilities, e.g., the WTRUs 102a, 102b, 102c, and 102d may include multiple transceivers for communicating with different wireless networks over different wireless links. For example, the WTRU 102c shown in FIG. 35 may be configured to communicate with the base station 114a, which may employ a cellular-based radio technology, and with the base station 114b, which may employ an IEEE 802 radio technology.

FIG. 36 is a block diagram of an example apparatus or device configured for wireless communications in accordance with the embodiments illustrated herein, such as for example, a WTRU 102. As shown in FIG. 36, the example WTRU 102 may include a processor 118, a transceiver 120, a transmit/receive element 122, a speaker/microphone 124, a keypad 126, a display/touchpad/indicators 128, non-removable memory 130, removable memory 132, a power source 134, a global positioning system (GPS) chipset 136, and other peripherals 138. It will be appreciated that the WTRU 102 may include any sub-combination of the foregoing elements while remaining consistent with an embodiment. Also, embodiments contemplate that the base stations 114a and 114b, and/or the nodes that base stations 114a and 114b may represent, such as but not limited to transceiver station (BTS), a Node-B, a site controller, an access point (AP), a home node-B, an evolved home node-B (eNodeB), a home evolved node-B (HeNB), a home evolved node-B gateway, and proxy nodes, among others, may include some or all of the elements depicted in FIG. 36 and described herein.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 36 depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114*a*) over the air interface 115/116/117. For example, in an embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet an embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 36 as a single element, the WTRU 102 may include any number of transmit/receive elements 122. More specifically, the WTRU 102 may employ MIMO technology. Thus, in an embodiment, the WTRU 102 may include two or more transmit/receive elements 122 (e.g., multiple antennas) for transmitting and receiving wireless signals over the air interface 115/116/117.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATS, such as UTRA and IEEE 802.11, for example.

The processor 118 of the WTRU 102 may be coupled to, and may receive user input data from, the speaker/microphone 124, the keypad 126, and/or the display/touchpad/indicators 128 (e.g., a liquid crystal display (LCD) display unit or organic light-emitting diode (OLED) display unit). The processor 118 may also output user data to the speaker/microphone 124, the keypad 126, and/or the display/touchpad/indicators 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In an embodiment, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries, solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 115/116/117 from a base station (e.g., base stations 114*a*, 114*b*) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include various sensors such as an accelerometer, biometrics (e.g., finger print) sensors, an e-compass, a satellite transceiver, a digital camera (for photographs or video), a universal serial bus (USB) port or other interconnect interfaces, a vibration device, a television transceiver, a hands free headset, a Bluetooth® module, a frequency modulated (FM) radio unit, a digital music player, a media player, a video game player module, an Internet browser, and the like.

The WTRU 102 may be embodied in other apparatuses or devices, such as a sensor, consumer electronics, a wearable device such as a smart watch or smart clothing, a medical or eHealth device, a robot, industrial equipment, a drone, a vehicle such as a car, truck, train, or airplane. The WTRU 102 may connect to other components, modules, or systems of such apparatuses or devices via one or more interconnect interfaces, such as an interconnect interface that may comprise one of the peripherals 138.

Figure 37:
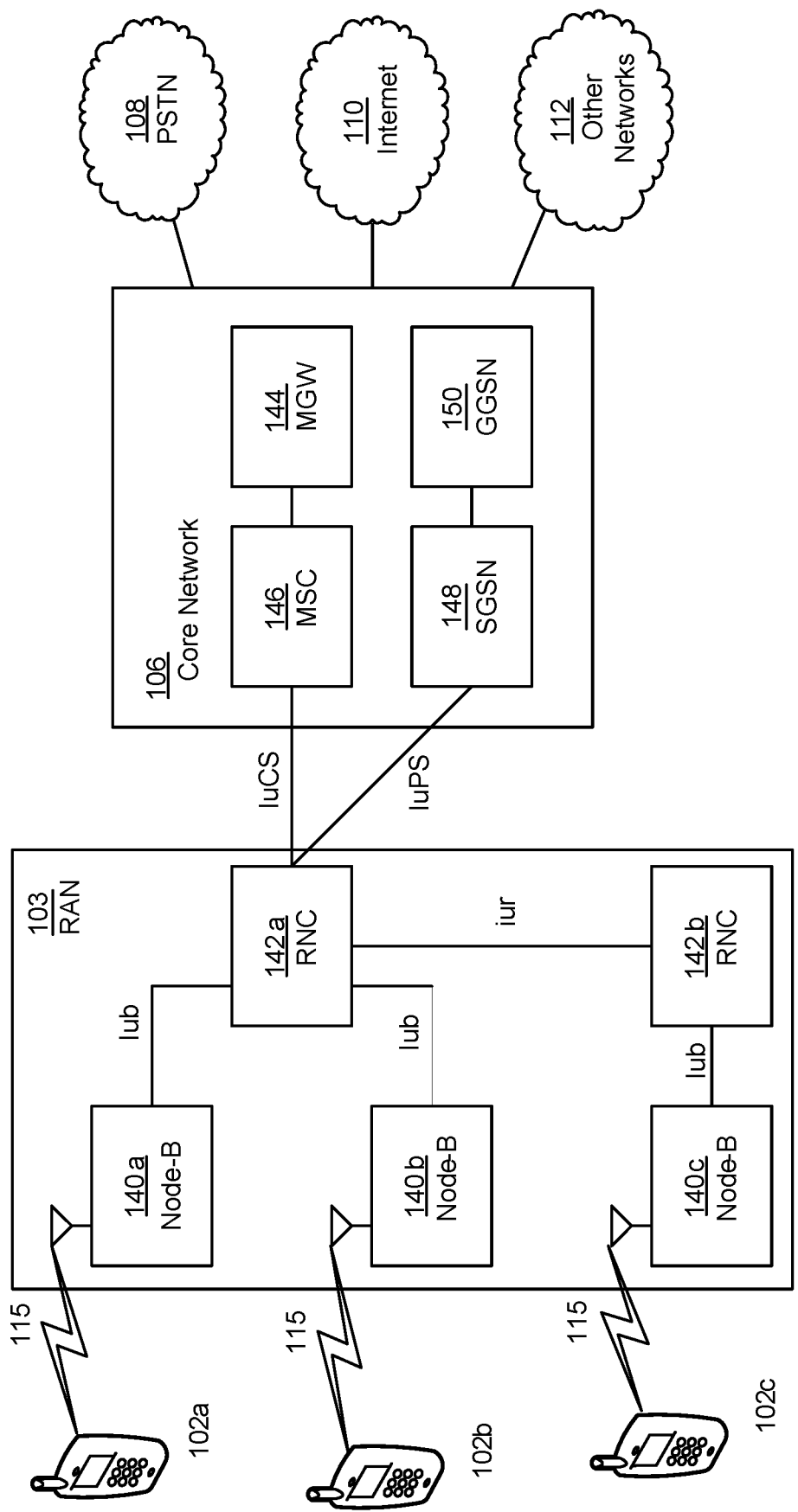
FIG. 37 is a system diagram of a first example radio access network (RAN) and core network.

FIG. 37 is a system diagram of the RAN 103 and the core network 106 according to an embodiment. As noted above, the RAN 103 may employ a UTRA radio technology to communicate with the WTRUs 102*a*, 102*b*, and 102*c* over the air interface 115. The RAN 103 may also be in communication with the core network 106. As shown in FIG. 37, the RAN 103 may include Node-Bs 140*a*, 140*b*, 140*c*, which may each include one or more transceivers for communicating with the WTRUs 102*a*, 102*b*, 102*c* over the air interface 115. The Node-Bs 140*a*, 140*b*, 140*c* may each be associated with a particular cell (not shown) within the RAN 103. The RAN 103 may also include RNCs 142*a*, 142*b*. It will be appreciated that the RAN 103 may include any number of Node-Bs and RNCs while remaining consistent with an embodiment.

As shown in FIG. 37, the Node-Bs 140*a*, 140*b* may be in communication with the RNC 142*a*. Additionally, the Node-B 140*c* may be in communication with the RNC 142*b*. The Node-Bs 140*a*, 140*b*, 140*c* may communicate with the respective RNCs 142*a*, 142*b* via an Iub interface. The RNCs 142*a*, 142*b* may be in communication with one another via an Iur interface. Each of the RNCs 142*a*, 142*b* may be configured to control the respective Node-Bs 140*a*, 140*b*, 140*c* to which it is connected. In addition, each of the RNCs 142*a*, 142*b* may be configured to carry out or support other functionality, such as outer loop power control, load control, admission control, packet scheduling, handover control, macro-diversity, security functions, data encryption, and the like.

The core network 106 shown in FIG. 37 may include a media gateway (MGW) 144, a mobile switching center (MSC) 146, a serving GPRS support node (SGSN) 148, and/or a gateway GPRS support node (GGSN) 150. While each of the foregoing elements are depicted as part of the core network 106, it will be appreciated that any one of these elements may be owned and/or operated by an entity other than the core network operator.

The RNC 142a in the RAN 103 may be connected to the MSC 146 in the core network 106 via an IuCS interface. The MSC 146 may be connected to the MGW 144. The MSC 146 and the MGW 144 may provide the WTRUs 102a, 102b, 102c with access to circuit-switched networks, such as the PSTN 108, to facilitate communications between the WTRUs 102a, 102b, 102c and traditional land-line communications devices.

The RNC 142a in the RAN 103 may also be connected to the SGSN 148 in the core network 106 via an IuPS interface. The SGSN 148 may be connected to the GGSN 150. The SGSN 148 and the GGSN 150 may provide the WTRUs 102a, 102b, 102c with access to packet-switched networks, such as the Internet 110, to facilitate communications between and the WTRUs 102a, 102b, 102c and IP-enabled devices.

As noted above, the core network 106 may also be connected to the networks 112, which may include other wired or wireless networks that are owned and/or operated by other service providers.

Figure 38:
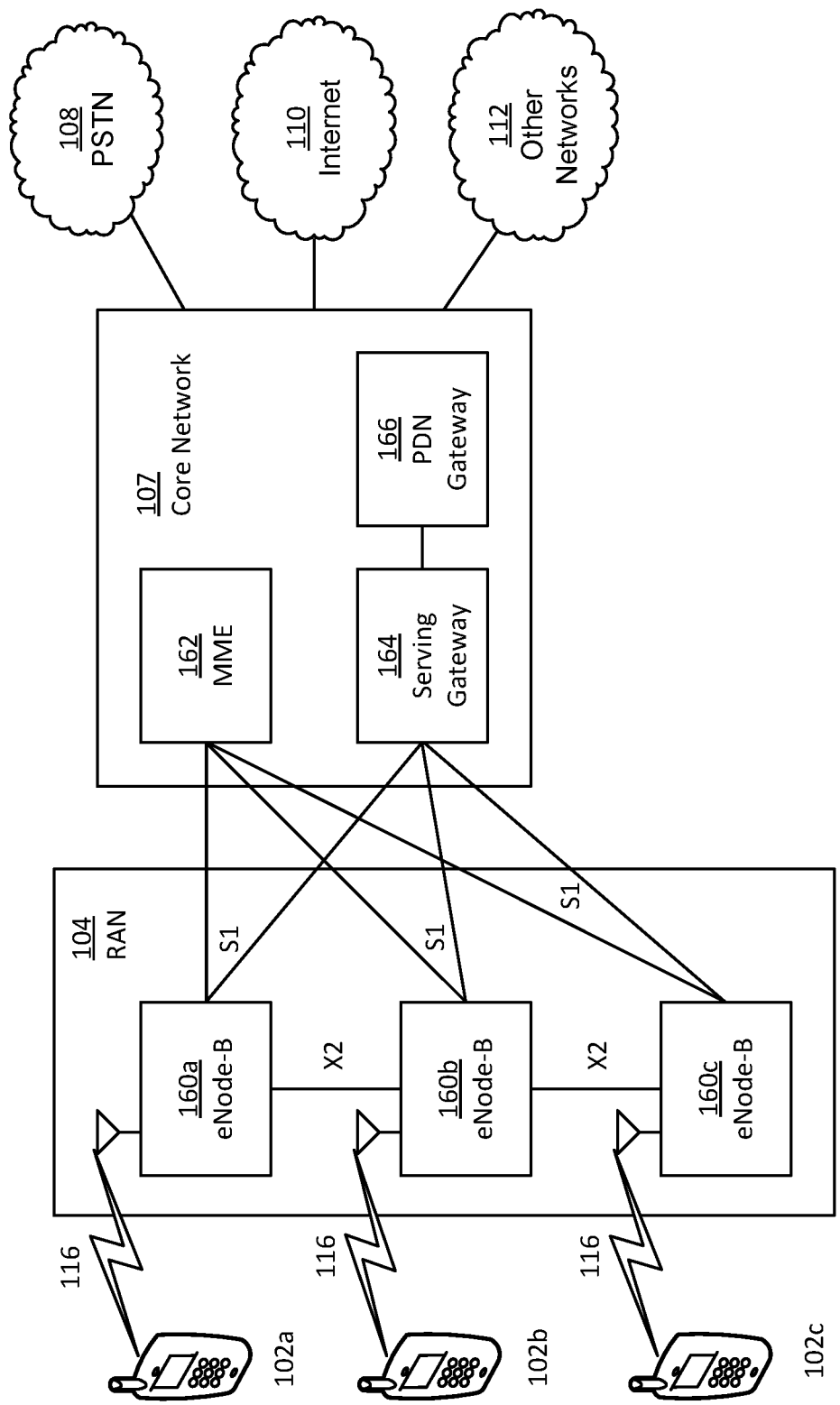
FIG. 38 is a system diagram of a second example RAN.

FIG. 38 is a system diagram of the RAN 104 and the core network 107 according to an embodiment. As noted above, the RAN 104 may employ an E-UTRA radio technology to communicate with the WTRUs 102a, 102b, and 102c over the air interface 116. The RAN 104 may also be in communication with the core network 107.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In an embodiment, the eNode-Bs 160a, 160b, 160c may implement MIMO technology. Thus, the eNode-B 160a, for example, may use multiple antennas to transmit wireless signals to, and receive wireless signals from, the WTRU 102a.

Each of the eNode-Bs 160a, 160b, and 160c may be associated with a particular cell (not shown) and may be configured to handle radio resource management decisions, handover decisions, scheduling of users in the uplink and/or downlink, and the like. As shown in FIG. 38, the eNode-Bs 160a, 160b, 160c may communicate with one another over an X2 interface.

The core network 107 shown in FIG. 38 may include a mobility management gateway (MME) 162, a serving gateway 164, and a packet data network (PDN) gateway 166. While each of the foregoing elements are depicted as part of the core network 107, it will be appreciated that any one of these elements may be owned and/or operated by an entity other than the core network operator.

The MME 162 may be connected to each of the eNode-Bs 160a, 160b, and 160c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may also provide a control plane function for switching between the RAN 104 and other RANs (not shown) that employ other radio technologies, such as GSM or WCDMA.

The serving gateway 164 may be connected to each of the eNode-Bs 160a, 160b, and 160c in the RAN 104 via the S1 interface. The serving gateway 164 may generally route and forward user data packets to/from the WTRUs 102a, 102b, 102c. The serving gateway 164 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The serving gateway 164 may also be connected to the PDN gateway 166, which may provide the WTRUs 102a, 102b, 102c with access to packet-switched networks, such as the Internet 110, to facilitate communications between the WTRUs 102a, 102b, 102c and IP-enabled devices.

The core network 107 may facilitate communications with other networks. For example, the core network 107 may provide the WTRUs 102a, 102b, 102c with access to circuit-switched networks, such as the PSTN 108, to facilitate communications between the WTRUs 102a, 102b, 102c and traditional land-line communications devices. For example, the core network 107 may include, or may communicate with, an IP gateway (e.g., an IP multimedia subsystem (IMS) server) that serves as an interface between the core network 107 and the PSTN 108. In addition, the core network 107 may provide the WTRUs 102a, 102b, 102c with access to the networks 112, which may include other wired or wireless networks that are owned and/or operated by other service providers.

Figure 39:
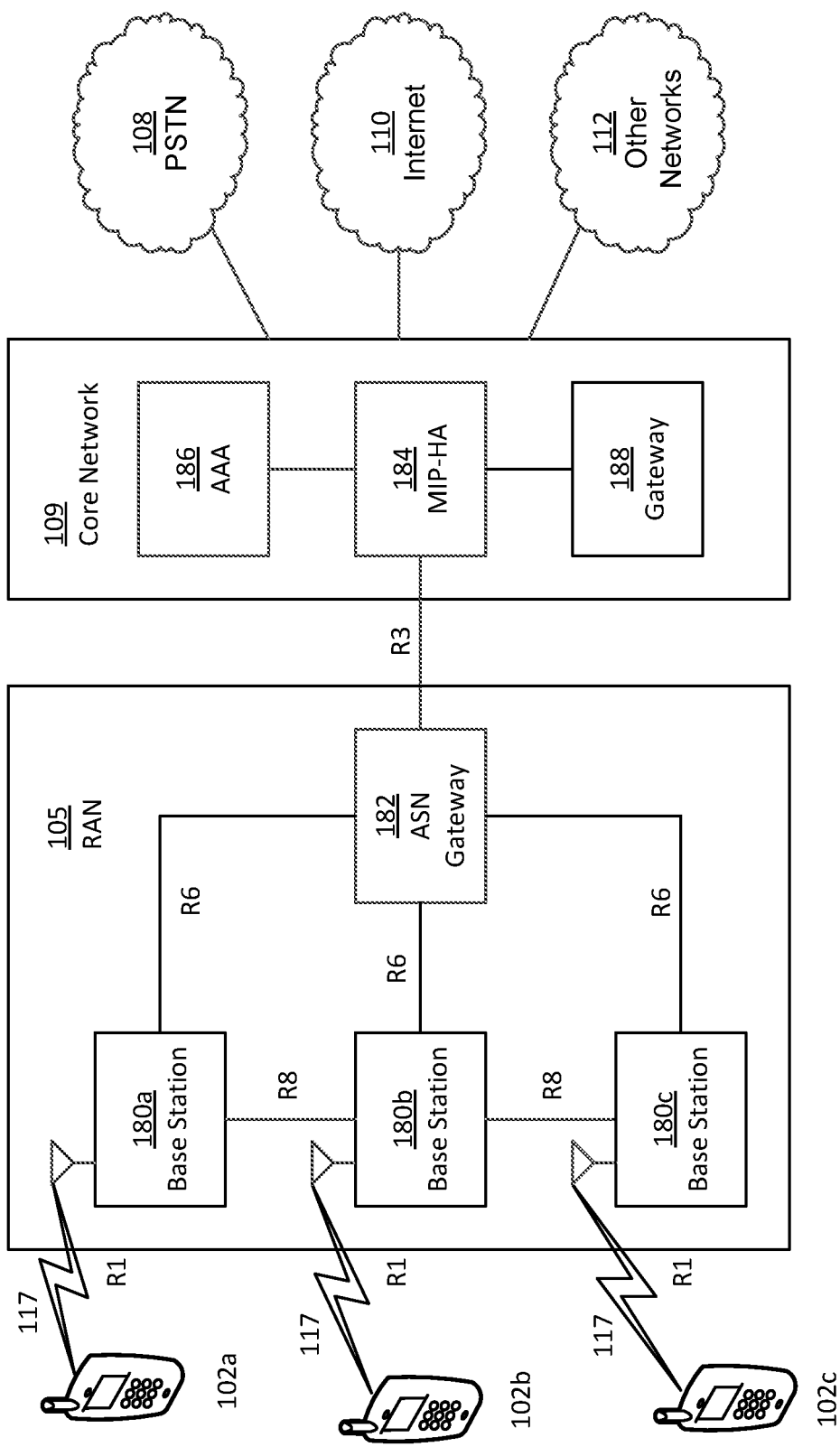
FIG. 39 is a system diagram of a third example radio access network RAN.

FIG. 39 is a system diagram of the RAN 105 and the core network 109 according to an embodiment. The RAN 105 may be an access service network (ASN) that employs IEEE 802.16 radio technology to communicate with the WTRUs 102a, 102b, and 102c over the air interface 117. As will be further discussed below, the communication links between the different functional entities of the WTRUs 102a, 102b, 102c, the RAN 105, and the core network 109 may be defined as reference points.

As shown in FIG. 39, the RAN 105 may include base stations 180a, 180b, 180c, and an ASN gateway 182, though it will be appreciated that the RAN 105 may include any number of base stations and ASN gateways while remaining consistent with an embodiment. The base stations 180a, 180b, 180c may each be associated with a particular cell in the RAN 105 and may include one or more transceivers for communicating with the WTRUs 102a, 102b, 102c over the air interface 117. In an embodiment, the base stations 180a, 180b, 180c may implement MIMO technology. Thus, the base station 180a, for example, may use multiple antennas to transmit wireless signals to, and receive wireless signals from, the WTRU 102a. The base stations 180a, 180b, 180c may also provide mobility management functions, such as handoff triggering, tunnel establishment, radio resource management, traffic classification, quality of service (QoS) policy enforcement, and the like. The ASN gateway 182 may serve as a traffic aggregation point and may be responsible for paging, caching of subscriber profiles, routing to the core network 109, and the like.

The air interface 117 between the WTRUs 102a, 102b, 102c and the RAN 105 may be defined as an R1 reference point that implements the IEEE 802.16 specification. In addition, each of the WTRUs 102a, 102b, and 102c may establish a logical interface (not shown) with the core network 109. The logical interface between the WTRUs 102a, 102b, 102c and the core network 109 may be defined as an R2 reference point, which may be used for authentication, authorization, IP host configuration management, and/or mobility management.

The communication link between each of the base stations 180a, 180b, and 180c may be defined as an R8 reference point that includes protocols for facilitating WTRU handovers and the transfer of data between base stations. The communication link between the base stations 180a, 180b, 180c and the ASN gateway 182 may be defined as an R6 reference point. The R6 reference point may include protocols for facilitating mobility management based on mobility events associated with each of the WTRUs 102a, 102b, 102c.

As shown in FIG. 39, the RAN 105 may be connected to the core network 109. The communication link between the RAN 105 and the core network 109 may defined as an R3 reference point that includes protocols for facilitating data transfer and mobility management capabilities, for example. The core network 109 may include a mobile IP home agent (MIP-HA) 184, an authentication, authorization, accounting (AAA) server 186, and a gateway 188. While each of the foregoing elements are depicted as part of the core network 109, it will be appreciated that any one of these elements may be owned and/or operated by an entity other than the core network operator.

The MIP-HA may be responsible for IP address management, and may enable the WTRUs 102a, 102b, and 102c to roam between different ASNs and/or different core networks. The MIP-HA 184 may provide the WTRUs 102a, 102b, 102c with access to packet-switched networks, such as the Internet 110, to facilitate communications between the WTRUs 102a, 102b, 102c and IP-enabled devices. The AAA server 186 may be responsible for user authentication and for supporting user services. The gateway 188 may facilitate interworking with other networks. For example, the gateway 188 may provide the WTRUs 102a, 102b, 102c with access to circuit-switched networks, such as the PSTN 108, to facilitate communications between the WTRUs 102a, 102b, 102c and traditional land-line communications devices. In addition, the gateway 188 may provide the WTRUs 102a, 102b, 102c with access to the networks 112, which may include other wired or wireless networks that are owned and/or operated by other service providers.

Although not shown in FIG. 39, it will be appreciated that the RAN 105 may be connected to other ASNs and the core network 109 may be connected to other core networks. The communication link between the RAN 105 the other ASNs may be defined as an R4 reference point, which may include protocols for coordinating the mobility of the WTRUs 102a, 102b, 102c between the RAN 105 and the other ASNs. The communication link between the core network 109 and the other core networks may be defined as an R5 reference, which may include protocols for facilitating interworking between home core networks and visited core networks.

The core network entities described herein and illustrated in FIGS. 35, 37, 38, and 39 are identified by the names given to those entities in certain existing 3GPP specifications, but it is understood that in the future those entities and functionalities may be identified by other names and certain entities or functions may be combined in future specifications published by 3GPP, including future 3GPP NR specifications. Thus, the particular network entities and functionalities described and illustrated in FIGS. 35, 36, 37, 38, and 39 are provided by way of example only, and it is understood that the subject matter disclosed and claimed herein may be embodied or implemented in any similar communication system, whether presently defined or defined in the future.

Figure 40:
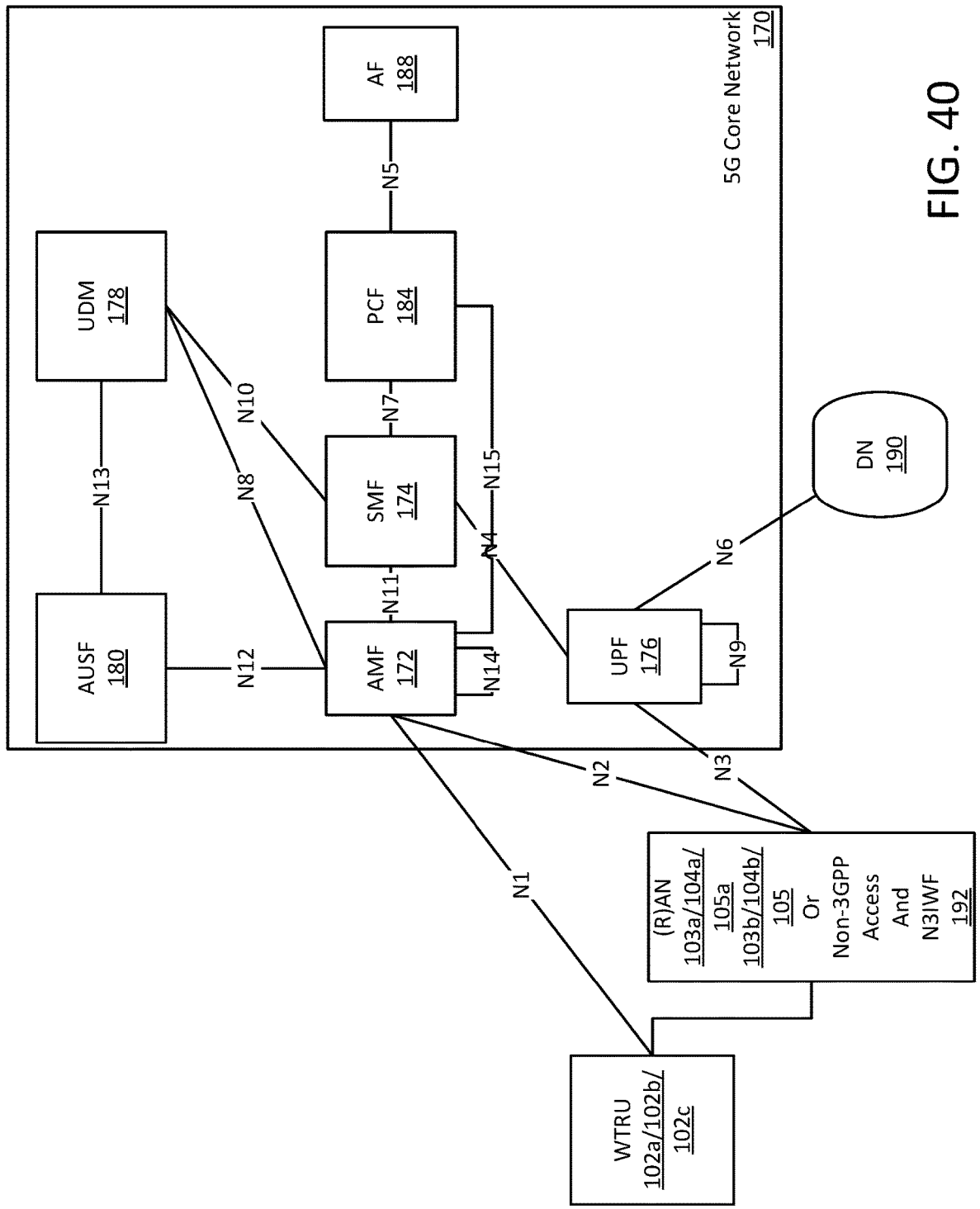
FIG. 40 is a system diagram of a third example radio access network RAN.

The 5G core network 170 shown in FIG. 40 may include an access and mobility management function (AMF) 172, a session management function (SMF) 174, a user plane function (UPF) 176, a user data management function (UDM) 178, an authentication server function (AUSF) 180, a Network Exposure Function (NEF), a policy control function (PCF) 184, a non-3GPP interworking function (N3IWF) 192 and an application function (AF) 188. While each of the foregoing elements are depicted as part of the 5G core network 170, it will be appreciated that any one of these elements may be owned and/or operated by an entity other than the core network operator. It should also be appreciated that a 5G core network may not consist of all of these elements, may consist of additional elements, and may consist of multiple instances of each of these elements. FIG. 40 shows that network functions directly connect to one another, however, it should be appreciated that they may communicate via routing agents such as diameter routing agents or message buses.

The AMF 172 may be connected to each of the RAN 103/104/105/103b/104b/105b via an N2 interface and may serve as a control node. For example, the AMF 172 may be responsible for registration management, connection management, reachability management, access authentication, access authorization. The AMF 172 may generally route and forward NAS packets to/from the WTRUs 102a, 102b, 102c.

The SMF 174 may be connected to the AMF 172 via an N11 interface, maybe connected to a PCF 184 via an N7 interface, and may be connected to the UPF 176 via an N4 interface. The SMF 174 may serve as a control node. For example, the SMF 174 may be responsible for Session Management, WTRUs 102a, 102b, 102c IP address allocation & management and configuration of traffic steering rules in the UPF 176, and generation of downlink data notifications.

The SMF 174 may also be connected to the UPF 176, which may provide the WTRUs 102a, 102b, 102c with access to a data network (DN) 190, such as the Internet 110, to facilitate communications between the WTRUs 102a, 102b, 102c and IP-enabled devices. The SMF 174 may manage and configure traffic steering rules in the UPF 176 via the N4 interface. The UPF 176 may be responsible for interconnecting a packet data unit (PDU) session with a data network, packet routing and forwarding, policy rule enforcement, quality of service handling for user plane traffic, and downlink packet buffering.

The AMF 172 may also be connected to the N3IWF 192 via an N2 interface. The N3IWF facilities a connection between the WTRUs 102a, 102b, 102c and the 5G core network 170 via radio interface technologies that are not defined by 3GPP.

The PCF 184 may be connected to the SMF 174 via an N7 interface, connected to the AMF 172 via an N15 interface, and connected to an application function (AF) 188 via an N5 interface. The PCF 184 may provide policy rules to control plane nodes such as the AMF 172 and SMF 174, allowing the control plane nodes to enforce these rules.

The UDM 178 acts as a repository for authentication credentials and subscription information. The UDM may connect to other functions such as the AMF 172, SMF 174, and AUSF 180.

The AUSF 180 performs authentication related operations and connects to the UDM 178 via an N13 interface and to the AMF 172 via an N12 interface.

The NEF exposes capabilities and services in the 5G core network 170. The NEF may connect to an AF 188 via an interface and it may connect to other control plane and user plane functions (180, 178, 172, 172, 184, 176, and N3IWF) in order to expose the capabilities and services of the 5G core network 170.

The 5G core network 170 may facilitate communications with other networks. For example, the core network 170 may include, or may communicate with, an IP gateway (e.g., an IP multimedia subsystem (IMS) server) that serves as an interface between the 5G core network 170 and the PSTN 108. For example, the core network 170 may include, or communicate with a short message service (SMS) service center that facilities communication via the short message service. For example, the 5G core network 170 may facilitate the exchange of non-IP data packets between the WTRUs 102a, 102b, 102c and servers. In addition, the core network 170 may provide the WTRUs 102a, 102b, 102c with access to the networks 112, which may include other wired or wireless networks that are owned and/or operated by other service providers.

What is claimed is:

1. An apparatus comprising a processor, memory, and computer-executable instructions stored in the memory which, when executed by the processor, cause the apparatus to:
   establish a first connection between the apparatus and a wireless transmit and receive unit (WTRU);
   establish a second connection between the apparatus and a local gateway;
   receive a message, wherein the message comprises an indication of a port number, an indication that a first traffic received by the apparatus is addressed to a first IP address corresponding to the WTRU, an indication that the first traffic is identified by the port number, an indication that the first traffic is to be addressed to a second IP address and routed to the second IP address via the local gateway, and an indication that traffic that is not identified by the port number is to be routed to the WTRU;
   receive the first traffic, wherein the first traffic is identified by the port number, wherein the first traffic is addressed to the first IP address, the first IP address corresponding to the WTRU;
   send the first traffic to the second IP address via the local gateway;
   receive a second traffic, wherein the second traffic is not identified by the port number, wherein the second traffic is addressed to the first IP address, the first IP address corresponding to the WTRU; and
   send the second traffic to the WTRU.

2. The apparatus of claim 1, wherein the apparatus comprises a Packet Data Network (PDN) gateway.

3. The apparatus of claim 1, wherein the second IP address is associated with a local server.

4. The apparatus of claim 1, wherein the message is received from a core network node.

5. The apparatus of claim 4, wherein the core network node comprises a mobility management entity.

6. The apparatus of claim 1, wherein the first connection comprises a Packet Data Network (PDN) connection.

7. The apparatus of claim 1, wherein the message comprises a traffic flow template for the apparatus to route traffic between a local server and an application server or a service capabilities server.

8. A method performed by an apparatus, comprising:
   establishing a first connection between the apparatus and a wireless transmit and receive unit (WTRU), wherein a first IP address corresponds to the WTRU;
   establishing a second connection between the apparatus and a local gateway;
   receiving a message, wherein the message comprises an indication of a port number, an indication that a first traffic received by the apparatus is addressed to a first IP address corresponding to the WTRU, an indication that the first traffic is identified by the port number, an indication that the first traffic is to be addressed to a second IP address and routed to the second IP address via the local gateway, and an indication that traffic that is not identified by the port number is to be routed to the WTRU;
   receiving the first traffic, wherein the first traffic is identified by the port number and addressed to the first IP address, the first IP address corresponding to the WTRU;
   sending the first traffic to the second IP address via the local gateway;
   receiving the second traffic, wherein the second traffic is not identified by the port number, wherein the second traffic is addressed to the first IP address, the first IP address corresponding to the WTRU; and
   sending the second traffic to the WTRU.

9. The method of claim 8, wherein the apparatus comprises a Packet Data Network (PDN) gateway.

10. The method of claim 8, wherein the second IP address is associated with a local server.

11. The method of claim 8, wherein the message is received from a core network node.

12. The method of claim 11, wherein the core network node comprises a mobility management entity.

13. The method of claim 8, wherein the first connection comprises a Packet Data Network (PDN) connection.

14. The method of claim 8, wherein the message comprises a traffic flow template for the apparatus to route traffic between a local server and an application server or a service capabilities server.

15. A non-transitory, computer-readable medium comprising computer-executable instructions which, when executed by a processor, cause the processor to:
   establish a first connection between an apparatus and a wireless transmit and receive unit (WTRU), wherein a first IP address corresponds to the WTRU;
   establish a second connection between the apparatus and a local gateway;
   receive a message, wherein the message comprises an indication of a port number, an indication that a first traffic received by the apparatus is addressed to a first IP address corresponding to the WTRU, an indication that the first traffic is identified by the port number, an indication that the first traffic is to be addressed to a second IP address and routed to the second IP address via the local gateway, and an indication that traffic that is not identified by the port number is to be routed to the WTRU;
   receive the first traffic, wherein the first traffic is identified by the port number, wherein the first traffic is addressed to the first IP address, the first IP address corresponding to the WTRU;
   send the first traffic to the second IP address via the local gateway;
   receive the second traffic, wherein the second traffic is not identified by the port number, wherein the second traffic is addressed to the first IP address, the first IP address corresponding to the WTRU; and
   send the second traffic to the WTRU.

16. The non-transitory, computer-readable medium of claim 15, wherein the apparatus comprises a Packet Data Network (PDN) gateway.

17. The non-transitory, computer-readable medium of claim 15, wherein the second IP address is associated with a local server.

18. The non-transitory, computer-readable medium of claim 15, wherein the message is received from a core network node.

19. The non-transitory, computer-readable medium of claim 18, wherein the core network node comprises a mobility management entity.

20. The non-transitory, computer-readable medium of claim 15, wherein the first connection comprises a Packet Data Network (PDN) connection.

\* \* \* \* \*